(12) United States Patent
Görcke

(10) Patent No.: US 10,788,591 B2
(45) Date of Patent: Sep. 29, 2020

(54) METHODS, APPARATUSES, AND COMPUTER PROGRAMS FOR ESTIMATING THE HEADING OF AN AXIS OF A RIGID BODY

(71) Applicant: Trimble Inc., Sunnyvale, CA (US)

(72) Inventor: Lorenz Görcke, Hoehenkirchen (DE)

(73) Assignee: Trimble Inc., Sunnyvale, CA (US)

( * ) Notice: Subject to any disclaimer, the term of this patent is extended or adjusted under 35 U.S.C. 154(b) by 181 days.

(21) Appl. No.: 16/135,999

(22) Filed: Sep. 19, 2018

(65) Prior Publication Data

US 2019/0094388 A1    Mar. 28, 2019

(30) Foreign Application Priority Data

Sep. 22, 2017 (EP) .................................... 17192706
Sep. 19, 2018 (EP) .................................... 18195395

(51) Int. Cl.
*G01S 19/49* (2010.01)
*G01C 21/16* (2006.01)
(Continued)

(52) U.S. Cl.
CPC .............. *G01S 19/49* (2013.01); *G01C 15/06* (2013.01); *G01C 19/34* (2013.01); *G01C 21/165* (2013.01)

(58) Field of Classification Search
CPC ......... G01S 19/49; G01S 19/13; G01C 15/06; G01C 15/00; G01C 19/34; G01C 21/165; G01C 21/28
(Continued)

(56) References Cited

U.S. PATENT DOCUMENTS 6,049,304 A * 4/2000 Rudel ................... G01S 5/0072
342/357.34
6,633,256 B2  10/2003 Zhdanov et al.
(Continued)

FOREIGN PATENT DOCUMENTS

WO    2014/047074 A1    3/2014
WO    2017/114577 A1    7/2017

OTHER PUBLICATIONS

Extended European Search Report for European Application No. 17192706.4-1003, dated Apr. 24, 2018, 15 pages.
(Continued)

*Primary Examiner* — Harry K Liu
(74) *Attorney, Agent, or Firm* — Kilpatrick Townsend & Stockton LLP

(57) ABSTRACT

Methods, apparatuses and computer programs are disclosed for estimating, or at least for generating information usable to estimate, the heading of at least one axis of interest of a rigid body. Rigid body is equipped with an antenna of a navigation satellite system (NSS) receiver, and with sensor equipment comprising sensors such as a gyroscope, an angle sensor, and accelerometers, depending on the form of the invention. Rigid body is subject to a known motion comprising causing a point's horizontal position to change, the point being referred to as "point B", while keeping another point's position, the point being referred to as "point A", fixed relative to the Earth. Considering the motion constraint, an estimation of the heading is generated using sensor equipment data and NSS receiver data. The estimation of the heading may for example be used to estimate the position of any point of rigid body.

21 Claims, 12 Drawing Sheets

(51) Int. Cl.
*G01C 15/06* (2006.01)
*G01C 19/34* (2006.01)

(58) Field of Classification Search
USPC .................................................. 342/357.32
See application file for complete search history.

(56) References Cited

U.S. PATENT DOCUMENTS

| | | | |
|---|---|---|---|
| 9,322,918 | B2 | 4/2016 | Vollath et al. |
| 9,562,975 | B2 | 2/2017 | Vollath et al. |
| 2011/0066375 | A1 | 3/2011 | France et al. |
| 2011/0153250 | A1* | 6/2011 | Bailey .................... G01C 17/38 702/94 |
| 2015/0268045 | A1 | 9/2015 | Dusha |
| 2018/0188032 | A1* | 7/2018 | Ramanandan .......... G01S 19/53 |
| 2019/0129044 | A1* | 5/2019 | Chen ....................... G01C 21/16 |
| 2020/0025942 | A1* | 1/2020 | Kassas .................... G01S 19/46 |

OTHER PUBLICATIONS

Scherzinger, B. M., "Inertial Navigator Error Models for Large Heading Uncertainty," Applied Analytics Corporation, Published in Proceedings of Position, Location and Navigation Symposium—Plans 1996, IEEE, pp. 477-484.

McKern, R. A., "A Study of Transformation Algorithms for Use in a Digital Computer," Massachusetts Institute of Technology, Jan. 1968, 94 pages.

NIMA Technical Report TR8350.2, "Department of Defense World Geodetic System 1984, Its Definition and Relationships With Local Geodetic Systems," Third Edition, Amendment 1, Jan. 3, 2000, 175 pages.

Savage, P. G., "Advisory Group for Aerospace Research & Development," AGARD Lecture Series No. 133, Advances in Strapdown Inertial Systems, Section 3.5.1, 229 Pages.

"Global Positioning Systems Directorate Systems Engineering & Integration Interface Specification," IS-GPS-200J, Authenticated May 22, 2018, 224 Pages.

* cited by examiner

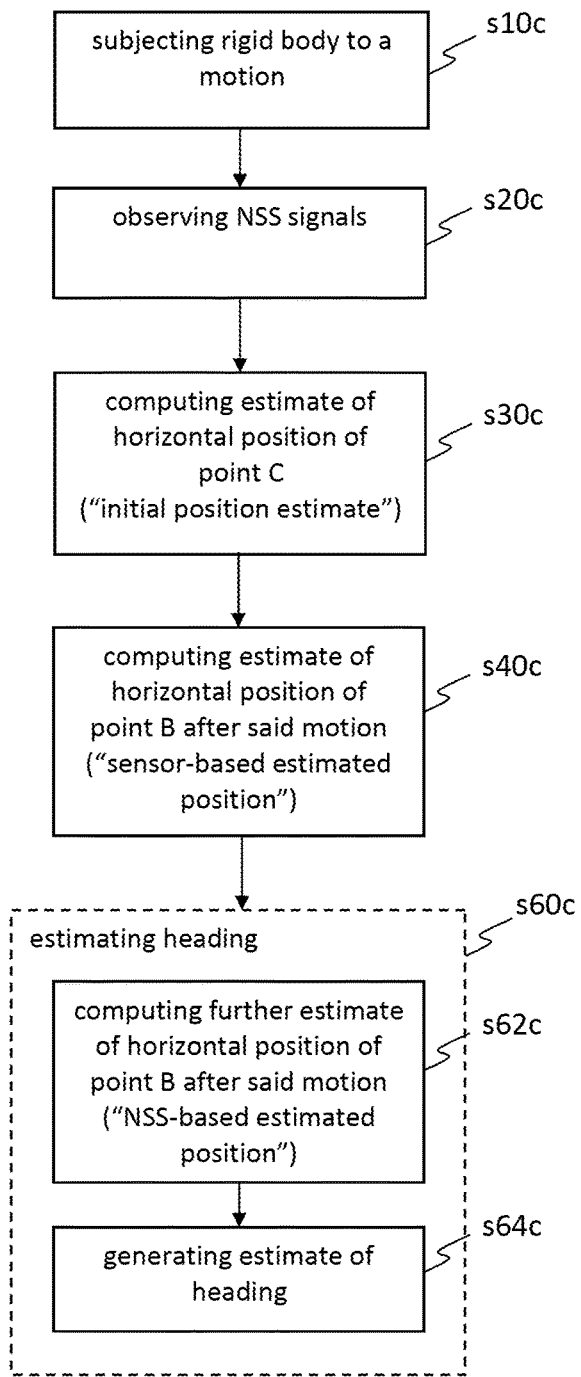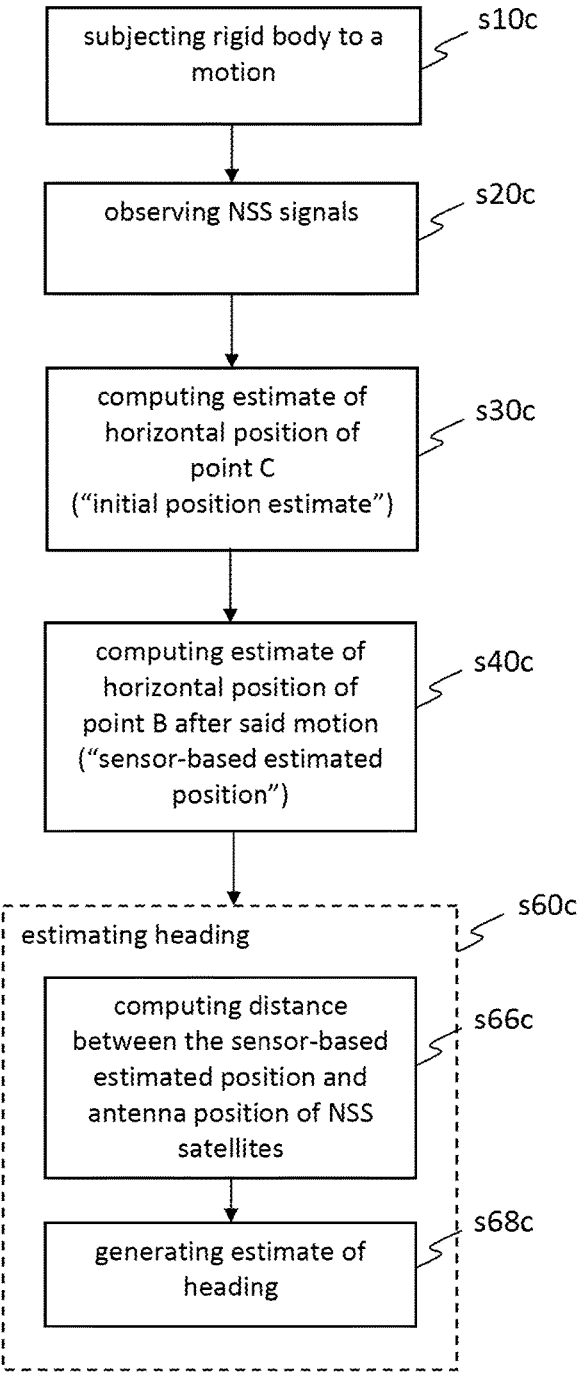
Fig. 10
Fig. 11

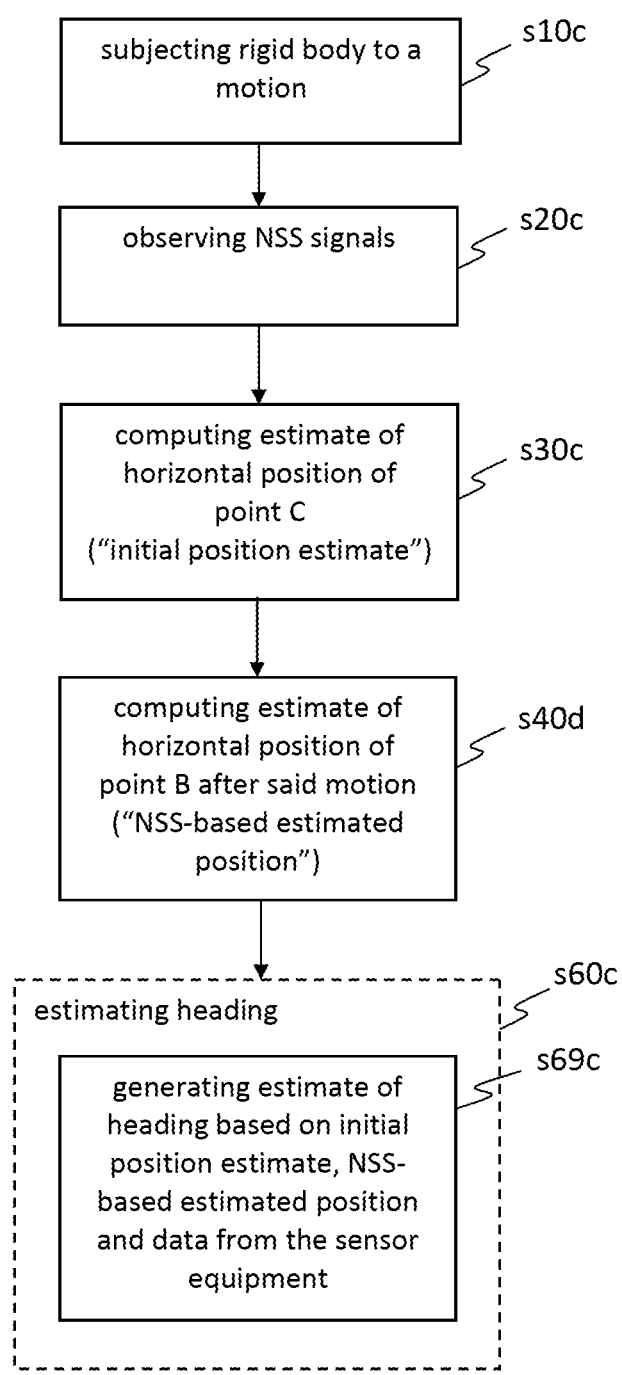
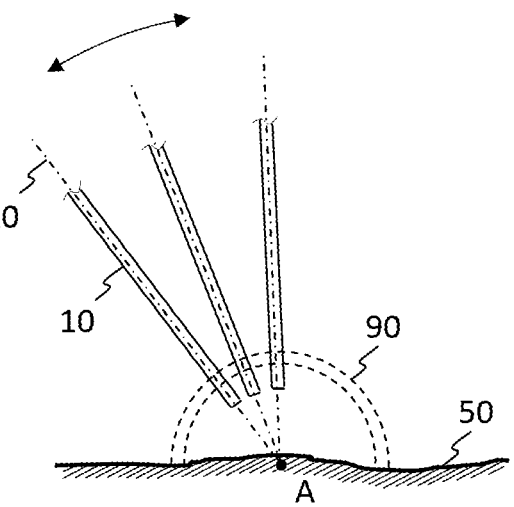
Fig. 15
Fig. 14

METHODS, APPARATUSES, AND COMPUTER PROGRAMS FOR ESTIMATING THE HEADING OF AN AXIS OF A RIGID BODY

CROSS-REFERENCE TO RELATED APPLICATIONS

This application claims priority to European Application No. EP17192706, filed Sep. 22, 2017, and European Application No. EP18195395, filed Sep. 19, 2018, the entire contents of both of which are incorporated herein by reference in their entirety for all purposes.

FIELD OF TECHNOLOGY

The invention relates to the field of navigation. More specifically, the fields of application of the methods, apparatuses, and computer programs of the invention include, but are not limited to, position and attitude determination, map-making, land surveying, civil engineering, machine control, agriculture, disaster prevention and relief, and scientific research.

BACKGROUND

Some navigation techniques involve an operator placing a range pole on an unknown point to estimate the position of the point. The range pole is equipped with a navigation sensor, such as for example a radio navigation receiver. The radio navigation receiver may for example be a roving antenna/receiver, or "GNSS total station". Position information may be recorded in a data collector using signals transmitted by a minimum number of satellites which are above the horizon. The satellite positions are monitored closely from earth and act as reference points from which an antenna/receiver in the field is able to determine position information. By measuring the travel time of signals transmitted from a number of satellites, the receiver is able to determine corresponding distances from the satellites to the antenna phase centre, and then the position of the antenna by solving a set of simultaneous equations. The roving antenna is typically carried atop a range pole which is held by the operator to provide a clear view of the sky. For differential systems, a vector or baseline is determined from a reference site to the rover. The roving antenna need not be within sight of the reference antenna. The need for a reference site is eliminated when a regional or global network of reference sites has been incorporated into the system, which allows the absolute position of the rover to be determined in a global geodetic reference frame such as the International Terrestrial Reference System (ITRF).

Surveyors may have to measure dozens or possibly hundreds of points during a typical work period. For each point, the survey pole, also known as "range pole", "rover pole", or "roving pole", must typically be oriented vertically over the ground point for a short time, and the survey point (or "stake-out" point when a physical mark is to be established) is registered by pressing a button on a handheld controller, which is typically connected to a global navigation satellite system (GNSS) receiver to store the point, i.e. to store positioning information associated with the point. Then, the surveyor has to move to the next point, and so on. This is a tedious procedure due to the effort required to keep the survey pole precisely vertical. The survey pole typically cannot be tilted during the so-called occupation of the survey point.

Independently from the above discussion, various techniques are available to estimate the heading of an axis of a rigid body with an inertial measurement unit (IMU) or an inertial navigation system (INS):

The gyrocompassing alignment technique requires high-quality, expensive sensors and typically implies a long averaging time, as described for example in P. D. Groves, "Principles of GNSS, inertial, and multisensor integrated navigation systems", Boston: Artech House, 2008 (hereinafter referred to as reference [1]), section 5.5.2.

The dynamic alignment technique requires significant manoeuvring, i.e. significant dynamical movement of the INS/GNSS navigation system, and good observability and estimation of heading error is not granted, as explained for example in ref. [1], section 12.2.1, paragraph 4. The basic configuration of a typical INS/GNSS navigation system is shown for example in ref. [1], chapter 12, fifth paragraph, and FIG. 12.1.

The heading estimation with multiple GNSS antennas fixed to the rigid body with horizontal separation between them is also known as "GNSS attitude determination" (ref. [1], section 12.4.2, paragraph 2). This is a complex and expensive technique, since multiple GNSS antennas are required.

GNSS track angle observation assumes a specific direction of the velocity in body-fixed coordinates in combination with significant speed.

Further heading initialization techniques (INS alignment) exist, such as the transfer alignment using velocity measurement matching (ref. [1], section 13.1.1, last paragraph), also known as velocity matching alignment. Heading may be estimated, but significant manoeuvring is also required (these techniques are typically for aircraft applications). In other words, perturbations (i.e. horizontal accelerations) are required to observe heading error. See also Titterton, D. H., and J. L. Weston, "Strapdown Inertial Navigation Technology", 2nd ed., Stevenage, U.K.: IEE, 2004 (hereinafter referred to as reference [2]), section 10.4.3.3, p. 296, third paragraph: "Whilst it is often recommended that the aircraft should perform a well-defined manoeuvre to aid the alignment process, such as the weave trajectory ( . . . ), analysis of the problem has shown that an alignment can often be achieved in the presence of relatively small perturbations, as would be experienced normally during flight."

The prior art also includes international application WO 2017/114577 A1 (hereinafter referred to as reference [2a]), which relates to determining a position using a surveying pole comprising a satellite positioning sensor and an inertial sensor. In an initialization phase, the ground point position and absolute heading are determined with respect to the geographic North using inertial data samples corresponding to at least three different pole inclinations (p. 3, line 33, to p. 4, line 3). The bottom end (FIG. 5, ref. 520) of the pole "is placed on the same ground point 140 during the entire process" and the coordinates of the top end (FIG. 5, ref. 550) of the pole "are determined by satellite positioning and the relative orientation of the pole by the inertial sensors" (p. 6, lines 22-26).

Ref. [2a] relies on "the ground point [being] accurately determined by obtaining at least two other ground point estimations at two different pole orientations, or attitudes" (p. 8, lines 31-33). "This is done by tilting the pole in different directions and estimating the ground point" for each of the pole orientations (p. 8, lines 33-34), the final estimation of the ground point being based on the result of at least three data sets (p. 8, line 34, to p. 9, line 1; p. 9, line 19; p. 11, lines 20-21). That is, a minimum of three ground point candidates resulting from three different tilting directions "are necessary in order to determine the final ground point value with certainty" (p. 10, lines 23-24).

Thus, the initialization in ref. [2a] requires a number of steps (see p. 15, lines 5-18, and following description of FIGS. 9 to 18): a position determination performed at a first fixed vertical position held during a predetermined time interval T1 (FIG. 9; p. 15, lines 19-30), changing the tilt (p. 15, line 33), a position determination performed at a second fixed position during a predetermined time interval (FIG. 10; p. 15, line 34 to p. 16, line 1), changing the tilt (p. 16, line 13), a position determination performed at a third fixed position during a predetermined time interval (FIG. 11; p. 16, lines 14-16), etc.

There is a constant need for improving navigation techniques, so as notably to increase the productivity of these techniques and remove constraints placed on field procedures.

SUMMARY

The present invention aims at addressing, at least partially, the above-mentioned need. The invention includes methods, apparatuses, computer programs, computer program products, and computer readable mediums as defined in the independent claims. Particular embodiments are defined in the dependent claims.

In a first form of the invention, a method is provided for estimating, or at least for generating information usable to estimate, the heading of at least one axis of interest of a rigid body. The rigid body is equipped with an antenna of a navigation satellite system (NSS) receiver. The phase center of the antenna is located at a point, hereinafter referred to as "point B", which is away from another point, hereinafter referred to as "point A". Point A is either a point of the rigid body or, alternatively, a point that is at a fixed position with respect to the rigid body. Further, the rigid body is equipped with sensor equipment comprising at least one of: a gyroscope and an angle sensor, said angle sensor measuring the rotation of the rigid body about an Earth-fixed axis. The method comprises the following steps: The rigid body is subjected to a motion causing point B's horizontal position to change while keeping point A's position fixed relative to the Earth. During said motion, the NSS receiver observes a NSS signal from each of a plurality of NSS satellites. The method also comprises the following operations, which are carried out by at least one of: the NSS receiver, the sensor equipment, and a processing entity capable of receiving data from the NSS receiver and the sensor equipment: (i) estimating the orientation, during said motion, of a body frame of the rigid body with respect to a reference frame, based on data from the sensor equipment; (ii) computing at least two coordinates of a velocity vector (hereinafter referred to as "sensor-based velocity vector"), in the reference frame, of point B, based on the estimated orientation and on data from the sensor equipment, wherein the at least two coordinates are two coordinates containing information about the motion of point B in two independent directions in the local horizontal plane; and (iii) based on the at least two coordinates of the sensor-based velocity vector and on the NSS signals observed during said motion, performing at least one of: (a) generating information usable to estimate the heading of the at least one axis of interest; and (b) estimating the heading of the at least one axis of interest.

In a second form of the invention, a method is also provided for estimating, or at least for generating information usable to estimate, the heading of at least one axis of interest of a rigid body. The rigid body is also equipped with an antenna of a NSS receiver, and the phase center of the antenna is located at a point, hereinafter referred to as "point B", which is away from another point, hereinafter referred to as "point A". Point A is either a point of the rigid body or, alternatively, a point that is at a fixed position with respect to the rigid body. Further, the rigid body is equipped with sensor equipment comprising at least one of: (a) a gyroscope, (b) an angle sensor measuring the rotation of the rigid body about an Earth-fixed axis, and (c) two accelerometers. The method comprises: subjecting the rigid body to an uninterrupted motion causing point B's horizontal position to change while keeping point A's position fixed relative to the Earth; and observing, by the NSS receiver, a NSS signal from each of a plurality of NSS satellites during said motion. Furthermore, the method comprises the following operations, which are carried out by at least one of: the NSS receiver, the sensor equipment, and a processing entity capable of receiving data from the NSS receiver and sensor equipment: (i) estimating the orientation, at two different points in time, of a body frame of the rigid body with respect to a reference frame, based on data from the sensor equipment, wherein the rigid body is subject to the motion at least during a period of time between the two different points in time and the rigid body is subject to no other motion between the two points in time; (ii) computing at least two coordinates of a delta-position vector (hereinafter referred to as "sensor-based delta-position vector"), in the reference frame, of point B, based on the estimated orientation and on data from the sensor equipment, wherein the at least two coordinates are two coordinates containing information about the motion of point B in two independent directions in the local horizontal plane; and (iii) based on the at least two coordinates of the sensor-based delta-position vector and on the NSS signals observed during said motion, and using a computation method which does not, as such, necessitate the use of NSS signals observed during any other motion, performing at least one of: (a) generating information usable to estimate the heading of the at least one axis of interest; and (b) estimating the heading of the at least one axis of interest.

In a third form of the invention, a method is also provided for estimating, or at least for generating information usable to estimate, the heading of at least one axis of interest of a rigid body. The rigid body is equipped with an antenna of a NSS receiver. The phase center of the antenna is located at a point, hereinafter referred to as "point B", which is away from another point, hereinafter referred to as "point A". Point A is either a point of the rigid body or, alternatively, a point that is at a fixed position with respect to the rigid body. Further, the rigid body is equipped with sensor equipment comprising at least one of: (a) a gyroscope, (b) an angle sensor measuring the rotation of the rigid body about an Earth-fixed axis, and (c) two accelerometers. The method comprises the following steps: subjecting the rigid body to an uninterrupted motion causing point B's horizontal position to change while keeping point A's position fixed relative to the Earth; and observing, by the NSS receiver, a NSS signal from each of a plurality of NSS satellites at least at a first point in time and at a second point in time, wherein the rigid body is subject to the motion at least during part of the period of time between the first and second points in time and the rigid body is subject to no other motion between the first and second points in time. Furthermore, the method comprises the following operations, which are carried out by at least one of: the NSS receiver, the sensor equipment, and a processing entity capable of receiving data from the NSS receiver and sensor equipment: (i) computing an estimate (hereinafter referred to as "initial position estimate") of the horizontal position, or of a position usable to derive the horizontal position, of a point, hereinafter referred to as "point C", at the first point in time, based on the NSS signals observed at least at the first point in time, wherein point C is: (a) point A (i.e., the same as point A); (b) point B (i.e., the same as point B); or (c) another point being either a point of the rigid body or, alternatively, a point that is at a fixed position with respect to the rigid body; and (ii) based on the initial position estimate, data from the sensor equipment, and the observed NSS signals, and using a computation method which does not, as such, necessitate the use of NSS signals observed before the first point in time, between the first and second points in time, or after the second point in time, performing at least one of: (a) generating information usable to estimate the heading of the at least one axis of interest; and (b) estimating the heading of the at least one axis of interest.

In the three above-discussed forms of the invention, a heading estimation method is provided in which the motion of the rigid body is constrained in a known way, the motion comprising a change in point B's horizontal position while keeping point A's position fixed relative to the Earth. Doing so, together with sensor equipment data and NSS receiver data, improves the estimation of the heading in terms of efficiency, accuracy, and simplicity. Heading estimation can remove constraints on field procedures, for example, maintaining a vertical survey pole during occupation of a survey point.

The invention also relates, in some embodiments, to apparatuses for performing at least the estimating, computing, and generating operations of the above-described methods.

The invention also relates, in some embodiments, to computer programs, computer program products, computer-readable mediums, and storage mediums for storing such computer programs, comprising computer-executable instructions for carrying out, when executed on a computer such as for example one embedded in a survey apparatus or connected thereto, the above-mentioned methods.

BRIEF DESCRIPTION OF THE DRAWINGS

Embodiments of the present invention shall now be described, in conjunction with the appended drawings in which:

FIG. 1b schematically illustrates a top view of the rigid body of FIG. 1a;

FIG. 2b schematically illustrates a top view of the motion of FIG. 2a;

FIGS. 10 and 11 are flowcharts of methods in two embodiments of the third form of the invention;

FIG. 12b schematically illustrates a top view of the motion of FIG. 12a;

FIG. 13b schematically illustrates a top view of the motion of FIG. 13a;

FIG. 14 is a flowchart of a method in one embodiment of the third form of the invention;

FIG. 15 schematically illustrates a side view of a portion of a rigid body, in one embodiment of the invention, wherein point A is located outside the rigid body at a fixed position with respect thereto;

DETAILED DESCRIPTION

Figure 1A:
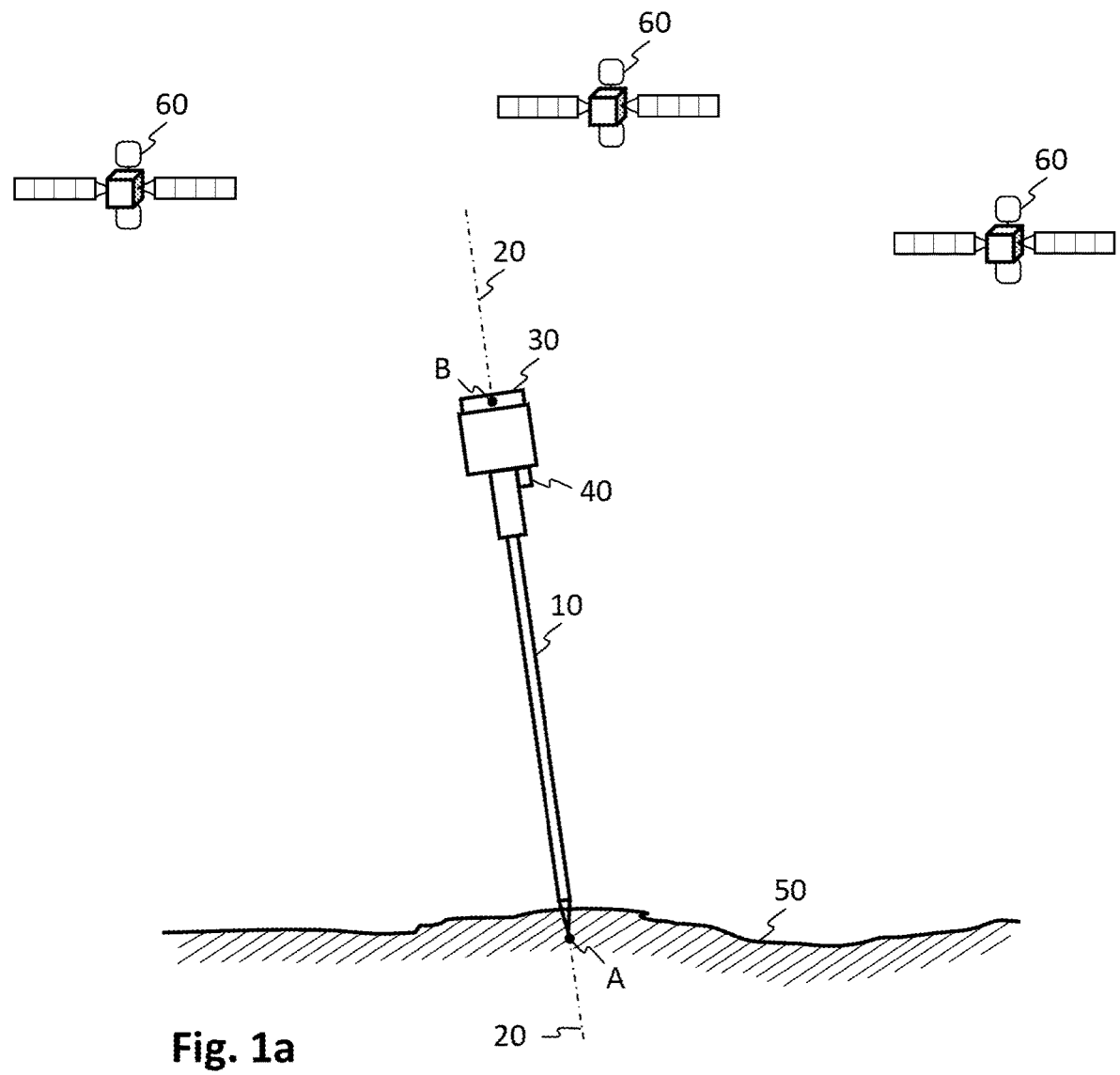
FIG. 1a schematically illustrates a side view of a rigid body, of which the heading of at least one axis of interest may be estimated in one embodiment of the invention.

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

As used herein, the term "operator" includes, but is not limited to, a human, or a robot programmed to perform functions as described herein (e.g. subjecting rigid body 10 to motion).

Furthermore, the term navigation satellite system (NSS) receiver covers both regional NSS (RNSS) and global NSS (GNSS) receivers. Systems using ground-based pseudolites to either enhance an NSS or as a substitute for satellites in an NSS are also considered covered in the term NSS.

Yet furthermore, the term "heading" is well known in the art, including in the field of navigation and the sub-fields of position and attitude determination. The heading, also called yaw angle or yaw rotation, is one of three angles defining the three-dimensional attitude in the context of attitude determination. It measures the angle or rotation about a vertical axis. In that respect, see for example B. Hofmann-Wellenhof, H. Lichtenegger, J. Collins, "Global Positioning System Theory and Practice", Fifth, revised edition, Springer-Verlag/Wien, 2001, ISBN:3-211-83534-2 (hereinafter referred to as reference [2b]), p. 326 in section "Attitude determination" ("Attitude is defined as the orientation of a specific body frame attached to a land vehicle, ship or aircraft with respect to a reference frame which is usually a north, east, and up local level frame. The parameters used to define three-dimensional attitude are r, p, y, the angles for roll, pitch, and yaw (or heading)."). This is further discussed below and illustrated with reference to FIG. 1b.

Further, when it is herein stated that operations are carried out by at least one of: an NSS receiver, sensor equipment, and a processing entity capable of receiving data from the NSS receiver and sensor equipment, this means that the operations may be carried out not only by a processing entity distinct from both the NSS receiver and the sensor equipment, but may also be carried out, in part or full, by the NSS receiver and/or the sensor equipment, i.e. by computing means integrated within the NSS receiver and/or sensor equipment. NSS receivers and sensor equipment typically have integrated processing capabilities.

Purely as an example, in relation to the first form of the invention, sensor equipment 40 may perform steps s30a and s40a exclusively based on data at its disposal, after which a processing entity distinct from both the NSS receiver and the sensor equipment may then be in charge of performing steps s50a and/or s60a. Alternatively, sensor equipment 40 may perform steps s30a and s40a based on data at its disposal, sensor equipment 40 may receive data from the NSS receiver, and sensor equipment 40 may then be in charge of performing steps s50a and/or s60a. As yet another exemplary alternative, the NSS receiver may receive data from sensor equipment 40, and may perform all of steps s30a, s40a, and s50a and/or s60a.

Thus, stating herein that operations are carried out by at least one of: an NSS receiver, sensor equipment 40, and a processing entity capable of receiving data from the NSS receiver and sensor equipment 40, means that operations may be performed by any one of, or by more than one of, the NSS receiver, sensor equipment 40, and a processing entity distinct from both the NSS receiver and sensor equipment 40, provided that the entity performing the operation has at its disposal, or receives from another entity, the required data to perform the operation.

FIG. 1a schematically illustrates a side view of a rigid body 10, of which the heading of at least one axis 20 of interest may be estimated in one embodiment of the invention. Rigid body 10 may have any shape or form. Rigid body 10 may for example hold a gun in the form of a weapon, a camera, an optical scanner, or may be rigidly attached to such devices, and the purpose of estimating the heading may therefore amount to estimating the heading of the frame of such devices, respectively. As another example, rigid body 10 may be a survey pole, and the goal of estimating the heading may be to assist the survey pole's operator to find out in which direction to walk in order to reach the next point to stake out. As another example using a survey pole, the ultimate goal of estimating the heading may be to determine the position of the tip of the pole when the pole is tilted from the vertical during the occupation of a survey point due to the proximity of the survey point from obstacles preventing a vertical alignment. In general, the estimation of the heading may for example be used to estimate the position of any point of rigid body 10.

Rigid body 10 is equipped with an antenna 30 of a NSS receiver. That is, antenna 30 is one component of the NSS receiver. Other components of the NSS receiver (such as for example a data processor, a data storage unit, a user interface, and a battery), which are not illustrated on FIG. 1a, may be arranged on rigid body 10 and/or away therefrom (e.g., in a backpack). If the NSS receiver comprises component(s) arranged away from rigid body 10, the system may be arranged so that data can be transmitted from rigid body 10 to the component(s) arranged away therefrom. Data may for example be transmitted through a wire (or cable) or wirelessly.

The antenna's 30 phase center is located at point B, which is shown in FIG. 1a as being near or on the uppermost surface of rigid body 10. The antenna's 30 phase center may for example be its "mechanical phase center" (i.e., the physical point on the antenna element's surface connected to electronic components) or the so-called "nominal phase center" onto which signals impinging on frequency-specific "electrical phase centers" can be reduced. The nominal phase center may be defined at the mechanical phase center. All these terms are commonly used in the art.

Point B is located away from point A, which is shown in FIG. 1a to be at or near the lowermost point of rigid body 10, such as for example at the tip of the survey pole. Rigid body 10 is placed over the ground, with the tip of rigid body 10 contacting the ground. The ground may for example be the surface of the Earth 50. Rigid body 10 may also be placed over another surface, such as for example over a building's roof, a bridge, etc. Alternatively, rigid body 10 may be rigidly or rotatably attached to slow-moving construction equipment such as an excavator, a bulldozer, a crane, etc., and in particular to a top part thereof, so as to allow the reception of NSS signals by antenna 30. By "slow-moving", it is meant that the vehicle needs to substantially stand still, so that at least one rotation axis is Earth-fixed. This rotation axis is either part of the vehicle, in which case the navigation system is rigidly attached to a rotating platform of the vehicle, or the navigation system is rotatably attached to the vehicle.

In FIG. 1a, point A is shown as being a point of rigid body 10, i.e. a point located on the outer surface of rigid body 10 or a point in rigid body 10. Alternatively, point A may be located outside rigid body 10 provided that, at least during the motion discussed further below, point A remains at a fixed position with respect to rigid body 10. In that respect, FIG. 15 schematically illustrates an exemplary configuration in which point A is located outside rigid body 10, at a fixed position with respect thereto. Namely, rigid body 10 of FIG. 15 is allowed to rotate (as illustrated by the double-headed arrow on FIG. 15) but is constrained by another element 90, such as for example a suitable semicircular rail through which rigid body 10 is inserted, in such a manner that point A remains on axis 20 at a constant distance from the bottom part of rigid body 10. In other words, point A is constrained to remain at a fixed position with respect to rigid body 10.

Rigid body 10 is further equipped with sensor equipment 40, which will be described further below when discussing different forms and embodiments of the invention. The arrangement of sensor equipment 40 on rigid body 10 is not limited to that illustrated by FIG. 1a. That is, FIG. 1a merely illustrates a non-limiting example of possible arrangement.

Figure 1B:
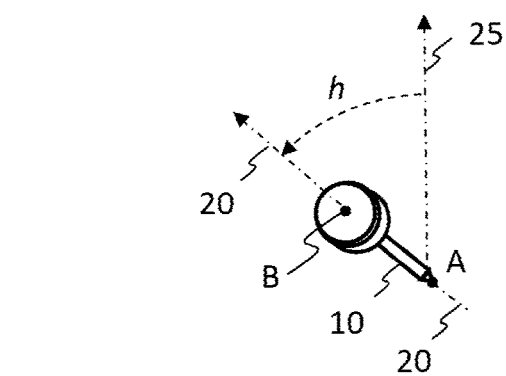

FIG. 1b schematically illustrates a top view of the rigid body 10 of FIG. 1a. The heading of axis 20 is illustrated by the arrow terminating the representation of axis 20 on the drawing. The heading of axis 20 is the direction into which axis 20 is pointing in the local horizontal plane. It may for example be expressed as an angle h with respect to a reference direction 25 in the local horizontal plane, or expressed as the azimuth angle with respect to a desired local level reference frame.

Figure 2A:
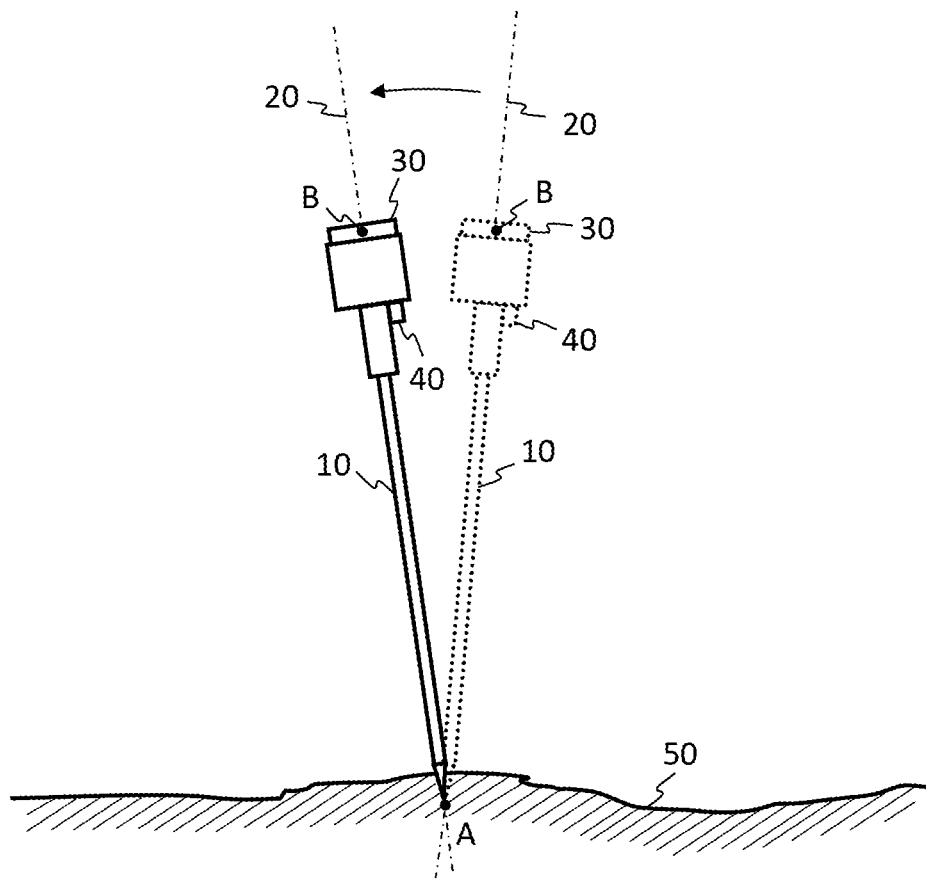
FIG. 2a schematically illustrates the rigid body of FIG. 1a while being subjected to a motion in accordance with one embodiment of the invention.
Figure 2B:
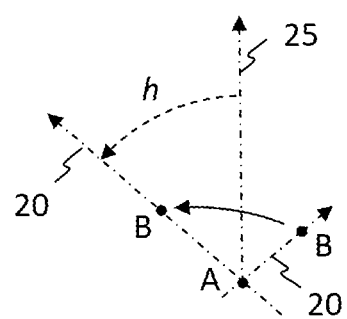

FIG. 2a schematically illustrates the rigid body 10 of FIG. 1a being subjected to an exemplary motion in one embodiment of the invention. Namely, rigid body 10 is shown at two points in time, using dotted lines when at a first point in time (exemplary starting point of the motion) and using solid lines when at a second point in time (exemplary ending point of the motion). FIG. 2b schematically illustrates a top view of the motion. As illustrated by FIGS. 2a and 2b, point A's position is kept fixed relative to the Earth 50 during the motion. An operator (not illustrated in the drawings) may cause rigid body 10 to move. Alternatively, the motion may be caused by other means, such as for example a mechanical actuator, or the like. In the case of a rigid body 10 being a survey pole moved by an operator, the survey pole is typically designed so that antenna 30 is above the operator's head for best satellite visibility (not illustrated in the drawings).

The NSS receiver's antenna 30 is configured to receive one or more positioning signals, such as for example a GPS signal (such as the L1, L2 or L5 signal), a GLONASS signal, a Galileo signal, a BeiDou (BDS) signal, a QZSS signal, an IRNSS signal, or any combination thereof. In other words, antenna 30 is configured to receive signals at the frequencies broadcasted by satellites 60. If a given NSS satellite 60 emits more than one NSS signal, antenna 30 may receive more than one NSS signal from said NSS satellite 60. Furthermore, antenna 30 may receive NSS signals from a single NSS or, alternatively, from a plurality of different NSS. Multiple antennas 30 may be arranged on rigid body 10. If NSS receiver's antenna 30 is configured to receive signals at a plurality of frequencies, there may be one electrical antenna phase centre (APC) per frequency, i.e. in total a plurality of APCs. Likewise, there are a plurality of APCs if a plurality of antennas are arranged on rigid body 10. The methods are described in the present document for a single APC—and NSS signals and measurements—associated with a single frequency. However, the methods, using antenna phase correction tables if required as practiced in the art, may also be applied for a plurality of APCs—and corresponding NSS signals and measurements—associated with different frequencies in parallel, making use of the same motion and sensor equipment data.

Figure 3C:
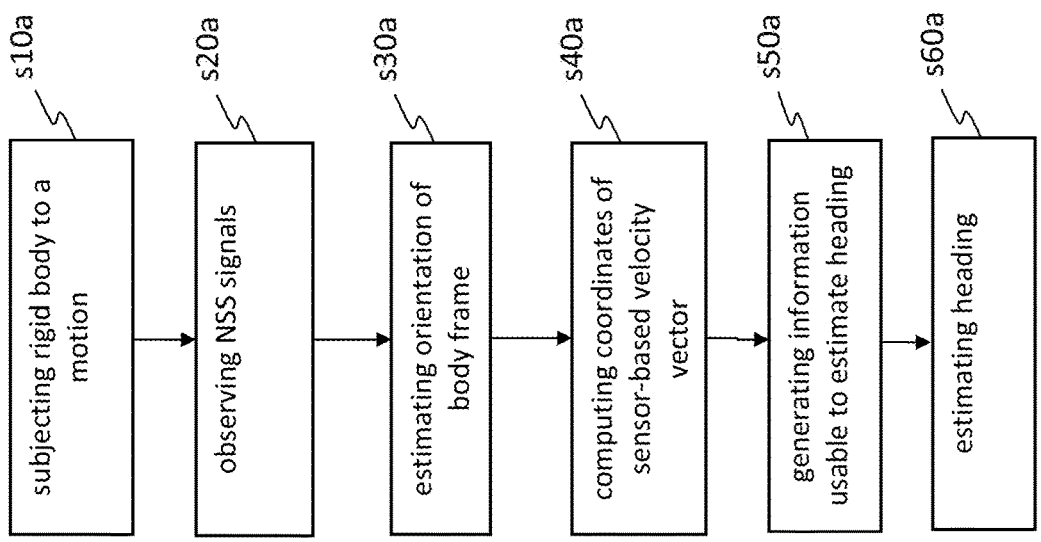
FIGS. 3a, 3b, and 3c are flowcharts of methods in three embodiments of a first form of the invention.
Figure 3B:
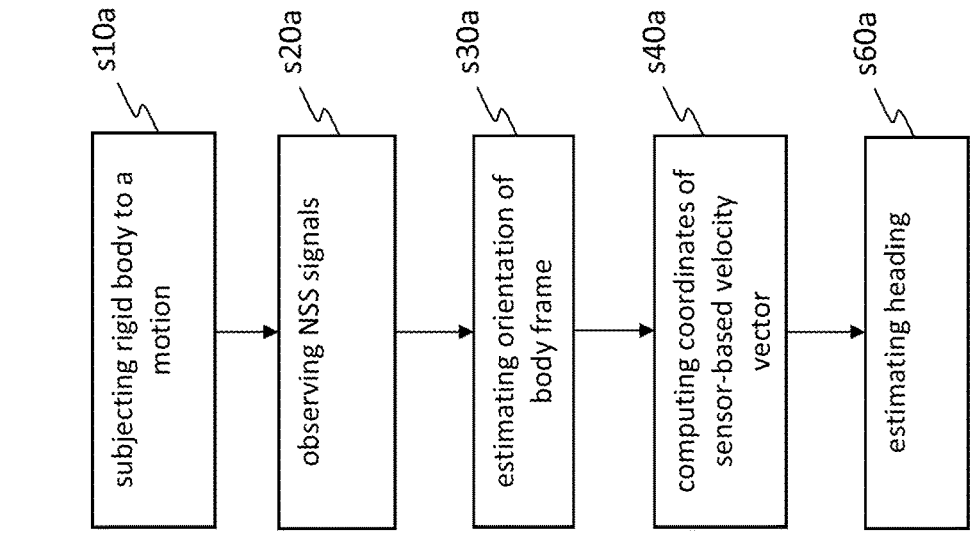
Figure 3A:
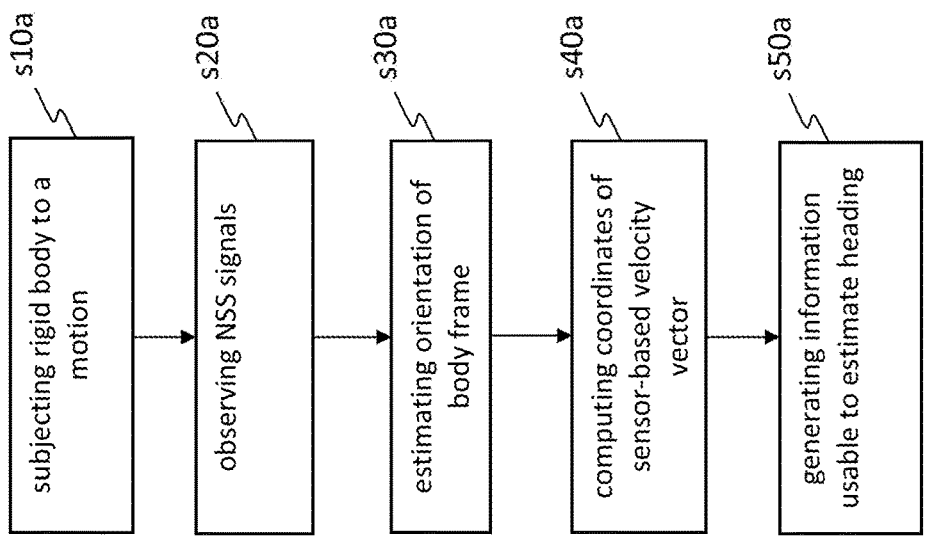

FIGS. 3a, 3b, and 3c are three flowcharts of methods in three embodiments of a first form of the invention, respectively. This first form of the invention can be broadly described, in some embodiments, as a method for estimating heading with at least, on the one hand, a known motion constraint and, on the other hand, (i) range rate measurements of the NSS receiver or (ii) NSS receiver measurements, which are usable to compute these range rate measurements (that is, NSS signals observed during the motion).

Range rate measurements may either be Doppler NSS measurements or time-differenced delta range measurements. A range rate measurement or information usable to compute this measurement may be generated by the NSS receiver based on the NSS signals using prior art techniques. See for example E. D. Kaplan and C. J. Hegarty, "Understanding GPS: principles and applications", 2nd ed., Artech House, 2006 (hereinafter referred to as reference [3]). The NSS receiver acquires and tracks NSS signals from space vehicles (satellites). This technique is explained for example for a GPS receiver in ref. [3], chapter 5. The NSS receiver generates pseudorange, delta pseudorange and Doppler measurements from observations of the NSS signals, as is described for a GPS receiver in ref. [3], section 5.7. Further details are given for example in "Global Positioning Systems: Theory and Applications, Volume I", Edited by B. W. Parkinson, J. J. Spilker Jr., 1996, (hereinafter referred to as reference [4]), Chapter 7 "Fundamentals of Signal Tracking Theory".

The motion constraint is, at minimum, that rigid body 10 rotates about an Earth-fixed point A, and the distance between point B and point A is larger than zero and is known or obtained. For a rigid body 10 being a survey pole, the distance between point B and point A may for example be a value comprised between 0.5 and 2.5 meters, and in particular about 2 meters. This motion constraint is here referred to as "motion constraint (MC-A)".

The method of FIG. 3a outputs information usable to estimate the heading of axis 20 of rigid body 10, without necessarily estimating the heading per se. In contrast, the method of FIG. 3b outputs an estimate of the heading of axis 20. The method of FIG. 3c generates information usable to estimate the heading of axis 20, and then also outputs an estimate of the heading.

In the following description, the methods according to embodiments of the invention will be explained by focusing on estimating, or generating information usable to estimate, the heading of a single axis 20 of rigid body 10. However, the methods may also lead to estimating, or generating information usable to estimate, the heading of a plurality of axes of rigid body 10. The methods may as well lead to estimating the heading of one or more axes of rigid body 10, and at the same time generating information usable to estimate the heading of one or more other axes of rigid body 10. That is, the methods generate information usable to estimate all orientation parameters of a body frame of rigid body 10. For example, while using the method to generate information to estimate the heading of the axis passing through points A and B (providing the axis is not vertical in which event heading is not defined), the optical axis of a lens or the optical axes of multiple lenses of a camera attached to rigid body 10 in any fixed orientation may be considered the axis or axes of interest, and the full orientations including headings of the camera axes are simultaneously determined.

As explained above with reference to FIGS. 1a, 1b, 2a, and 2b, rigid body 10 is equipped with an NSS receiver antenna 30. The phase center thereof is located at point B, which is away from point A. Point A is either a point of rigid body 10 or a point being at a fixed position with respect to rigid body 10. Further, in the first form of the invention, rigid body 10 is equipped with sensor equipment 40 comprising at least one of: a gyroscope, and an angle sensor, said angle sensor being arranged to measure the rotation of rigid body 10 about an Earth-fixed axis. In one embodiment, sensor equipment 40 comprises a single gyroscope and no angle sensor. In another embodiment, sensor equipment 40 comprises a single angle sensor and no gyroscope. In yet another embodiment, sensor equipment 40 comprises both an angle sensor and a gyroscope. In a further embodiment, sensor equipment 40 comprises an IMU, i.e. it comprises three gyroscopes and three accelerometers.

In the method of FIG. 3a, rigid body 10 is subjected s10a to a motion causing point B's horizontal position to change while keeping point A's position fixed relative to the Earth 50. That is, the motion comprises a change of point B's horizontal position while keeping point A's position fixed relative to the Earth 50. Point A may be temporarily fixed (i.e., fixed during the motion and then released) or, alternatively, constantly fixed. During said motion, the NSS receiver, whose antenna 30 forms part of rigid body 10 or is rigidly attached thereto (or, alternatively, is rotatably attached to rigid body 10 but with point B being on the rotation axis), observes s20a a NSS signal from each of a plurality of NSS satellites 60. During the motion, a clear view of the sky is therefore preferred.

The motion may for example comprise: (i) an increase in tilt of axis 20 from 5 degrees to 15 degrees; (ii) a decrease in tilt of axis 20 from 15 degrees to 5 degrees; (iii) a rotation about an axis passing through point A, said axis being different from axis 20; (iv) a rotation about an axis passing through point A, said axis being different from axis 20, followed by a tilt increase or decrease; and (v) a rotation about an axis passing through point A, said axis being different from axis 20, combined with a tilt increase or decrease. Any type of motion causing point B's horizontal position to change while keeping point A's position fixed relative to the Earth 50 may be considered, provided that, during said motion, antenna 30 is oriented so that a NSS signal can be observed. The set of NSS satellites 60 from which the NSS signal can be observed may change during the motion generally without negatively affecting the effectiveness of the method (this statement being applicable to the first, second, and third forms of the present invention).

The method further comprises at least the following operations (referred to as steps s30a, s40a, and s50a), carried out by (a) the NSS receiver, (b) sensor equipment 40, (c) a processing entity capable of receiving data from the NSS receiver and sensor equipment 40, or (d) by a combination of the above-referred elements, i.e. by elements (a) and (b), by elements (a) and (c), by elements (b) and (c), or by elements (a), (b), and (c).

In step s30a, the orientation, during said motion (i.e., during at least a period within the time interval during which the motion takes place), of a body frame of rigid body 10 with respect to a reference frame is estimated based on data from sensor equipment 40. In this estimate of the orientation outputted in step s30a, there is still an unknown heading error, or the reference frame differs from the desired reference frame for heading by an unknown transformation. Namely, in step s30a, only the roll and pitch of rigid body 10 is estimated based on the sensor equipment data. An estimated value for the heading may be generated, but it either contains a potentially large error or it is defined with respect to a frame with unknown orientation about the vertical. That is, an estimated value in a wander frame (also called wander azimuth frame, or wander angle navigation frame) with unknown wander angle may be generated. In this case, the problem of estimating heading becomes a problem of estimating this wander angle.

In step s40a, at least two coordinates of a velocity vector (here referred to as "sensor-based velocity vector"), in the reference frame, of point B, are computed based on the orientation estimated in step s30a and on data from sensor equipment 40. The at least two coordinates are two coordinates containing information about the motion of point B in two independent directions in the local horizontal plane, such as for example the horizontal coordinates of a geographic frame or a wander frame, or the coordinates in the directions of the two base vectors perpendicular to the Earth rotation rate vector of an Earth-fixed frame, if the method is used at middle or high latitudes.

Then, in step s50a, information usable to estimate the heading of axis 20 is generated, based on the at least two coordinates of the sensor-based velocity vector and the NSS signals observed during said motion. Two embodiments of such a computation method, and variants of these two embodiments, are described with reference to embodiments CL2 and CL3 below. These embodiments and variants thereof all rely on a minimal motion-based approach not requiring any interruption of the motion to which the rigid body is subjected. A concept common to these embodiments and variants thereof is that at least two coordinates of the sensor-based velocity vector are tested using information about the motion of point B contained in the NSS signals. The heading error in the computation of the sensor-based vector is estimated based on observed discrepancies of (a) NSS signals or derived quantities based on these NSS signals and (b) comparable "computed measurements" based on least two coordinates of the sensor-based velocity vector. See e.g. equation (16) where velocity vector azimuth angles are compared in order to observe the heading error, and equation (19) where scalar line-of-sight velocities are compared and related to the heading error by equation (20).

The method of FIG. 3b differs from that of FIG. 3a in that the method of FIG. 3b does not necessarily comprise step s50a, but comprises step s60a. In step s60a, the heading of axis 20 is estimated based on the at least two coordinates of the sensor-based velocity vector and the NSS signals observed during said motion. Two embodiments of such a computation method, and variants of these two embodiments, are described with reference to embodiments CL2 and CL3 below.

The method of FIG. 3c combines the methods of FIGS. 3a and 3b. That is, the method of FIG. 3c comprises, based on the at least two coordinates of the sensor-based velocity vector and the NSS signals observed during said motion, generating s50a information usable to estimate the heading of axis 20, and estimating s60a the heading of axis 20 as well.

Steps s30a to s60a may potentially be carried out as post-processing steps, i.e. after the actual motion. These steps do not have to be carried out in real-time. That is, these steps neither have to be carried out during nor immediately after the motion.

Thus, as apparent from the above, steps s50a and/or s60a, whichever is or are applicable, are necessarily performed after the motion (to which rigid body 10 is subjected in step s10a) has at least started and has been ongoing for a non-null duration, and, in one embodiment, steps s50a and/or s60a may be performed after the motion. Without the motion, there can be no sensor-based velocity vector and no NSS signals observed during said motion. Once estimated at one point in time, the heading is implicitly known, i.e. can be computed, for previous points in time during the motion. Further, if the motion is still ongoing when steps s50a and/or s60a are performed, the estimated heading is effectively an estimated instantaneous heading, i.e. an estimation of the heading at one point in time, and the estimated value may then be continuously tracked.

Now, an exemplary implementation of the above-referred method according to the first form of the invention will be further described with reference to FIG. 3c.

In the following, Cartesian frames are used as body frame and reference frame(s) for defining orientation of rigid body 10, but any type of frame that allows defining three-dimensional vectors can be used as well.

The orientation of a body frame with respect to a reference frame computed in step s30a may be parametrized as three orientation angles (such as Euler angles or Tait-Bryan angles), a quaternion, a rotation vector, a direction-cosine matrix (DCM) or any choice of suitable parameters. All these representations of orientation allow the determination of the heading of an axis of interest defined with respect to the body frame. In the following, the orientation is parametrized as a DCM.

The orientation of the reference frame in step s30a with respect to the Earth may be known or may be computed from other known values. It may for example be the Earth-centered Earth-fixed frame (ECEF), or a geographic frame (such as the North-East-Down (NED) or East-North-Up (ENU) frames), or a wander frame with a known wander angle. The reference frame in step s30a may also be a wander frame but with unknown wander angle, in which case the wander angle will be estimated. In the following, the reference frame in step s30a is chosen as being a wander frame.

The body frame may be defined from three mutually perpendicular axes, such as for example: (i) an input axis of sensors attached to rigid body 10, the axis passing through points A and B, and another axis perpendicular to the first two axes; (ii) an input axis of sensors attached to rigid body 10, and two other axes perpendicular to the first axis; (iii) two mutually perpendicular input axes of sensors attached to rigid body 10, and the axis passing through points A and B; (iv) two mutually perpendicular input axes of sensors attached to rigid body 10, and another axis perpendicular to the first axis; or (v) three mutually perpendicular input axes of sensors attached to rigid body 10. It may also be defined in any other way (e.g. by rotation of another body frame), provided that vectors can be defined in this frame that correspond to the input axes of the sensors and the axis passing through points A and B (i.e. are aligned with these axes). The coordinates of these vectors in the body frame are constant.

The orientation of the body frame with respect to the wander frame during the motion can be computed in step s30a by propagating the orientation in time, starting from an earlier, initial orientation. Alternatively, it can be computed in post-processing in another way, for example by propagating the orientation backwards in time, starting from an orientation at the end of the post-processing time interval. In the following, only forward-processing is considered, although the invention is not limited thereto.

The initial orientation of the body frame with respect to the wander frame in step s30a can be computed from initial values of roll and pitch angles of the body frame (or of another frame with a known orientation with respect to the body frame) with respect to the wander frame. In some embodiments, these values of roll and pitch angles are known. In other embodiments, they are computed from the measurements of two single-axis accelerometers or one dual-axis accelerometer measuring gravity in two independent, non-vertical directions. By two accelerometers, it is here meant any sensor assembly measuring specific force about two axes, and, by three gyroscopes, it is here meant any sensor assembly measuring inertial angular rate about three axes. Microelectromechanical systems (MEMS) accelerometers and gyroscopes are often combined for x-y measurements in a single integrated circuit (IC). Mechanical gyroscopes also exist in single-DOF (degree of freedom) and dual-DOF variants, that is sensors with one or two input axes, as described for example in ref. [2], chapter 4, with examples being the sensors described in sections 4.4.2 and 4.2.6.

In embodiments with two or more accelerometers, the initial roll and pitch and the initial orientation of the body frame may be computed from accelerometer measurements at a point in time before the motion, when rigid body 10 is substantially standing still, and the accelerometers measure gravity. Alternatively, the accelerometers may be installed close to the Earth-fixed point A, or on an Earth-fixed rotation axis (which exists in some embodiments), so that they can be used to measure gravity during the motion.

Although the initial heading of the body frame, or of another frame with a known orientation with respect to the body frame, and the wander angle of the wander frame is set, there is no information on heading generated at this point. For example, the initial heading can be set to an approximate value with an unknown error and the true initial heading is considered unknown. It can also be set to a predefined value, such as zero. The error contained in the initial heading, the initial orientation of the body frame (with respect to the wander frame, as mentioned above) and all other quantities derived from the initial heading, can be modelled and estimated by applying state estimation, e.g. an Extended Kalman filter. Alternatively, the wander angle can be set to an approximate or predefined value with an unknown error and the true wander angle is considered unknown.

This gives an initial orientation of the body frame (with unknown error), which can for example be represented by a body-frame-to-wander-frame DCM $C_b^w|_0$, where index b denotes the body frame, index w denotes the wander frame, and the vertical bar with index $|_0$ denotes initial values. The body-frame-to-wander-frame DCM $C_b^w|_0$ can for example be used to transform a vector from constant coordinates in the body frame (Cartesian vector $v^b$) to the initial coordinates in the wander frame (Cartesian vector $v^w|_0$) and consequently is a representation of the initial orientation of the body frame with respect to the wander frame $$v^w|_0 = C_b^w|_0 v^b \tag{1}$$

where
  $v^w|_0$ is the transformed vector in coordinates of the initial wander frame, and
  $C_b^w|_0$ is the initial body-frame-to-wander-frame DCM
  $v^b$ is the vector in constant coordinates of the body frame.

Starting from the initial orientation, the orientation is, in step s30a, propagated during the motion by accounting for the changes, during the motion, of the orientation of the wander frame with respect to the Earth (e.g. represented by the Earth-centered Earth-fixed, ECEF, frame denoted by index e) and by accounting for the simultaneous changes in this time interval of the orientation of the body frame with respect to the Earth.

The change of the wander frame can be written as product of the transpose (denoted by the superscript T) of the wander-frame-to-ECEF-frame DCM during the motion (denoted by a vertical bar with index $|_1$) and the initial-wander-frame-to-ECEF-frame DCM $$C_w^{e^T}|_1 C_w^e|_0 \tag{2}$$

where
  $C_w^{e^T}|_1$ is the transpose of the wander-frame-to-ECEF-frame DCM during the motion, and
  $C_w^e|_0$ is the initial wander-frame-to-ECEF-frame DCM.

As described above, the orientation of the wander frame with respect to the Earth can be computed from known values, with a possible exception if the wander angle contains an unknown error. In such a case, the wander angle may be set to an approximate value as explained above. The above product can be computed from the wander-frame-to-geographic-frame DCM $C_w^g$ (for example the NED or ENU frame, denoted by index g) as $$C_w^{e^T}|_1 C_w^e|_0 = C_w^{g^T}|_1 C_g^{e^T}|_1 C_g^e|_0 C_w^g|_0 \tag{3}$$

where
  $C_w^{e^T}|_1 C_w^e|_0$ is the matrix product from equation (2),
  $C_w^g|_0$, $C_w^g|_1$ are the wander-frame-to-geographic-frame DCM at the initial time and during the motion respectively,
  $C_g^e|_0$, $C_g^e|_1$ are the geographic-frame-to-ECEF-frame DCM at the initial time and during the motion respectively,
  and where $C_g^{e^T}|_1 C_g^e|_0$ can be computed from known values (see for example ref. [1], section 2.4.2) and $C_w^g|_1 = C_w^g|_0$.

The change of the body frame can be written as product of the transpose of the body-frame-to-ECEF-frame DCM during the motion (denoted by index 1) and the initial body-frame-to-ECEF-frame DCM $$C_b^{e^T}|_1 C_b^e|_0 \quad (4)$$

where $C_b^e|_0$, $C_b^e|_1$ are the body-frame-to-ECEF-frame DCM at the initial time and during the motion respectively.

The change of the body frame can be measured directly with an angle sensor in some embodiments with an Earth-fixed rotation axis of rigid body 10. The angle sensor may for example be a rotary encoder or quadrature encoder that is fixed to the Earth or to an Earth-fixed structure (not shown in the figures) and that can measure angular position and angular rate of rigid body 10 about the rotation axis. The above DCM product can be computed from $$(C_b^{e^T}|_1 C_b^e|_0)^T = I + \sin(\alpha_{0\to 1})[u^b \times] + (1-\cos(\alpha_{0\to 1}))[u^b \times]^2 \quad (5)$$

where

I is the 3×3 identity matrix, $\alpha_{0\to 1}$ is the change in angular position in the propagation time interval, and $[u^b \times]$ is the skew-symmetric matrix equivalent of the cross product of the unit vector in direction of the Earth-fixed rotation axis in coordinates of the body frame.

In other embodiments with gyroscopes (e.g. one gyroscope measuring inertial angular rate about the Earth-fixed rotation axis of rigid body 10 in some embodiments, or three gyroscopes measuring 3-D inertial angular rate in other embodiments), the change of the body frame is measured with respect to an inertial, or non-rotating frame (e.g. represented by the Earth-centered inertial, ECI, frame denoted by index i).

In embodiments with one gyroscope measuring inertial angular rate about the Earth-fixed rotation axis of rigid body 10, the above DCM product can be computed from equation (5) as follows:

$$(C_b^{e^T}|_1 C_b^e|_0)^T = I + \sin(\alpha_{0\to 1})[u^b \times] + (1-\cos(\alpha_{0\to 1}))[u^b \times]^2 \quad (6)$$

where the change in angular position in the propagation time interval $\alpha_{0\to 1}$ is computed from the gyroscope measurement and an approximate value of the Earth rotation in direction of the Earth-fixed rotation axis of rigid body 10 in the propagation time interval. The Earth rotation in the propagation time interval can be neglected. For propagation time intervals of 20 s (i.e., 20 seconds) or less, this introduces an error of typically less than 0.1° (i.e., 0.1 degree) in the heading estimation. Alternatively, a state estimation method, for example an Extended Kalman filter, can be used to account for the error in this approximate value.

In other embodiments, three single-axis gyroscopes or two gyroscopes, of which at least one is a dual-axis gyroscope, are used to measure three-dimensional inertial angular rate. With a three-dimensional measurement of inertial angular rate, the product of the transpose of the body-frame-to-ECI-frame DCM during the motion and the initial body-frame-to-ECI-frame DCM can be computed:

$$C_b^{i^T}|_1 C_b^i|_0 \quad (7)$$

where $C_b^i|_0$, $C_b^i|_1$ are the body-frame-to-ECI-frame DCM at the initial time and during the motion respectively.

This product is related to the change of the body frame with respect to the ECEF frame (again represented as a DCM product) as follows $$C_b^{i^T}|_1 C_b^i|_0 = C_b^{e^T}|_1 C_e^{i^T}|_1 C_e^i|_0 C_b^e|_0 \quad (8)$$

and $$C_b^{e^T}|_1 C_b^e|_0 = C_b^{e^T}|_1 C_e^{i^T}|_0 C_e^i|_1 C_b^e|_1 C_b^{i^T}|_1 C_b^i|_0 \quad (9)$$

where $C_b^{i^T}|_1 C_b^i|_0$ is the matrix product from equation (7), $C_b^e|_0$, $C_b^e|_1$ are the body-frame-to-ECEF-frame DCM at the initial time and during the motion respectively, and $C_e^i|_0$, $C_e^i|_1$ are the ECEF-frame-to-ECI-frame DCM at the initial time and during the motion respectively.

The DCM product $C_e^{i^T}|_1 C_e^i|_0$ represents the Earth rotation in the propagation time interval and can be computed. The change of body frame $C_b^{e^T}|_1 C_b^e|_0$ is computed from equation (9) using an approximate value for the body-frame-to-ECEF-frame DCM during the motion $C_b^e|_1$ with unknown heading error. The true value of the body-frame-to-ECEF-frame DCM during the motion is not known at this time. Alternatively, the Earth rotation in the propagation time interval can be neglected, which allows to simplify equation (9) by approximation $C_b^{e^T}|_1 C_b^e|_0 \approx C_b^{i^T}|_1 C_b^i|_0$. For propagation time intervals of 20 s (i.e., 20 seconds) or less, this introduces an error of less than 0.1° (i.e., 0.1 degree) in the heading estimation. Alternatively, a state estimation method, for example an Extended Kalman filter, can be used to account for the error in this approximate value.

The orientation of the body frame with respect to the wander frame in step s30a represented by the body-frame-to-wander-frame DCM can be computed from the initial body-frame-to-wander-frame DCM $C_b^w|_0$ and the DCM products representing the change of the wander frame and the body frame as $$C_b^w|_1 = C_w^{e^T}|_1 C_w^e|_0 C_b^w|_0 (C_b^{e^T}|_1 C_b^e|_0)^T \quad (10)$$

where $C_b^e|_0$, $C_b^e|_1$ are the body-frame-to-ECEF-frame DCM at the initial time and during the motion respectively, $C_w^{e^T}|_1 C_w^e|_0$ is the matrix product from equation (2), and $C_b^{e^T}|_1 C_b^e|_0$ is the matrix product from equation (4).

In step s40a, the sensor-based velocity vector of point B in the wander frame $v_B^w$ can be computed from the lever arm vector from the Earth-fixed point A to point B in the body frame $l_{A\to B}^b$, the angular rate of the body frame with respect to the ECEF frame $\omega_{eb}$ and the orientation of the body frame with respect to the wander frame during the motion $C_b^w$ (as computed in step s30a, dropping the index 1)

$$v_B^w = C_b^w(\omega_{eb} \cdot l_{A\to B}^b) \quad (11)$$

where × is the cross-product operator and $v_B^w$ is the sensor-based velocity vector of point B in the wander frame, $C_b^w$ is the orientation of the body frame with respect to the wander frame during the motion, $\omega_{eb}$ is the angular rate vector of the body frame with respect to the ECEF frame in the body frame, and $l_{A\to B}^b$ is the lever arm vector from the Earth-fixed point A to point B in the body frame.

This makes use of the fact that point A is fixed with respect to the Earth, i.e. the velocity of point A is zero. The introduction of this information can be combined with other ways of computing the velocity of point B using sensor measurements in some embodiments, for example with a state estimator that constrains both computed velocities of point B to be equal.

The angular rate vector of the body frame with respect to the ECEF frame $\omega_{eb}$ can be measured with an angle sensor measuring the rotation of rigid body 10 about an Earth-fixed axis in some embodiments. Using for example a quadrature encoder angle sensor, the angular rate can be measured directly. For other types of angle sensors that only measure change in angular position, angular rate can be computed by time-differencing the measurement.

In other embodiments with a gyroscope measuring inertial angular rate about the Earth-fixed rotation axis of rigid body 10, the inertial angular rate can be used to approximate the angular rate of the body frame with respect to the ECEF frame (with approximately 0.1 percent error if rigid body 10 rotates by 15 degrees in 3.6 seconds), or the Earth rotation rate in direction of the rotation axis of the rigid can be approximated and the approximation error can be accounted for in a state estimation.

In other embodiments, the angular rate of the body frame with respect to the ECEF frame is computed from a three-dimensional measurement of inertial angular rate generated with three single-axis gyroscopes or with two gyroscopes, of which at least one is a dual-axis gyroscope.

In step s50a, for example the error in the computed orientation of the body frame with respect to the wander frame is estimated. Alternatively, the unknown wander angle is estimated. How these estimates may for example be generated based on at least two coordinates of the sensor-based velocity vector and the NSS signals observed during said motion will be described later for several embodiments, see e.g. steps s64a or s68a.

In step s60a, the heading of an axis of interest of rigid body 10 corresponding to a vector in the body frame $a^b$ with respect to a local level reference frame or a reference direction in the local level plane can be estimated by transforming the vector to coordinates in the reference frame (denoted by index r), using the corrected body-frame-to-wander-frame DCM $\hat{C}_b^w$ accounting for the estimated orientation error of the body frame with respect to the wander frame:

$$a^r = C_w^r \hat{C}_b^w a^b \quad (12)$$

where
- $a^r$ is the transformed vector corresponding to the axis of interest in coordinates of the reference frame,
- $C_w^r$ is the wander-frame-to-reference-frame DCM,
- $\hat{C}_b^w$ is the corrected body-frame-to-wander-frame DCM, and
- $a^b$ is the vector corresponding to the axis of interest in constant body frame coordinates Alternatively, the transformed vector can be computed using the corrected wander-frame-to-reference-frame DCM $\hat{C}_w^r$ accounting for the estimated wander angle:

$$a^r = \hat{C}_w^r C_b^w a^b \quad (13)$$

where
- $a^r$ is the transformed vector corresponding to the axis of interest in coordinates of the reference frame,
- $\hat{C}_w^r$ is the corrected wander-frame-to-reference-frame DCM,
- $C_b^w$ is the body-frame-to-wander-frame DCM, and
- $a^b$ is the vector corresponding to the axis of interest in constant body frame coordinates The heading of this axis of interest is the azimuth angle of the corresponding vector in the desired reference frame r, computed with the arctangent function with two arguments atan 2:

$$h = \text{atan } 2(Y, X) \quad (14)$$

where
- X, Y are the first and second coordinates of the vector corresponding to the axis of interest of rigid body 10 in the reference frame $a^r$.

If the heading of interest is defined with respect to a reference direction, it can be computed as $$h = \text{atan } 2(Y, X) = h_{ref} \quad (15)$$

where
- X, Y are the first and second coordinates of the vector corresponding to the axis of interest of rigid body 10 in the reference frame $a^r$, and
- $h_{ref}$ is the azimuth angle of the reference direction in the reference frame.

Figure 4:
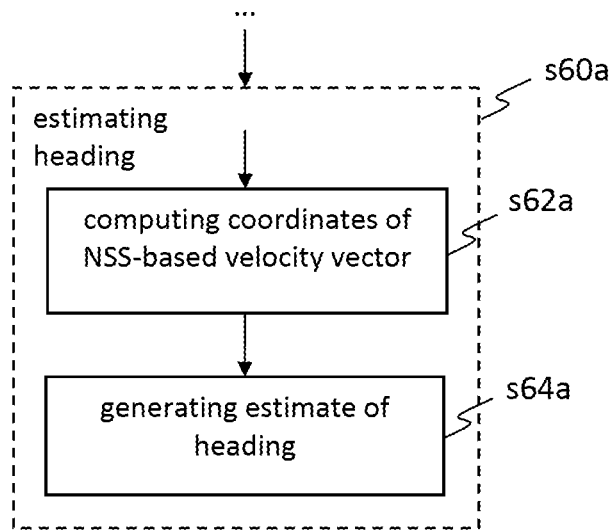
FIGS. 4 and 5 are flowcharts of a portion of methods in two embodiments of the first form of the invention.

FIG. 4 is a flowchart of a portion of a method in one embodiment of the first form of the invention. This embodiment, here referred to as "embodiment CL2", can be broadly described as a NSS velocity-based method according to the first form of the invention.

In that method, steps s10a, s20a, s30a, and s40a are as discussed above with reference to FIGS. 3a, 3b, and 3c, and estimating s60a the heading of axis 20 comprises the following steps. First, at least two coordinates of a second velocity vector of point B (here referred to as "NSS-based velocity vector"), in the above-referred reference frame (discussed with reference to FIG. 3a) (choosing the same coordinates as for the sensor-based velocity vector) or, alternatively, in a further reference frame, with non-zero horizontal projection of said NSS-based velocity vector, are computed s62a. The computation is based on the NSS signals observed during said motion. Then, an estimate of the heading of axis 20 is generated s64a based on the at least two coordinates of the sensor-based velocity vector and the at least two coordinates of the NSS-based velocity vector.

In particular, in step s62a, the NSS-based velocity vector of point B can be computed from NSS signals using prior art techniques. For example, see ref. [4], chapter 9, section II.

This NSS-based velocity vector is computed in coordinates of a reference frame with known orientation with respect to the Earth, for example the ECEF, NED, ENU frames, or a wander frame. Because the relative orientation of these frames is known, the NSS-based velocity vector can be transformed from one frame to the other. In the following, the NSS-based velocity vector is assumed to be computed in, or transformed to, coordinates of a wander frame.

In step s64a, the orientation error $\psi_z$ of the body frame with respect to the wander frame can be estimated by computing the difference in azimuth angle between the NSS-based velocity vector and the sensor-based velocity vector $$\psi_z = \text{atan } 2(Y_{NSS}, X_{NSS}) - \text{atan } 2(Y_{Sensor}, X_{Sensor}) \quad (16)$$

where
- $Y_{NSS}$, $X_{NSS}$ are the horizontal coordinates of the NSS-based velocity vector in the wander frame, and
- $Y_{Sensor}$, $X_{Sensor}$ are the horizontal coordinates of the sensor-based velocity vector in the wander frame.

This orientation error estimate $\psi_z$ can be used to correct the wander angle and to estimate the heading of an axis of interest of rigid body 10 from a corrected wander-frame-to-reference-frame DCM $\hat{C}_w^r$, as described above with reference to step s60a.

Alternatively, the orientation error estimate $\psi_z$ can be used to compute a corrected body-frame-to-wander-frame DCM $\hat{C}_b^w$ $$\hat{C}_b^w = (I + \sin(\psi_z)[u_z \times] + (1 - \cos(\psi_z))[u_z \times]^2) C_b^w \quad (17)$$

where
- I is the 3×3 identity matrix,
- $\psi_z$ is the orientation error estimate, and
- $[u_z \times]$ is the skew-symmetric matrix equivalent of the cross product of the third base vector of the body frame in coordinates of the body frame.

The heading of an axis of interest of rigid body 10 can then be estimated from $\hat{C}_b^w$ as described above with reference to step s60a.

In one embodiment, step s50a depicted on both FIGS. 3a and 3c is implemented by step s62a discussed above.

Figure 5:
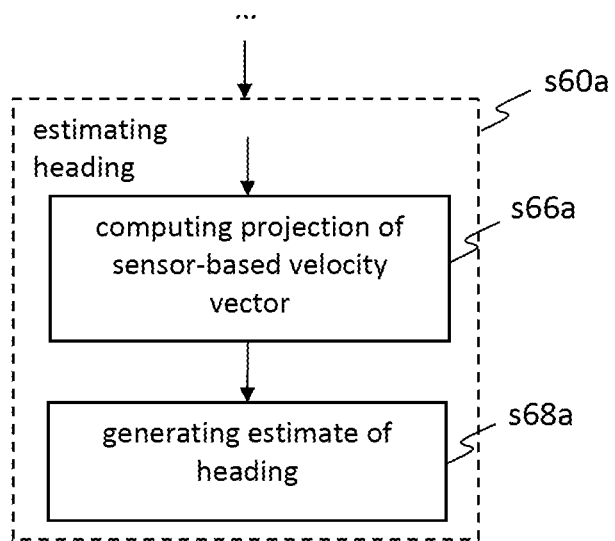

FIG. 5 is a flowchart of a portion of a method in one embodiment of the first form of the invention. This embodiment, here referred to as "embodiment CL3", can be broadly described as a NSS measurement-based method according to the first form of the invention.

In that method, steps s10a, s20a, s30a, and s40a are as discussed above with reference to FIGS. 3a, 3b, and 3c, and estimating s60a the heading of axis 20 comprises the following steps. First, each of at least one of the NSS satellites 60 is considered (i.e., one of the NSS satellites 60 is considered, some of them are each considered, or all of them are each considered), and, for each considered NSS satellite 60, a projection of the sensor-based velocity vector in direction of line of sight to the NSS satellite 60 under consideration is computed s66a. Then, an estimate of the heading of axis 20 is generated s68a based on the projection(s) computed in step s60a and on the NSS signals observed during said motion.

In particular, in step s66a, unit vectors pointing from point B to the phase centers of antennas on transmitting NSS satellites 60 corresponding to one or more NSS signals tracked by the NSS receiver, these unit vectors being hereinafter referred to as "line-of-sight-unit vectors", can be computed from an estimate of the position of point B and the positions of the satellite phase centers. These position estimates can be computed from NSS measurements and NSS satellite orbit data using prior art techniques, as explained for example in ref. [4], chapter 4 "GPS Navigation Data"; and "Global Positioning Systems Directorate Systems Engineering & Integration Interface Specification IS-GPS-200", 2015, retrieved at the time of writing from the URL http://www.gps.gov/technical/icwg/ (hereinafter referred to as reference [5]).

These line-of-sight-unit vectors are computed in coordinates of a reference frame with known orientation with respect to the Earth, for example the ECEF, NED, ENU frames, or a wander frame. Because the relative orientation of these frames is known, the line-of-sight-unit vectors can be transformed from one frame to the other. In the following, the line-of-sight-unit vectors are assumed to be computed in, or transformed to, coordinates of a wander frame.

For each line-of-sight-unit vector denoted by index j, the projection of the sensor-based velocity vector in direction of line of sight to the NSS satellite 60 transmitting the corresponding NSS signal is computed as inner product of the vectors in coordinates of a common frame, for example the wander frame, as follows:

$$V_j|_{Sensor} = a_j^w \cdot v_B^w \quad (18)$$

where
- $V_j|_{Sensor}$ is the sensor-based scalar velocity of point B in direction of the line of sight,
- $a_j^w$ is the j-th line-of-sight-unit vector in the wander frame, and
- $v_B^w$ is the sensor-based velocity vector of point B in the wander frame from step s40a.

In step s68a, the NSS-based velocity vector of point B can be computed from NSS signals as described above with reference to step s62a, and projected in the same line of sight directions as described above with reference to step s66a. This gives a NSS-based scalar velocity of point B in direction of the line of sight to the NSS satellite(s) $V_j|_{NSS}$. Alternatively, these NSS-based scalar velocities can be computed from the Doppler frequency measurements of the NSS receiver, an estimate of the receiver clock drift, the NSS satellites velocities and transmitted frequencies and the line-of-sight-unit vectors, as explained for example in ref. [4], chapter 9, section II.B, "Doppler". The NSS-based scalar velocities can also be computed from time-differenced NSS delta-range measurements, as explained for example in ref. [4], chapter 9, section II.C, "Accumulated Delta Range".

The orientation error $\psi_z$ of the body frame with respect to the wander frame can be estimated by computing the differences between NSS-based scalar velocity and sensor-based scalar velocity for one or more NSS-signals $$d_j = V_j|_{NSS} - V_j|_{Sensor} \quad (19)$$

where
- $d_j$ is the j-th difference between NSS-based scalar velocity and sensor-based scalar velocity,
- $V_j|_{NSS}$ is the NSS-based scalar velocity of point B in direction of the line of sight, and
- $V_j|_{Sensor}$ is the sensor-based scalar velocity of point B in direction of the line of sight.

The relationship between this scalar difference and the orientation error $\psi_z$ can be expressed as $$d_j = a_j^w \cdot \left( \begin{bmatrix} \cos(\psi_z) - 1 & -\sin(\psi_z) & 0 \\ \sin(\psi_z) & \cos(\psi_z) - 1 & 0 \\ 0 & 0 & 0 \end{bmatrix} v_B^w \right) \quad (20)$$

where
- $d_j$ is the j-th difference between NSS-based scalar velocity and sensor-based scalar velocity,
- $a_j^w$ is the j-th line-of-sight-unit vector in the wander frame,
- $\psi_z$ is the orientation error, and
- $v_B^w$ is the sensor-based velocity vector of point B in the wander frame from step s40a.

This model can also be extended to account for errors in the NSS-based scalar velocity and errors in the sensor-based velocity vector, for example due to errors in the sensor measurements. A state estimator can be applied to estimate all or a selection of these errors in combination with the orientation error $\psi_z$. The model can also be extended to account for orientation errors in roll and pitch in addition to heading.

Generally, more than one scalar difference equation is solved to estimate orientation error $\psi_z$. In a special case using the model above, for example if $$v_B^w = \begin{bmatrix} 1 \frac{m}{s} & 0 & 0 \end{bmatrix}^T \left( \text{where } \frac{m}{s} \text{ means "meter per second"} \right) \text{ and}$$

$$a_j^w = [0 \ 1 \ 0]^T,$$

the sine of the orientation error is directly observable. Given a second scalar difference equation with $a_{j+1}{}^w=[1\ 0\ 0]^T$, also the cosine of orientation error (minus 1) is observable, and the orientation error can be estimated as $$\psi_z = \operatorname{atan2}\left(d_j/\left(1\frac{m}{s}\right), d_{j+1}/\left(1\frac{m}{s}\right)+1\right) \quad (21)$$

where $\psi_z$ is the orientation error, and $d_j, d_{j+1}$ are two differences between NSS-based scalar velocity and sensor-based scalar velocity for $v_B^w = \left[1\frac{m}{s}\ 0\ 0\right]^T$, $a_j^w = [0\ 1\ 0]^T$ and $a_{j+1}^w = [1\ 0\ 0]^T$.

In the general case, the orientation error can be estimated if the horizontal projection of $v_B{}^w$ is non-zero and if NSS-based scalar velocities are available in direction of four linear independent line of sight vectors, at least three of which have non-zero horizontal projections. Least squares estimation can be applied to the system of equations to estimate $\cos(\psi_z)-1$ and $\sin(\psi_z)$. The orientation error $\psi_z$ can then be computed with the atan 2 function after normalization of the sine and cosine estimates.

This orientation error estimate $\psi_z$ can be used to estimate the heading of an axis of interest of rigid body 10 as described above with reference to step s64a.

In one embodiment, step s50a depicted on both FIGS. 3a and 3c is implemented by step s66a discussed above.

Figure 6C:
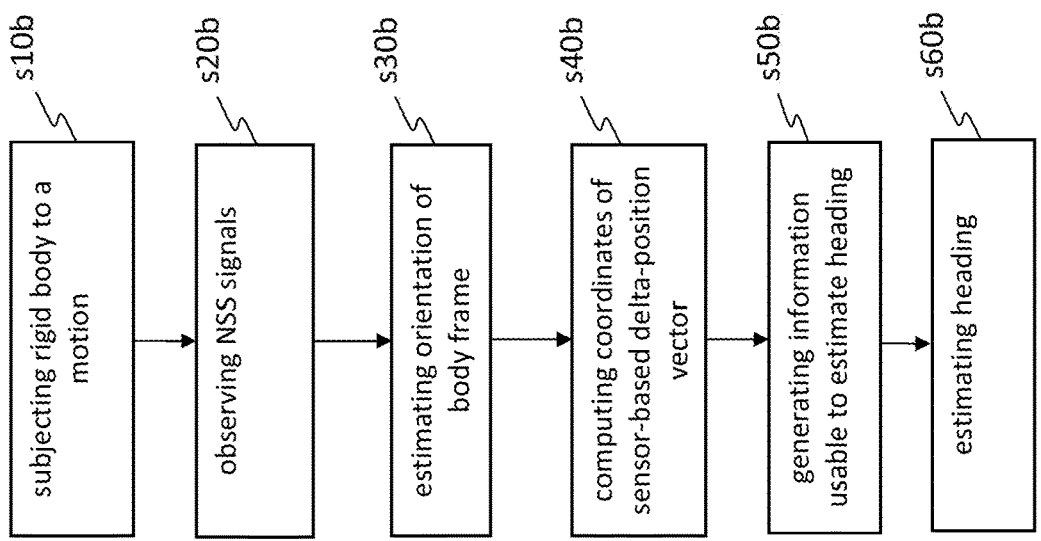
FIGS. 6a, 6b, and 6c are flowcharts of methods in three embodiments of a second form of the invention.
Figure 6B:
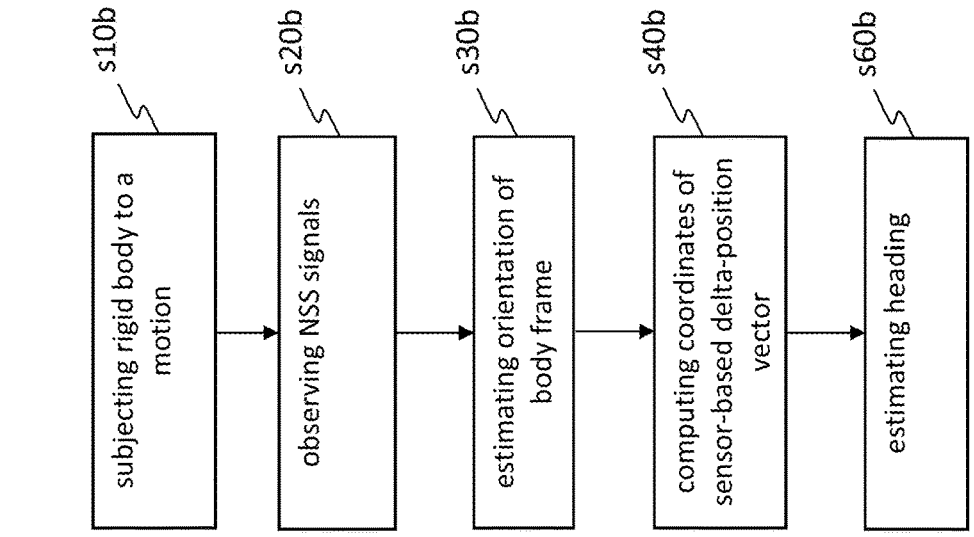
Figure 6A:
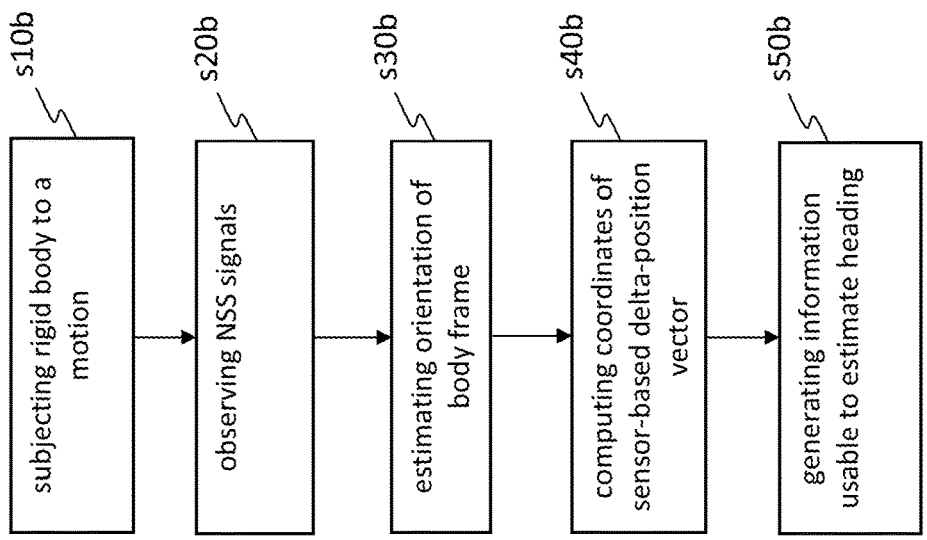

FIGS. 6a, 6b, and 6c are three flowcharts of methods in three embodiments of a second form of the invention, respectively. This second form of the invention can be broadly described, in some embodiments, as a method for estimating heading with at least, on the one hand, a known motion constraint and, on the other hand, delta-range measurements of the NSS receiver or NSS receiver measurements—that is, NSS signals observed during the motion—usable to compute these delta-range measurements. The motion constraint is motion constraint (MC-A), i.e. the same motion constraint as that discussed in relation to the first form of the invention (as described above with reference to FIGS. 3a, 3b, and 3c). That is, at minimum, rigid body 10 rotates about an Earth-fixed point A, and the distance between point B and point A is larger than zero and is known or obtained. For a rigid body 10 comprising a survey pole, the distance between point B and point A may for example be a value comprised between 1 and 2.5 meters, and in particular about 2 meters.

The method of FIG. 6a outputs information usable to estimate the heading of axis 20 of rigid body 10, without necessarily estimating the heading per se. In contrast, the method of FIG. 6b outputs an estimate of the heading of axis 20. The method of FIG. 6c generates information usable to estimate the heading of axis 20, and outputs an estimate of the heading as well.

As explained above with reference to FIGS. 1a, 1b, 2a, and 2b, rigid body 10 is equipped with an NSS receiver antenna 30. The phase center thereof is located at point B, which is away from point A. Point A is either a point of rigid body 10 or a point being at a fixed position with respect to rigid body 10. Further, rigid body 10 is equipped with sensor equipment 40 comprising at least one of (a) a gyroscope, (b) an angle sensor, said angle sensor being arranged to measure the rotation of rigid body 10 about an Earth-fixed axis, and (c) two accelerometers. In one embodiment, sensor equipment 40 comprises a single gyroscope without any angle sensor or accelerometer. In another embodiment, sensor equipment 40 comprises a single angle sensor without any gyroscope or accelerometer. In yet another embodiment, sensor equipment 40 comprises two accelerometers without any angle sensor or gyroscope. In a further embodiment, sensor equipment 40 comprises three gyroscopes and at least two accelerometers. In yet a further embodiment, sensor equipment 40 comprises an IMU, i.e. it comprises three gyroscopes and three accelerometers.

In the method of FIG. 6a, rigid body 10 is subjected s10b to an uninterrupted motion causing point B's horizontal position to change while keeping point A's position fixed relative to the Earth 50. That is, the motion comprises a change of point B's horizontal position while keeping point A's position fixed relative to the Earth 50. Point A may be temporarily fixed (i.e., fixed during the motion and then released) or, alternatively, constantly fixed. During said motion, the NSS receiver, whose antenna 30 forms part of rigid body 10 or is rigidly attached thereto (or, alternatively, is rotatably attached to rigid body 10 but with point B being on the rotation axis), observes s20b a NSS signal from each of a plurality of NSS satellites 60. During the motion, a clear view of the sky is therefore preferred.

The method further comprises the following operations (referred to as steps s30b, s40b, and s50b), carried out by (a) the NSS receiver, (b) sensor equipment 40, (c) a processing entity capable of receiving data from the NSS receiver and sensor equipment 40, or (d) by a combination of the above-referred elements, i.e. by elements (a) and (b), by elements (a) and (c), by elements (b) and (c), or by elements (a), (b), and (c).

Figures 16, 17:
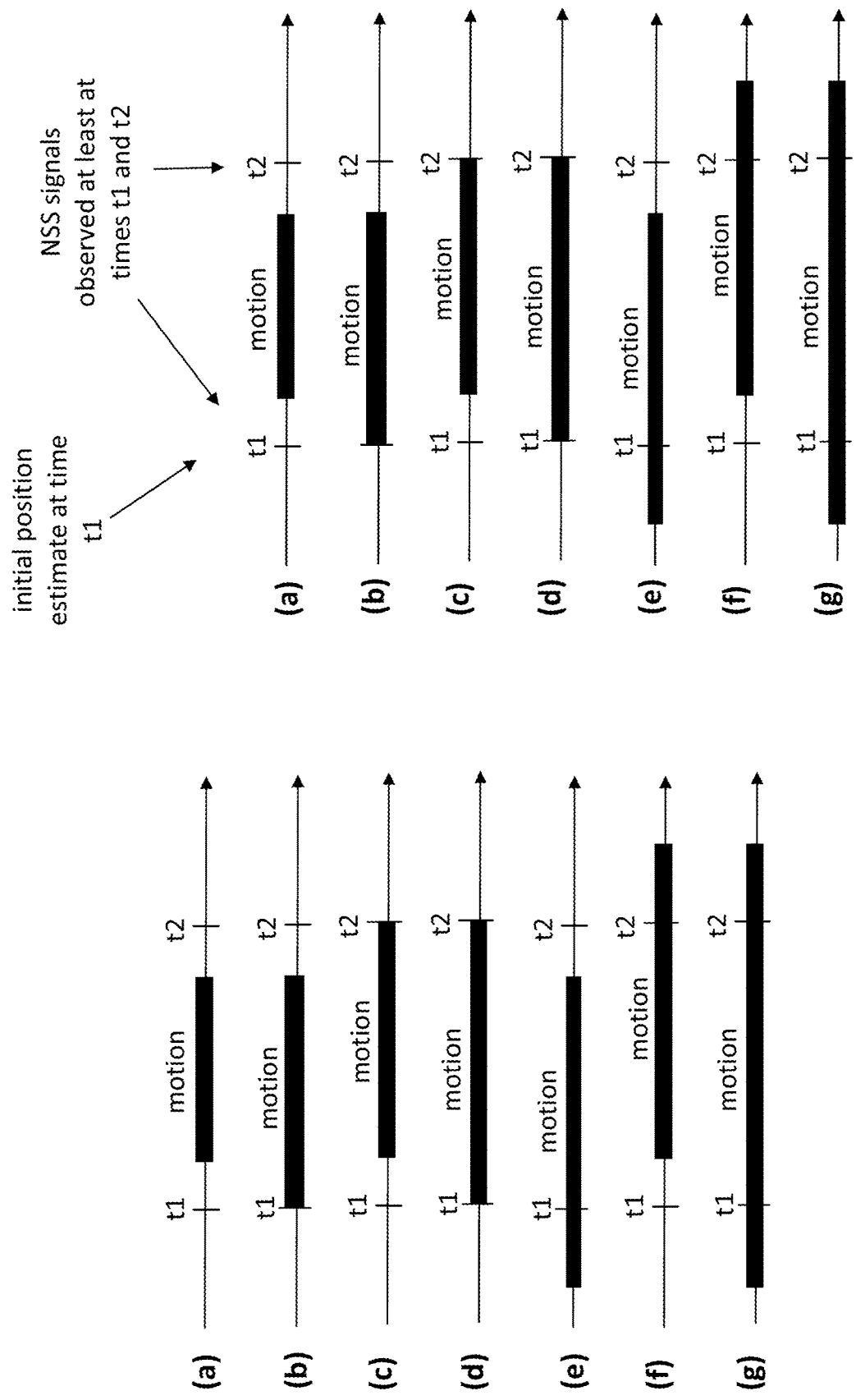
FIG. 16 schematically illustrates when the rigid body may be subject to an uninterrupted motion relative to two points in time t1 and t2, in some embodiments of the second form of the invention.
FIG. 17 schematically illustrates when the rigid body may be subject to an uninterrupted motion relative to two points in time t1 and t2, in some embodiments of the third form of the invention.

In step s30b, the orientation, at two different points in time t1 and t2 (wherein t1<t2), of a body frame of rigid body 10 with respect to a reference frame is estimated based on data from sensor equipment 40, wherein rigid body 10 is subject to the motion at least during a period of time between t1 and t2. This includes the following exemplary possibilities, as schematically illustrated in FIG. 16: (a) the motion begins after time t1 and ends before time t2; (b) the motion begins at time t1 and ends before time t2; (c) the motion begins after time t1 and ends at time t2; (d) the motion begins at time t1 and ends at time t2; (e) the motion begins before time t1 and ends before time t2; (f) the motion begins after time t1 and ends after time t2; and (g) the motion begins before time t1 and ends after time t2. The motion may be continuous as well in the sense that the motion may have started long before time t1 and may end long after time t2. Further, in these embodiments, the position of point A is kept fixed relative to the Earth continuously between t1 and t2.

The value of t2−t1 may for example be one NSS output interval, i.e. one receiver epoch (e.g., 0.1 second, 1 second, or 5 seconds), and the method may be applied repeatedly, iteratively improving the heading estimate accuracy.

Alternatively, t2−t1 (i.e., t2 minus t1) may correspond to multiple receiver epochs. In such a case, the sequential NSS measurements may be summed up. Typically, the heading estimation procedure with a tilt movement may take 5 to 10 seconds, or more typically 2 to 5 seconds, for a survey pole. In other words, the NSS data rate (or the number of receiver epochs available for processing) may be reduced to one receiver epoch of NSS delta-range measurements during the motion. More receiver epochs (i.e. NSS signals at more points in times) are not needed, because the method of the second form of the invention still, given an initial heading estimate or not (i.e. unknown initial heading), generally provides a more accurate heading estimate as result (with diminishing improvement in accuracy if the initial estimate is already good). More accurate means that for example the angular range within which the estimated heading can be assumed to be, with a 68 percent probability, is shortened.

As apparent from FIG. 16, the motion is an uninterrupted motion, and this uninterrupted motion of rigid body 10, i.e. a single uninterrupted motion, is sufficient to estimate the heading, thus rendering the method much simpler and faster (only requiring point B's horizontal position to change). In contrast, the method of ref. [2a] requires at least three separate movements (i.e., a composite motion with interruptions, rather than an interrupted motion), and the quality of the produced estimate in ref. [2a] depends on the operator (i.e., the user holding the survey pole) correctly following a more complicated pattern of points. For example, the at least three GNSS points should not be measured with the same pole direction in the method of ref. [2a], since this would otherwise result in a very inaccurate ground point estimate and a similarly inaccurate heading estimate.

As also apparent from FIG. 16, rigid body 10 is subjected to no other motion between points in time t1 and t2 than the depicted uninterrupted motion.

In this estimate of the orientation outputted in step s30b, there is still an unknown heading error, or the reference frame differs from the desired reference frame for heading by an unknown transformation. Namely, in step s30b, only the roll and pitch of rigid body 10 is estimated based on the sensor equipment data. An estimated value for the heading may be generated, but it either contains a potentially large error or it is defined with respect to a frame with unknown orientation about the vertical. That is, an estimated value in a wander frame with unknown wander angle may be generated. In this case, the problem of estimating heading becomes a problem of estimating this wander angle.

In step s40b, at least two coordinates of a delta-position vector (hereinafter referred to as "sensor-based delta-position vector"), in the reference frame, of point B, are computed based on the orientation estimated in step s30b and on data from sensor equipment 40. The at least two coordinates are two coordinates containing information about the motion of point B in two independent directions in the local horizontal plane, such as for example the horizontal coordinates of a geographic frame or a wander frame, or the coordinates in the directions of the two base vectors perpendicular to the Earth rotation rate vector of an Earth-fixed frame, if the method is used a middle or high latitudes.

Then, in step s50b, information usable to estimate the heading of axis 20 is generated, based on the at least two coordinates of the sensor-based delta-position vector and the NSS signals observed during said motion, and using a computation method which does not, as such, necessitate the use of NSS signals observed during any other motion. Two embodiments of such a computation method, and variants of these two embodiments, are described with reference to embodiments CL5 and CL6 below. These embodiments and variants thereof all rely on a minimal motion-based approach not requiring any interruption of the motion to which rigid body 10 is subjected. A concept common to these embodiments and variants thereof is that at least two coordinates of the sensor-based delta-position vector are tested using information about the motion of point B contained in the NSS signals. The heading error in the computation of the sensor-based vector is estimated based on observed discrepancies of (a) NSS signals or derived quantities based on these NSS signals and (b) comparable "computed measurements" based on least two coordinates of the sensor-based delta-position vector. See e.g. equation (23) where delta-position vector azimuth angles are compared in order to observe the heading error, and equation (25) where delta-distances are compared and related to the heading error by equation (26).

The method of FIG. 6b differs from that of FIG. 6a in that the method of FIG. 6b does not necessarily comprise step s50b, but comprises step s60b. In step s60b, the heading of axis 20 is estimated based on the at least two coordinates of the sensor-based delta-position vector and the NSS signals observed during said motion, and using a computation method which does not, as such, necessitate the use of NSS signals observed during any other motion. Two embodiments of such a computation method, and variants of these two embodiments, are described with reference to embodiments CL5 and CL6 below.

The method of FIG. 6c combines the methods of FIGS. 6a and 6b. That is, the method of FIG. 6c comprises, based on the at least two coordinates of the sensor-based delta-position vector and the NSS signals observed during said motion, and using a computation method which does not, as such, necessitate the use of NSS signals observed during any other motion, generating s50b information usable to estimate the heading of axis 20, and estimating s60b the heading of axis 20 as well.

The wording "using a computation method which does not, as such, necessitate the use of NSS signals observed during any other motion" means that, no matter whether NSS signals are observed at other points in time than during said uninterrupted motion (i.e., before or after said motion), steps s50b and/or s60b are performed using a computation method which, by its nature (i.e., by virtue of the underlying operations used for the computation method), is capable of producing an estimated heading by using NSS signals observed during said motion only, i.e. without necessarily making use of additional NSS signals observed at other points in time than during the motion. Thus, this does not exclude the optional use of such additional NSS signals in steps s50b and/or s60b steps, but the computation method as such does not require such additional NSS signals.

Thus, at least the following three sub-embodiments are covered:

(1) a method in which NSS signals are observed at other points in time than during said uninterrupted motion, and the computation method used for estimating the heading (i.e., for realizing steps s50b and s60b) uses but does not as such need the NSS signals observed at these other points in time (these additional NSS signals being merely used for example for improving the performance or simply for practicing a variant of sub-embodiments (2) and (3) described below, although a heading estimation could be obtained without these additional NSS signals);

(2) a method in which NSS signals are observed at other points in time than during said uninterrupted motion, and the computation method used for estimating the heading (i.e., for realizing steps s50b and s60b) does not use these NSS signals observed at these other points in time; and (3) a method in which NSS signals are not observed at other points in time than during said uninterrupted motion, and the computation method used for estimating the heading (i.e., for realizing steps s50b and s60b) thus does not use NSS signals observed at these other points in time since these additional NSS signals are not available.

Steps s30b to s60b may potentially be carried out as post-processing steps, i.e. after the actual motion. These steps do not have to be carried out in real-time.

Thus, as apparent from the above, steps s50*b* and/or s60*b*, whichever is or are applicable, are necessarily performed after the motion has at least started and has been ongoing for a non-null duration, and, in one embodiment, steps s50*b* and/or s60*b* may be performed after the motion. Without the motion, there can be no sensor-based delta-position vector and no NSS signals observed during said motion. Once estimated at one point in time, the heading is implicitly known, i.e. can be computed, for previous points in time during the motion. Further, if the motion is still ongoing when steps s50*b* and/or s60*b* are performed, the estimated heading is effectively an estimated instantaneous heading, i.e. an estimation of the heading at one point in time, and the estimated value may then be continuously tracked.

Now, an exemplary implementation of the above-referred method according to the second form of the invention will be further described with reference to FIG. 6*c*.

In particular, in step s30*b*, the orientation of the body frame with respect to the wander frame at times t1 and t2 can be estimated by propagating an initial orientation to time t1, as described above with reference to step s30*a*. Then, the estimated orientation at time t1 is used as initial orientation for propagating orientation to time t2, again as described above with reference to step s30*a*. The error contained in the orientation estimate differs for the two points in time due to sensor error, i.e. measurement error of sensor equipment 40. For embodiments with an angle sensor, this difference in orientation error due to sensor error is negligible. For embodiments with gyroscopes, this difference in orientation error scales with the length of the time interval between the two points in time, t2−t1 (i.e., t2 minus t1), and the angular change about the measurement axis (or axes). It is negligible for short time intervals and small angular changes. The effect of orientation error at time t1 on the accuracy of the heading estimate is negligible in some embodiments, as will be described below with reference to embodiment CL15.

Alternatively, two accelerometers can be used in other embodiments to estimate the orientation of the body frame at times t1 and t2, in a similar way as described above for the estimation of an initial orientation in step s30*a*, as will be described below with reference to embodiment CL15. The orientation of the body frame at time t1 can also be neglected in these embodiments, as will be described below with reference to embodiment CL15.

In step s40*b*, the sensor-based delta-position vector of point B in the wander frame $\Delta r_B^w$ can be computed from the lever arm vector from the Earth-fixed point A to point B in the body frame $l_{A \to B}^b$ and the orientation of the body frame with respect to the wander frame at times t1 and t2 $C_b^w|_1$ and $C_b^w|_2$ (as computed in step s30*b*), as follows:

$$\Delta r_B^w = (C_b^w|_2 - C_b^w|_1) l_{A \to B}^b \quad (22)$$

where
- $\Delta r_B^w$ is the sensor-based delta-position vector of point B in the wander frame,
- $C_b^w|_1$, $C_b^w|_2$ are the body-frame-to-wander-frame DCM at times t1 and t2 respectively, and
- $l_{A \to B}^b$ is the lever arm vector from the Earth-fixed point A to point B in the body frame.

This equation makes use of the fact that point A is fixed with respect to the Earth, i.e. the delta-position vector of point A is zero. The introduction of this information can be combined with other ways of computing the delta-position vector of point B using sensor measurements in some embodiments, for example by computing a least squares estimate from the two computed delta-position vectors of point B.

In step s50*b*, for example the error in the computed orientation of the body frame with respect to the wander frame is estimated. Alternatively, the unknown wander angle is estimated. How these estimates may for example be generated based on at least two coordinates of the sensor-based delta-position vector and the NSS signals observed during said motion will be described later for several embodiments, see e.g. steps s64*b* or s68*b*.

In step s60*b*, the heading of an axis of interest of rigid body 10 is estimated as described in step s60*a*.

Figure 7:
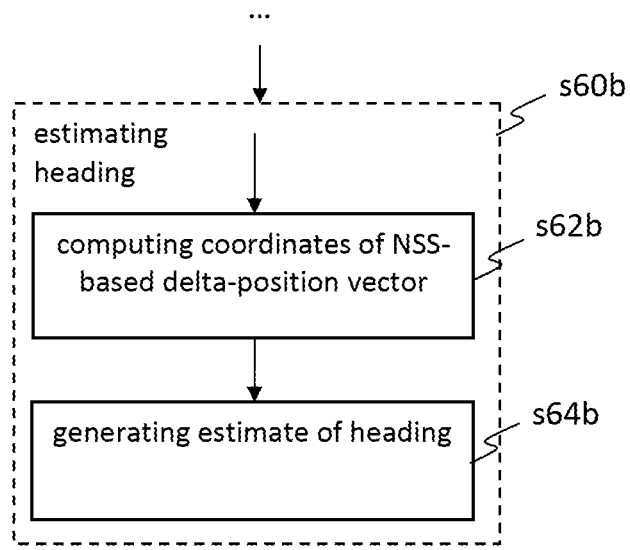
FIGS. 7 and 8 are flowcharts of a portion of methods in two embodiments of the second form of the invention.

FIG. 7 is a flowchart of a portion of a method in one embodiment of the second form of the invention. This embodiment, here referred to as "embodiment CL5", can be broadly described as a NSS delta-position-based method according to the second form of the invention.

In that method, steps s10*b*, s20*b*, s30*b*, and s40*b* are as discussed above with reference to FIGS. 6*a*, 6*b*, and 6*c*, and estimating s60*b* the heading of axis 20 comprises the following steps. First, in step s62*b*, at least two coordinates of a second delta-position vector (here referred to as "NSS-based delta-position vector"), in the above-referred reference frame (discussed with reference to FIG. 6*a*) (choosing the same coordinates as for the delta-position vector) or, alternatively, in a further reference frame, of point B, with non-zero horizontal projection of said NSS-based delta-position vector, are computed. The computation is based on the NSS signals observed during said motion. Then, an estimate of the heading of axis 20 is generated s64*b*, based on the at least two coordinates of the sensor-based delta-position vector and the at least two coordinates of the NSS-based delta-position vector.

In particular, in step s62*b*, the NSS-based delta-position vector of point B can be computed from NSS signals using prior art techniques, as explained for example in ref. [4], chapter 9; U.S. Pat. No. 9,562,975 B2, "GNSS Signal Processing with Delta Phase for Incorrect Starting Position", 2017, (hereinafter referred to as reference [6]); and U.S. Pat. No. 9,322,918 B2, "GNSS Surveying Methods and Apparatus", 2016, (hereinafter referred to as reference [7]).

This NSS-based delta-position vector is computed in coordinates of a reference frame with known orientation with respect to the Earth, for example the ECEF, NED, ENU frames, ora wander frame. Because the relative orientation of these frames is known, the NSS-based delta-position vector can be transformed from one frame to the other. In the following, the NSS-based delta-position vector is assumed to be computed in, or transformed to, coordinates of a wander frame.

In step s64*b*, the orientation error $\psi_z$ of the body frame with respect to the wander frame can be estimated by computing the difference in azimuth angle between the NSS-based delta-position vector and the sensor-based delta-position vector $$\psi_z = \mathrm{atan}\, 2(Y_{NSS}, X_{NSS}) - \mathrm{atan}\, 2(Y_{Sensor}, X_{Sensor}) \quad (23)$$

where
- $\psi_z$ is the orientation error,
- $Y_{NSS}$, $X_{NSS}$ are the horizontal coordinates of the NSS-based delta-position vector in the wander frame, and
- $Y_{Sensor}$, $X_{Sensor}$ are the horizontal coordinates of the sensor-based delta-position vector in the wander frame.

This orientation error estimate $\psi_z$ can be used to estimate the heading of an axis of interest of rigid body 10 as described above with reference to step s64*a*.

In one embodiment, step s50*b* depicted on both FIGS. 6*a* and 6*c* is implemented by step s62*b* discussed above.

Figure 8:
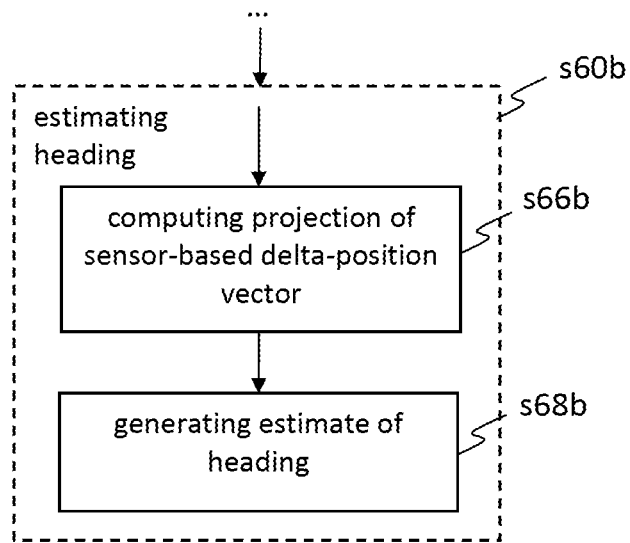

FIG. 8 is a flowchart of a portion of a method in one embodiment of the second form of the invention. This embodiment, here referred to as "embodiment CL6", can be broadly described as a NSS measurement-based method according to the second form of the invention.

In that method, steps s10b, s20b, s30b, and s40b are as discussed above with reference to FIGS. 6a, 6b, and 6c, and estimating s60b the heading of axis 20 comprises the following steps. First, each of at least one of the NSS satellites 60 is considered (i.e., one of the NSS satellites 60 is considered, some of them are each considered, or all of them are each considered), and, for each considered NSS satellite 60, a projection of the sensor-based delta-position vector in direction of line of sight to the NSS satellite 60 under consideration is computed s66b. Then, an estimate of the heading of axis 20 is generated s68b based on the projection(s) computed in step s66b and on the NSS signals observed during said motion.

In particular, in step s66b, line-of-sight-unit vectors can be computed as described above with reference to step s66a. These line-of-sight-unit vectors are computed in coordinates of a reference frame with known orientation with respect to the Earth, for example the ECEF, NED, ENU frames, or a wander frame. Because the relative orientation of these frames is known, the line-of-sight-unit vectors can be transformed from one frame to the other. In the following, the line-of-sight-unit vectors are assumed to be computed in, or transformed to, coordinates of a wander frame.

For each line-of-sight-unit vector denoted by index j, the projection of the sensor-based delta-position vector in direction of line of sight to the NSS satellite 60 transmitting the corresponding NSS signal is computed as inner product of the vectors in coordinates of a common frame, for example the wander frame, as follows:

$$l_j|_{Sensor} = a_j^w \cdot \Delta r_B^w \quad (24)$$

where $l_j|_{Sensor}$ is the sensor-based delta-distance of point B in direction of the line of sight, $a_j^w$ is the j-th line-of-sight-unit vector in the wander frame, and $\Delta r_B^w$ is the sensor-based delta-position vector of point B in the wander frame from step s40b.

In step s68b, the NSS-based delta-position vector of point B can be computed from NSS signals as described above with reference to step s62b, and projected in the same line of sight directions as described above with reference to step s66b. This gives a NSS-based delta-distance of point B in direction of the line of sight to the NSS satellite(s) $l_j|_{NSS}$. Alternatively, these NSS-based delta-distances can be computed from the delta-range measurements of the NSS receiver, as described for example in ref. [6] and [7].

The orientation error $\psi_z$ of the body frame with respect to the wander frame can be estimated by computing the differences between NSS-based delta-distance and sensor-based delta-distance for one or more NSS-signals, as follows:

$$i_j = l_j|_{NSS} - l_j|_{Sensor} \quad (25)$$

where $i_j$ is the j-th difference between NSS-based delta-distance and sensor-based delta-distance, $l_j|_{NSS}$ is the NSS-based delta-distance of point B in direction of the line of sight, and $l_j|_{Sensor}$ is the sensor-based delta-distance of point B in direction of the line of sight.

The relationship between this scalar difference and the orientation error $\psi_z$ can be expressed as $$i_j = a_j^w \cdot \left( \begin{bmatrix} \cos(\psi_z) - 1 & -\sin(\psi_z) & 0 \\ \sin(\psi_z) & \cos(\psi_z) - 1 & 0 \\ 0 & 0 & 0 \end{bmatrix} \Delta r_B^w \right) \quad (26)$$

where $i_j$ is the j-th difference between NSS-based delta-distance and sensor-based delta-distance, $a_j^w$ is the j-th line-of-sight-unit vector in the wander frame, $\psi_z$ is the orientation error, and $\Delta r_B^w$ is the sensor-based delta-position vector of point B in the wander frame from step s40b.

This model can also be extended to account for errors in the NSS-based delta-distance and errors in the sensor-based velocity vector, for example due to errors in the sensor measurements. A state estimator can be applied to estimate all or a selection of these errors in combination with the orientation error $\psi_z$. The model can also be extended to account for orientation errors in roll and pitch in addition to heading.

Generally, more than one scalar difference equation is solved to estimate orientation error $\psi_z$. In a special case using the model above, for example if $\Delta r_B^w = [1m\ 0\ 0]^T$ (where m means "meter") and $a_j^w = [0\ 1\ 0]^T$, the sine of the orientation error is directly observable. Given a second scalar difference equation with $a_{j+1}^1 = [1\ 0\ 0]^T$, also the cosine of orientation error (minus 1) is observable, and the orientation error can be estimated as $$\psi_z = \text{atan } 2(i_j/(1m), i_{j+1}/(1m)+1) \quad (27)$$

where $\psi_z$ is the orientation error, and $i_j$, $i_{j+1}$ are two differences between NSS-based delta-distance and sensor-based delta-distance for $\Delta r_B^w = [1m\ 0\ 0]^T$, $a_j^w = [0\ 1\ 0]^T$ and $a_{j+1}^w = [1\ 0\ 0]^T$.

In the general case, the orientation error can be estimated if the horizontal projection of $\Delta r_B^w$ is non-zero and if NSS-based delta-distances are available in direction of four linear independent line of sight vectors, at least three of which have non-zero horizontal projections. Least squares estimation can be applied to the system of equations to estimate $\cos(\psi_z) - 1$ and $\sin(\psi_z)$. The orientation error $\psi_z$ can then be computed with the atan 2 function after normalization of the sine and cosine estimates.

This orientation error estimate $\psi_z$ can be used to estimate the heading of an axis of interest of rigid body 10 as described above with reference to step s64a.

In one embodiment, step s50b depicted on both FIGS. 6a and 6c is implemented by step s66b discussed above.

Figure 9C:
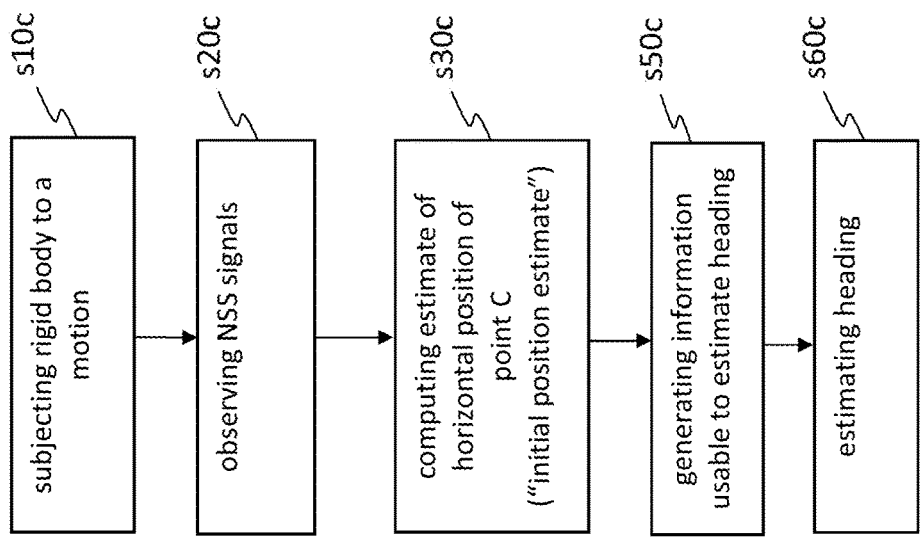
FIGS. 9a, 9b, and 9c are flowcharts of methods in three embodiments of a third form of the invention.
Figure 9B:
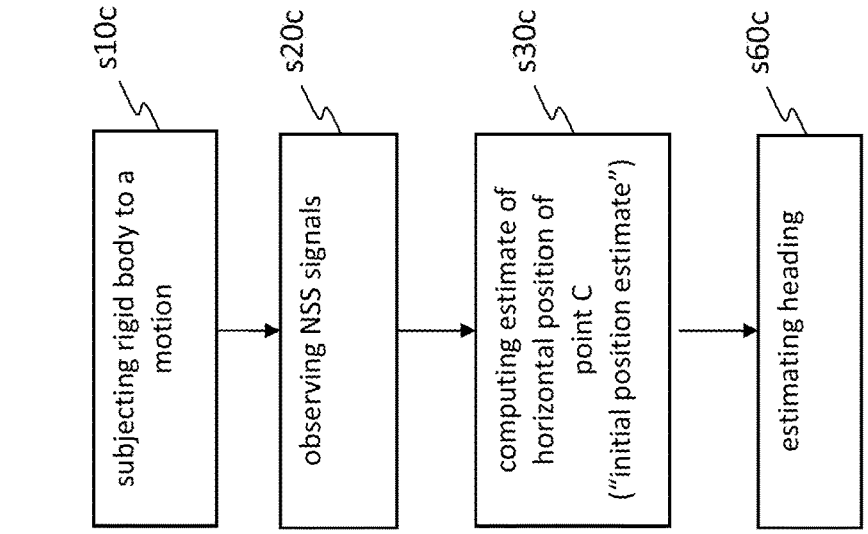
Figure 9A:
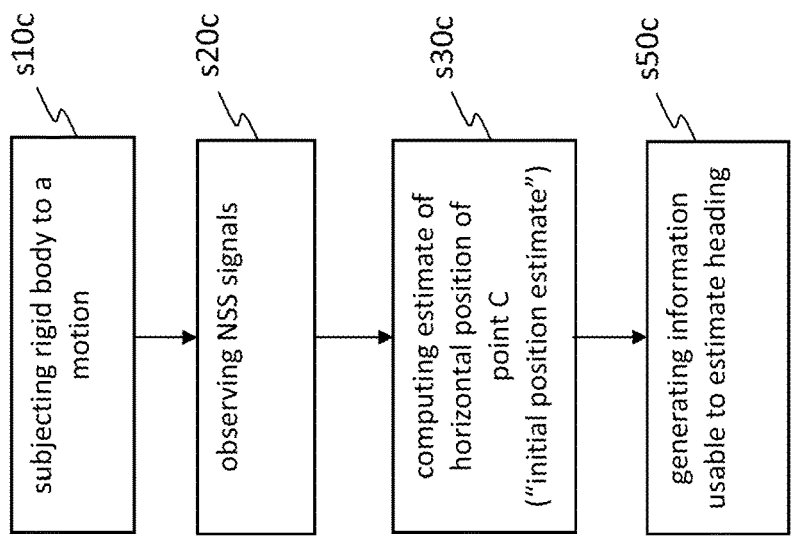

FIGS. 9a, 9b, and 9c are three flowcharts of methods in three embodiments of a third form of the invention, respectively. This third form of the invention can be broadly described, in some embodiments, as a method for estimating heading with at least, on the one hand, a known motion constraint, and, on the other hand, range measurements of the NSS receiver or NSS receiver measurements—that is, observed NSS signals—usable to compute these range measurements. The motion constraint is motion constraint (MC- A), i.e. the same motion constraint as that discussed in relation to the first and second forms of the invention (as described above with reference to FIGS. 3a, 3b, 3c, 6a, 6b, and 6c). That is, at minimum, rigid body 10 rotates about an Earth-fixed point A, and the distance between point B and point A is larger than zero and is known or obtained. For a rigid body 10 being a survey pole, the distance between point B and point A may for example be a value comprised between 0.5 and 2.5 meters, and in particular about 2 meters.

The method of FIG. 9a outputs information usable to estimate the heading of axis 20 of rigid body 10, without necessarily estimating the heading per se. In contrast, the method of FIG. 9b outputs an estimate of the heading of axis 20. The method of FIG. 9c generates information usable to estimate the heading of axis 20, and outputs an estimate of the heading as well.

As explained above with reference to FIGS. 1a, 1b, 2a, and 2b, rigid body 10 is equipped with an NSS receiver antenna 30. The phase center thereof is located at point B, which is away from point A. Point A is either a point of rigid body 10 or a point being at a fixed position with respect to rigid body 10. Further, rigid body 10 is equipped with sensor equipment 40 comprising at least one of (a) a gyroscope, (b) an angle sensor, said angle sensor being arranged to measure the rotation of rigid body 10 about an Earth-fixed axis, and (c) two accelerometers. In one embodiment, sensor equipment 40 comprises a single gyroscope without any angle sensor or accelerometer. In another embodiment, sensor equipment 40 comprises a single angle sensor without any gyroscope or accelerometer. In yet another embodiment, sensor equipment 40 comprises two accelerometers without any angle sensor or gyroscope. In a further embodiment, sensor equipment 40 comprises three gyroscopes and two accelerometers. In yet a further embodiment, sensor equipment 40 comprises an IMU, i.e. it comprises three gyroscopes and three accelerometers.

In the method of FIG. 9a, rigid body 10 is subjected s10c to an uninterrupted motion causing point B's horizontal position to change while keeping point A's position fixed relative to the Earth 50. That is, the motion comprises a change in point B's horizontal position while keeping point A's position fixed relative to the Earth 50. Point A may be temporarily fixed (i.e., fixed during the motion and then released) or, alternatively, constantly fixed. The NSS receiver, whose antenna 30 forms part of rigid body 10 or is rigidly attached thereto (or, alternatively, is rotatably attached to rigid body 10 but with point B being on the rotation axis), observes s20c a NSS signal from each of a plurality of NSS satellites 60. More precisely, the NSS receiver observes s20c the NSS signals at least at a first point in time t1 and at a second point in time t2, and rigid body 10 is subject to the motion at least during part of the period of time between times t1 and t2. Thus, at least at times t1 and t2, a clear view of the sky is preferred.

The method further comprises the following operations (referred to as steps s30c and s50c), carried out by (a) the NSS receiver, (b) sensor equipment 40, (c) a processing entity capable of receiving data from the NSS receiver and sensor equipment 40, or (d) by a combination of the above-referred elements, i.e. by elements (a) and (b), by elements (a) and (c), by elements (b) and (c), or by elements (a), (b), and (c).

In step s30c, an estimate (hereinafter referred to as "initial position estimate") of the horizontal position, or of a position usable to derive the horizontal position, of a point (hereinafter referred to as "point C") at time t1, is computed, based on the NSS signals observed at least at time t1. Point C is any one of: (a) point A; (b) point B; and (c) another point being either a point of rigid body 10 or a point being at a fixed position with respect to rigid body 10. The wording "or of a position usable to derive the horizontal position" means that the position may be a position in a reference frame of which none of the three coordinates is "horizontal". A "position usable to derive the horizontal position" may for example be a 3D position in ECEF coordinates. In general, none of the three coordinates would be "horizontal", but the 3D ECEF position is usable to compute horizontal coordinates, e.g. geodetic latitude and longitude or the horizontal coordinates in a local level frame with a known and fixed origin in proximity of rigid body 10.

Then, in step s50c, information usable to estimate the heading of axis 20 is generated, based on the initial position estimate, data from sensor equipment 40, and the observed NSS signals, and using a computation method which does not, as such, necessitate the use of NSS signals observed before the first point in time, between the first and second points in time, or after the second point in time. Three embodiments of such a computation method, and variants of these embodiments, are described with reference to embodiments CL8, CL9, and CL16 below. These embodiments and variants thereof all rely on a minimal motion-based approach not requiring any interruption of the motion to which rigid body 10 is subjected. A concept common to these embodiments and variants thereof is that a sensor-based estimate of the position of point B at time t2 is tested using information about the position of point B contained in the NSS signals. The heading error in the computation of the sensor-based position is estimated based on observed discrepancies of (a) NSS signals or derived quantities based on these NSS signals and (b) comparable "computed measurements" based on the sensor-based position. See e.g. equation (34) where sensor-based and NSS-based positions are compared in order to observe the heading error as modeled by equation (35), and equation (39) where computed distances (sensor-based position to NSS satellites) are compared with NSS range measurements and the differences are related to the heading error by equation (40). While embodiment CL16 relies on this common concept, embodiment CL16 may be regarded as simpler as a result of the specific, and more constrained, form of motion constraint (MC-A) used, namely (MC-A2). This motion constraint (MC-A2) effectively enables the direct computation of body frame heading by solving the system of equations (54) using the coefficients computed with equation (55).

The method of FIG. 9b differs from that of FIG. 9a in that the method of FIG. 9b does not necessarily comprise step s50c, but comprises step s60c. In step s60c, the heading of axis 20 is estimated, based on the initial position estimate, data from sensor equipment 40, and the observed NSS signals, and using a computation method which does not, as such, necessitate the use of NSS signals observed before the first point in time, between the first and second points in time, or after the second point in time. Three embodiments of such a computation method, and variants of these embodiments, are described with reference to embodiments CL8, CL9, and CL16 below.

The method of FIG. 9c combines the methods of FIGS. 9a and 9b. That is, the method of FIG. 9c comprises, based on the initial position estimate, data from sensor equipment 40, and the observed NSS signals, and using a computation method which does not, as such, necessitate the use of NSS signals observed before the first point in time, between the first and second points in time, or after the second point in time, generating s50c information usable to estimate the heading of axis 20, and estimating s60c the heading of axis 20 as well.

The wording "using a computation method which does not, as such, necessitate the use of NSS signals observed before the first point in time, between the first and second points in time, or after the second point in time" means that, no matter whether NSS signals are observed at other points in time than at the first and second points in time, steps s50c and/or s60c are performed using a computation method which, by its nature (i.e., by virtue of the underlying operations used for the computation method), is capable of producing an estimated heading without making use of additional NSS signals observed before the first point in time, between the first and second points in time, or after the second point in time. Thus, this does not exclude the optional use of such additional NSS signals in steps s50c and/or s60c, but the computation method as such does not require such additional NSS signals.

Thus, at least the following three sub-embodiments are covered:

(1) a method in which NSS signals are observed before the first point in time, between the first and second points in time, and/or after the second point in time, and the computation method used for estimating the heading (i.e., for realizing steps s50c and s60c) uses but does not as such need the NSS signals observed at these other points in time (these additional NSS signals being merely used for example for improving the performance or simply for practicing a variant of sub-embodiments (2) and (3) described below, although a heading estimation could be obtained without these additional NSS signals);

(2) a method in which NSS signals are observed at other points in time than at the first and second points in time, and the computation method used for estimating the heading (i.e., for realizing steps s50c and s60c) does not use these NSS signals observed at these other points in time; and (3) a method in which NSS signals are not observed at other points in time than at the first and second points in time, and the computation method used for estimating the heading (i.e., for realizing steps s50c and s60c) thus does not use NSS signals observed at these other points in time since these additional NSS signals are not available.

Furthermore, in the method of FIGS. 9a, 9b, and 9c, rigid body 10 is subject to the motion at least during part of said period of time. Said period of time starts at time t1 and ends at time t2 (wherein t1<t2). This includes the following exemplary possibilities, as schematically illustrated in FIG. 17: (a) the motion begins after time t1 and ends before time t2; (b) the motion begins at time t1 and ends before time t2; (c) the motion begins after time t1 and ends at time t2; (d) the motion begins at time t1 and ends at time t2; (e) the motion begins before time t1 and ends before time t2; (f) the motion begins after time t1 and ends after time t2; and (g) the motion begins before time t1 and ends after time t2. The motion may be continuous as well in the sense that the motion may have started long before time t1 and may end long after time t2. In all cases, the NSS signals are observed at least at t1 and t2, and the position of point A is kept fixed relative to the Earth continuously between t1 and t2.

The values of t2−t1 may for example be one receiver epoch (e.g., 0.1 second, 1 second, or 5 seconds) and the method may be applied repeatedly, iteratively improving the heading estimate accuracy. Alternatively, t2−t1 may correspond to multiple receiver epochs. Typically, the heading estimation procedure with a tilt movement may take 5 to 10 seconds, or more typically 2 to 5 seconds, for a survey pole.

In other words, the NSS data rate (or the number of receiver epochs available for processing) may be reduced to two receiver epochs of NSS range measurements at times t1 and t2. More receiver epochs (i.e. NSS signals at more points in times) are not needed, because the method of the third form of the invention still, given an initial heading estimate or not (i.e. unknown initial heading), generally provides a more accurate heading estimate as result (with diminishing improvement in accuracy if the initial estimate is already good). More accurate means that for example the angular range within which the estimated heading can be assumed to be, with a 68 percent probability, is shortened.

The above-referred reduction of receiver epochs is not possible with the method of ref. [2a]. The method of ref. [2a] comprises "determining the absolute heading angle of the pole" (ref. [2a], claim 10; see also for example paragraph [0012]) by "acquiring, for at least three different rod inclinations, the geodetic coordinates [ . . . ] of a top end reference point" in an initialization phase (ref. [2a], claim 7; see also for example paragraph [0012] and FIG. 20). The geodetic coordinates are acquired with "position determination means comprising: satellite positioning means for acquiring the geodetic coordinates of a top end reference point at a certain pole inclination [ . . . ]" (ref. [2a], claim 1; see also for example paragraph [0037] and FIG. 20). That is, the method of ref. [2a] cannot be executed with fewer than three separate movements of the rod.

As apparent from FIG. 17, the motion is an uninterrupted motion, and this uninterrupted motion of rigid body 10, i.e. a single uninterrupted motion, is sufficient to estimate the heading, thus rendering the method much simpler and faster (only requiring point B's horizontal position to change). In contrast, as already discussed above, the method of ref. [2a] requires at least three separate movements (i.e., a composite motion with interruptions, rather than an interrupted motion), and the quality of the produced estimate in ref. [2a] depends on the operator (i.e., the user holding the survey pole) correctly following a more complicated pattern of points.

As also apparent from FIG. 17, rigid body 10 is subjected to no other motion between points in time t1 and t2 than the depicted uninterrupted motion.

Steps s30c to s60c may potentially be carried out as post-processing steps, i.e. after the actual motion. These steps do not have to be carried out in real-time.

Thus, as apparent from the above, steps s50c and/or s60c, whichever is or are applicable, are necessarily performed once the motion has at least started and has been ongoing for a non-null duration, and, in one embodiment, steps s50c and/or s60c may be performed after the motion. Indeed, steps s50c and/or s60c are performed based notably on the observed signals at the first and second points in time, and rigid body 10 is subject to the motion at least during part of the period of time between these two points in time. Once estimated at one point in time, the heading is implicitly known, i.e. can be computed, for previous points in time during the motion. Further, if the motion is still ongoing when steps s50c and/or s60c are performed, the estimated heading is an estimated instantaneous heading, i.e. an estimation of the heading at one point in time, and the estimated value may then be continuously tracked.

Now, an exemplary implementation of the above-referred method according to the third form of the invention will be further described with reference to FIG. 9c.

In particular, in step s30c, an estimate of the position of point B at time t1 can be computed from NSS signals using prior art techniques, as described for example in ref. [4], chapter 9 "GPS Navigation Algorithms".

In some embodiments, point A is located at substantially the same horizontal position as point B at time t1. In these cases, the horizontal position of point A can be estimated to be equal to the horizontal position of point B. The vertical position of point A can be estimated from the length of the lever arm vector from point A to point B and the vertical position of point B, if point A is located above and at substantially the same horizontal position as point B at time t1.

In embodiments with an angle sensor measuring the rotation of rigid body 10 about an Earth-fixed axis or a gyroscope measuring inertial angular rate about the Earth-fixed rotation axis of rigid body 10, or in embodiments with three gyroscopes measuring three-dimensional inertial angular rate, the position of another point, hereinafter referred to as point C, being either a point of rigid body 10 or at a fixed position with respect to rigid body 10 can be estimated with $$r_C^e|_1 = r_{B,NSS}^e|_1 + C_w^e|_1 C_b^w|_1 l_{B \to C}^b \quad (28)$$

where
- $r_C^e|_1$ is the position of point C with respect to the ECEF frame at time t1,
- $r_{B,NSS}^e|_1$ is the estimate of the position of point B at time t1 computed from NSS signals,
- $l_{B \to C}^b$ is the lever arm vector from point B to point C in the body frame,
- $C_b^w|_1$ is the orientation of the body frame with respect to the wander frame at time t1, and
- $C_w^e|_1$ is the orientation of the wander frame with respect to the ECEF frame at time t1.

In these embodiments, the orientation of the body frame with respect to the wander frame at time t1 is estimated as described above with reference to step s30a for the orientation of the body frame with respect to the wander frame during the motion.

The orientation of the wander frame with respect to the ECEF frame at time t1 can be computed from the estimate of the horizontal position of point B and the wander angle with prior art techniques, see for example ref. [1], sections 2.4.2 and 5.3.5.

In step s50c, for example the error in the computed orientation of the body frame with respect to the wander frame is estimated. Alternatively, the unknown wander angle is estimated. How these estimates may for example be generated based on the initial position estimate, data from sensor equipment 40 and the observed NSS signals will be described later for several embodiments, see e.g. steps s64c or s68c.

In step s60c, the heading of an axis of interest of rigid body 10 is estimated as described above with reference to step s60a.

FIG. 10 is a flowchart of a method in one embodiment of the third form of the invention. This embodiment, here referred to as "embodiment CL8", can be broadly described as a NSS position-based method according to the third form of the invention.

In that method, steps s10c, s20c, and s30c, are as discussed above with reference to FIGS. 9a, 9b, and 9c. The method further comprises computing s40c an estimate (hereinafter referred to as "sensor-based estimated position") of the horizontal position, or of a position usable to derive the horizontal position, of point B at time t2, based on data from sensor equipment 40 and the initial position estimate.

Furthermore, estimating s60c the heading of axis 20 comprises the following steps. First, in step s62c, a further estimate (hereinafter referred to as "NSS-based estimated position") of the horizontal position, or of a position usable to derive the horizontal position, of point B at time t2, is computed based on the observed NSS signals. Then, an estimate of the heading of axis 20 is generated s64c based on the sensor-based estimated position estimate and the NSS-based estimated position.

In particular, in step s40c, the sensor-based estimated position of point B at time t2 can be computed with any one of $$r_{B,Sensor}^e|_2 = r_A^e + C_w^e|_2 C_b^w|_2 l_{A \to B}^b \quad (29)$$

$$r_{B,Sensor}^e|_2 = r_B^e|_1 + C_w^e|_2 \Delta r_B^w \quad (30)$$

$$r_{B,Sensor}^e|_2 = r_C^e|_2 - C_w^e|_w C_b^w|_2 l_{B \to C}^b \quad (31)$$

where
- $r_{B,Sensor}^e|_2$ is the sensor-based estimated position of point B at time t2,
- $r_A^e$ is the position of the Earth-fixed point A with respect to the ECEF frame,
- $r_B^e|_1$ is the position of point B with respect to the ECEF frame at time t1,
- $r_C^e|_2$ is the position of point C with respect to the ECEF frame at time t2,
- $C_b^w|_2$ is the orientation of the body frame with respect to the wander frame at time t2,
- $C_w^e|_2$ is the orientation of the wander frame with respect to the ECEF frame at time t2,
- $l_{A \to B}^b$ is the lever arm vector from the Earth-fixed point A to point B in the body frame,
- $\Delta r_B^w$ is the sensor-based delta-position vector of point B in the wander frame, and
- $l_{B \to C}^b$ is the lever arm vector from point B to point C in the body frame.

The orientation of the body frame with respect to the wander frame at time t2 is estimated as described above with reference to step s30b.

The orientation of the wander frame with respect to the ECEF frame at time t2 can be estimated to be equal to the orientation of the wander frame with respect to the ECEF frame at time t1 with negligible error for a movement of point B of less than 100 m (i.e., 100 meters) and unchanged wander angle.

The sensor-based delta-position vector of point B in the wander frame $\Delta r_B^w$ can be estimated as described above with reference to step s40b for a sensor-based delta-position vector of point B between times t1 and t2.

In some embodiments, the position of the Earth-fixed point A is estimated in step s30c and equation (29) can be used in step s40c. In some embodiments, the position of point B with respect to the ECEF frame is estimated in step s30c and equation (30) can be used in step s40c.

In other embodiments, the position of another point, referred to as point C, with respect to the ECEF frame is estimated in step s30c. The sensor-based estimated position of point B at time t2 can be computed from the position of point C with respect to the ECEF frame at time t2 $r_C^e|_2$ with equation (31).

The position of point C at time t2 can be computed with $$r_C^e|_2 = r_C^e|_1 + C_w^e|_2 \Delta r_C^w \quad (32)$$

where
- $r_C^e|_2$ is the position of point C with respect to the ECEF frame at time t2,
- $r_C^e|_1$ is the position of point C with respect to the ECEF frame at time t1, $C_w^e|_2$ is the orientation of the wander frame with respect to the ECEF frame at time t2, and $\Delta r_C^w$ is the sensor-based delta-position vector of point C in the wander frame.

The sensor-based delta-position vector of point C in the wander frame $\Delta r_C^w$ can be estimated as follows:

$$\Delta r_C^w = (C_b^w|_2 - C_b^w|_1) l_{A \to C}^b \quad (33)$$

where $\Delta r_C^w$ is the sensor-based delta-position vector of point C in the wander frame, $C_b^w|_1$, $C_b^w|_2$ are the body-frame-to-wander-frame DCM at times t1 and t2 respectively, and $l_{A \to C}^b$ is the lever arm vector from the Earth-fixed point A to point B in the body frame.

In step s62c, the NSS-based estimate of the position of point B at time t2 can be computed from NSS signals as described with reference to step s30c.

In step s64c, the orientation error $\psi_z$ of the body frame with respect to the wander frame can be estimated by computing the difference of the NSS-based estimate of the position of point B at time t2 and the sensor-based estimated position of point B at time t2, transformed to wander frame coordinates:

$$s = C_w^{e^T}|_2 (r_{B,NSS}^e|_2 - r_{B,Sensor}^e|_2) \quad (34)$$

where s is the difference between NSS-based position of point B at time t2 and the sensor-based estimated position of point B at time t2, $C_w^{e^T}|_2$ is the transpose of the wander-frame-to-ECEF-frame DCM at time t2, $r_{B,NSS}^e|_2$ is the NSS-based estimated position of point B at time t2, and $r_{B,Sensor}^e|_2$ is the sensor-based estimated position of point B at time t2.

The relationship between this vector difference and the orientation error $\psi_z$ can be expressed as $$s = \begin{bmatrix} 1 - \cos(\psi_z) & -\sin(\psi_z) & 0 \\ \sin(\psi_z) & 1 - \cos(\psi_z) & 0 \\ 0 & 0 & 0 \end{bmatrix} C_w^{e^T}\bigg|_2 (r_{B,NSS}^e|_2 - r_{B,NSS}^e|_1) \quad (35)$$

where s is the difference between NSS-based position of point B at time t2 and the sensor-based estimated position of point B at time t2, $\psi_z$ is the orientation error, $C_w^{e^T}|_2$ is the transpose of the wander-frame-to-ECEF-frame DCM at time t2, $r_{B,NSS}^e|_2$ is the NSS-based estimated position of point B at time t2, and $r_{B,NSS}^e|_1$ is the estimate of the position of point B at time t1 computed from NSS signals.

This model can also be extended to account for errors in the NSS-based estimate of the position of point B at time t2 and the sensor-based estimated position of point B at time t2, for example due to errors in the sensor measurements. A state estimator can be applied to estimate all or a selection of these errors in combination with the orientation error $\psi_z$.

The model can also be extended to account for orientation errors in roll and pitch in addition to heading.

The orientation error $\psi_z$ of the body frame with respect to the wander frame can be estimated by solving equation (35).

Alternatively, the orientation error $\psi_z$ of the body frame with respect to the wander frame can be estimated by computing the difference in azimuth angle between the NSS-based delta-position vector and the sensor-based delta-position vector $$\psi_z = \operatorname{atan2}(Y_{NSS}, X_{NSS}) - \operatorname{atan2}(Y_{Sensor}, X_{Sensor}) \quad (36)$$

where $\psi_z$ is the orientation error, $Y_{NSS}$, $X_{NSS}$ are the horizontal coordinates of the NSS-based delta-position vector in the wander frame, and $Y_{Sensor}$, $X_{Sensor}$ are the horizontal coordinates of the sensor-based delta-position vector in the wander frame.

The sensor-based delta-position vector of point B in the wander frame is computed as follows:

$$\Delta r_{B,Sensor} = r_{B,Sensor}^e|_2 - r_{B,NSS}^e|_1 \quad (37)$$

where $\Delta r_{B,Sensor}^w$ is the sensor-based delta-position vector of point B in the wander frame, $r_{B,Sensor}^e|_2$ is the sensor-based estimated position of point B at time t2, and $r_{B,NSS}^e|_1$ is the estimate of the position of point B at time t1 computed from NSS signals.

The NSS-based delta-position vector in the wander frame is computed as follows:

$$\Delta r_{B,NSS}^w = r_{B,NSS}^e|_2 - r_{B,NSS}^e|_1 \quad (38)$$

where $\Delta r_{B,NSS}^w$ is the NSS-based delta-position vector in the wander frame, $r_{B,NSS}^e|_2$ is the NSS-based estimate of the position of point B at time t2, and $r_{B,NSS}^e|_1$ is the estimate of the position of point B at time t1 computed from NSS signals.

The orientation error estimate $\psi_z$ can be used to estimate the heading of an axis of interest of rigid body 10, as described above with reference to step s64a.

In one embodiment, step s50c depicted on both FIGS. 9a and 9c is implemented by step s62c discussed above.

FIG. 11 is a flowchart of a method in one embodiment of the third form of the invention. This embodiment, here referred to as "embodiment CL9", can be broadly described as a NSS measurement-based method according to the third form of the invention.

In that method, steps s10c, s20c, and s30c, are as discussed above with reference to FIGS. 9a, 9b, and 9c. The method further comprises computing s40c an estimate (hereinafter referred to as "sensor-based estimated position") of the horizontal position, or of a position usable to derive the horizontal position, of point B at time t2, based on data from sensor equipment 40 and the initial position estimate. Step 40c is as disclosed above with reference to embodiment CL8 and FIG. 10.

Furthermore, estimating s60c the heading of axis 20 comprises the following steps. First, in step s66c, each of at least one of the NSS satellites 60 is considered (i.e., one of the NSS satellites 60 is considered, some of them are each considered, or all of them are each considered), and for each considered NSS satellite 60, a distance between the sensor-based estimated position and the antenna position of the NSS satellite 60 is computed. Then, an estimate of the heading of axis 20 is generated s68c based on the computed distance(s), and the observed NSS signals.

In particular, in step s66c, distances between the sensor-based estimated position and the position of the phase centers of antennas on transmitting NSS satellites 60 corresponding to one or more NSS signals tracked by the NSS receiver can be computed from estimates of the positions of the satellite antenna phase centers. These position estimates can be computed from NSS measurements and NSS satellite orbit data using prior art techniques, as for example described in ref. [4], chapter 4; and ref. [5].

In step s68c, the orientation error $\psi_z$ of the body frame with respect to the wander frame can be estimated by computing the differences between NSS range measurements and corresponding distances between the sensor-based estimated position and the position of the phase centers of antennas on transmitting NSS satellites 60, as follows:

$$m_j = \rho_j|_{NSS} - o_j|_{Sensor} \quad (39)$$

where $m_j$ is the j-th difference between NSS range measurements and computed distances, $\rho_j|_{NSS}$ is the j-th NSS range measurement, and $o_j|_{Sensor}$ is the computed distance between the sensor-based estimated position and the j-th position of the phase center of the antenna on a transmitting NSS satellite.

The relationship between this scalar difference and the orientation error $\psi_z$ can be expressed as $$m_j = a_j^w \cdot \left( \begin{bmatrix} 1-\cos(\psi_z) & -\sin(\psi_z) & 0 \\ \sin(\psi_z) & 1-\cos(\psi_z) & 0 \\ 0 & 0 & 0 \end{bmatrix} C_w^{eT}\bigg|_2 (r^e_{B,NSS}|_2 - r^e_{B,NSS}|_1) \right) + c\Delta t \quad (40)$$

where $m_j$ is the j-th difference between NSS range measurements and computed distances, $a_j^w$ is the j-th line-of-sight-unit vector in the wander frame, $\psi_z$ is the orientation error, $C_w^{eT}\big|_2$ is the transpose of the wander-frame-to-ECEF-frame DCM at time t2, $r^e_{B,NSS}|_2$ is the NSS-based estimated position of point B at time t2, $r^e_{B,NSS}|_1$ is the estimated of the position of point B at time t1 computed from NSS signals, and $c\Delta t$ is the NSS receiver clock error multiplied by the speed of light.

This model can also be extended to account for errors in the NSS range measurement and errors in the sensor-based estimated position of point B, for example due to errors in the sensor measurements. A state estimator can be applied to estimate all or a selection of these errors in combination with the orientation error $\psi_z$. The model can also be extended to account for orientation errors in roll and pitch in addition to heading.

Generally, four or more scalar difference equations are solved to estimate orientation error $\psi_z$, which is not a sever restriction due to the large number of NSS satellites.

Alternatively, projections of the sensor-based delta-position vector (see equation (37)) and the NSS-based delta-position vector (see equation (38)) in direction of line of sight to the NSS satellites 60 can be computed as described above for the projection of the sensor-based delta-position vector with reference step s66b. The sensor-based delta-position vector of point B in the wander frame and the NSS-based delta-position vector in the wander frame can be computed as described above with reference to step s64c. The orientation error $\psi_z$ of the body frame with respect to the wander frame can be estimated as described above with reference to step s68b.

The orientation error estimate $\psi_z$ can be used to estimate the heading of an axis of interest of rigid body 10, as described above with reference to step s64a.

In one embodiment, step s50c depicted on both FIGS. 9a and 9c is implemented by step s66c discussed above.

In one embodiment (here referred to as "embodiment CL10", and not specifically illustrated in the drawings), applicable to the first, second and third forms of the invention as described above, sensor equipment 40 comprises: three gyroscopes arranged for measuring the angular rate about three linearly independent axes of rigid body 10; and two accelerometers arranged for measuring the specific force in direction of two linearly independent axes of rigid body 10. The two linearly independent axes may for example be perpendicular to the axis passing through A and B for a survey pole.

In embodiment CL10, the body frame can be defined with the first base vector aligned with the input axis of the first accelerometer. The third base vector can be defined perpendicular to the plane defined by the input axes of the two accelerometers. The third base vector is chosen such that the inner product with the vertical base vector of the wander frame is positive. That is, it points up if the wander frame is defined with a vertical base vector pointing up, or it points down if the wander frame is defined with a vertical base vector pointing down. The second base vector of the body frame completes the right-handed Cartesian frame, i.e. it is the vector cross product of the third and the first base vectors.

In embodiment CL10, the initial roll and pitch angles of the body frame can be computed from accelerometer measurements with equations (48) and (49) as described later with reference to step s69c. The initial heading angle can be set to a predefined value, for example zero. The initial body-frame-to-wander-frame DCM can be computed from roll, pitch and heading angles with equation (53) as described later with reference to step s69c.

The orientation of the body frame with respect to the wander frame can be propagated in time as described above with reference to step s30a, starting from the initial orientation using a three-dimensional measurement of inertial angular rate. The inertial angular rates vector in the body frame can be computed as follows:

$$\omega_{ib} = [u_{g1}^b \ u_{g2}^b \ u_{g3}^b]^{-T} \begin{bmatrix} \tilde{g}_1 \\ \tilde{g}_2 \\ \tilde{g}_3 \end{bmatrix} \text{ where} \quad (41)$$

-continued $\omega_{ib}$ is the inertial angular rates vector in the body frame, $u^b_{g1}, u^b_{g2}, u^b_{g3}$ are the unit vectors in direction of the input axes of the first, second and third gyroscope respectively, and $\tilde{g}_1, \tilde{g}_2, \tilde{g}_3$ are the inertial angular rate measurements of the first, second and third gyroscope respectively.

If integrating gyroscopes are used, inertial angular rate measurements can for example be computed from the integrated measurements (commonly referred to as delta-thetas) by multiplication with the inverse measurement time interval.

The change of the body frame with respect to the ECI frame (7) can be computed using prior art techniques, for example by time integration of the following differential equation, starting from the 3×3 identity matrix at the initial time:

$$\dot{C}_b^{i^T} = -[\omega_{ib} \times] C_b^{i^T} \quad (42)$$

where
$\dot{C}_b^{i^T}$ is the time derivative of the transpose of the body-frame-to-ECI-frame DCM,
$C_b^{i^T}$ is the transpose of the body-frame-to-ECI-frame DCM, and
$[\omega_{ib} \times]$ is the skew-symmetric matrix equivalent of the cross product of the inertial angular rates vector in the body frame.

The time-integrated DCM can be normalized repeatedly to account for time integration errors using prior art techniques, see for example Savage, P. G. (1984). Strapdown System Algorithms, Advances in Strapdown Inertial Systems, section 3.5.1. Lecture Series 133. AGARD, Advisory Group for Aerospace Research and Development (hereinafter referred to as reference [8]).

This way of computing the orientation of the body frame with respect to the wander frame is advantageous, because it does not require rigid body 10 to rotate about an Earth-fixed rotation axis or to be oriented such that the axis from point A to point B is vertical or substantially vertical at a point in time.

In embodiment CL10, according to the first form of the invention, the angular rate vector of the body frame with respect to the ECEF frame in equation (11) can be computed from the three-dimensional measurement of inertial angular rate (41) as described above with reference to step s40a.

In one embodiment (here referred to as "embodiment CL11", and not specifically illustrated in the drawings), also applicable to the first, second and third forms of the invention as described above, sensor equipment 40 comprises: three gyroscopes arranged for measuring the angular rate about three linearly independent axes of rigid body 10; and three accelerometers arranged for measuring the specific force in direction of three linearly independent axes of rigid body 10.

In embodiment CL11, the body frame can be defined as described above with reference to embodiment CL10. Using three accelerometers is advantageous, because techniques are available for computing initial roll and pitch angles of the body frame that do not require the computation of gravity, and these techniques can be used to compute roll angle within the range from −180° (i.e., −180 degrees) to 180° (i.e., 180 degrees), as described for example in ref. [1], section 10.1.1.

The inertial angular rates vector in the body frame can be computed from the measurements of the gyroscopes using equation (41) as described above with reference to embodiment CL10. The specific force vector in the body frame can be computed from the measurements of the accelerometers in a similar way. The gyroscopes and accelerometers can be arranged in an inertial sensor assembly, or inertial measurement unit (IMU), see for example ref. [1], section 4.3.

The three-dimensional measurements of inertial angular rates and specific force can be used to compute the orientation of the body frame with respect to the wander frame, the position of the inertial sensor assembly reference point and the velocity of said reference point from inertial navigation equations using prior art techniques. See for example ref. [1], chapter 5 and section 5.3.5, and ref. [2], chapter 4 and section 3.5.4. The initial orientation of the body frame with respect to the wander frame can be computed as described above with reference to embodiment CL10. The initial position and velocity of the reference point can be computed from estimates of the initial position and velocity of point B computed from NSS signals, the initial orientation of the body frame with respect to the wander frame, the initial orientation of the wander frame with respect to the ECEF frame and the three-dimensional measurement of inertial angular rates.

This is advantageous, because the inertial navigation equations can be used to compute body frame orientation in addition to position and velocity of the reference point during the performance of the above-described method for estimating the heading of an axis of rigid body 10, and, in addition, after point A is removed from its Earth-fixed position. This, for example, allows propagating in time the heading estimated with the above-described method for estimating the heading, so that it can be used for navigation of rigid body 10 after carrying out the method for estimating the heading and after point A is removed from its Earth-fixed position. The heading error estimated as described above with reference to steps s50a, s50b and s50c can for example be used to correct the body frame orientation as described above with reference to equation (17) or using other prior art techniques, such as for example a state estimation technique, as described for example in ref. [1], chapters 12 and 14 and for example using a measurement technique similar to the one described in ref. [1], section 14.3.1.2.

In addition, using the inertial navigation for computing the orientation of the body frame with respect to the wander frame is advantageous, because it does not require rigid body 10 to rotate about an Earth-fixed rotation axis or to be oriented such that the axis from point A to point B is vertical or substantially vertical at a point in time.

Figure 12A:
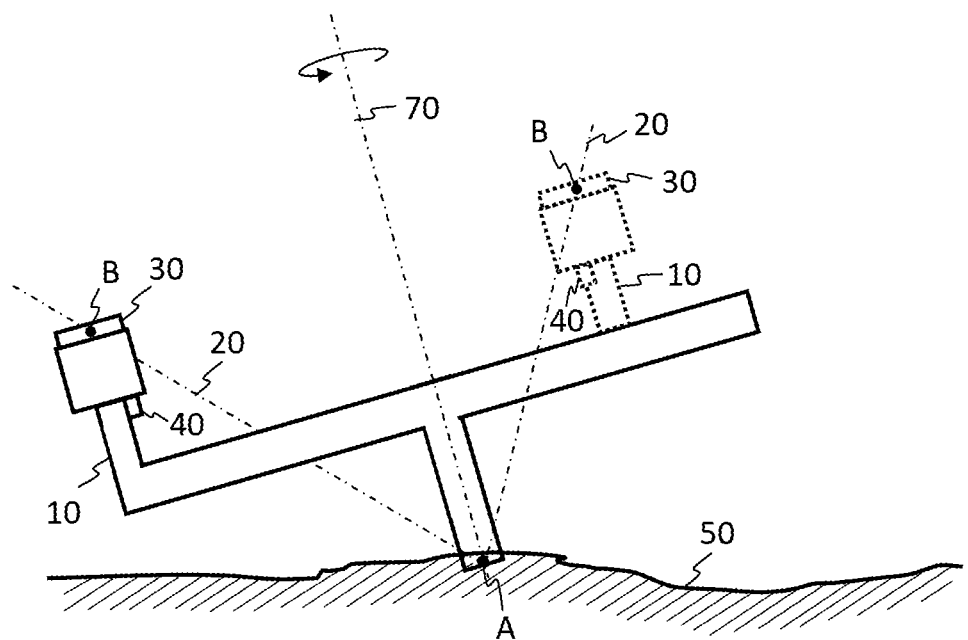
FIG. 12a schematically illustrates a side view of a rigid body rotating around a titled Earth-fixed axis, wherein the rigid body is subjected to a motion in accordance with one embodiment of the invention.
Figure 12B:
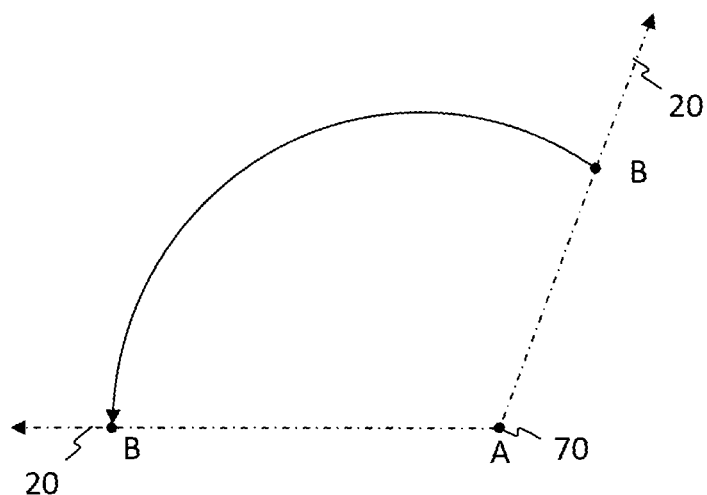

FIG. 12a schematically illustrates a side view of a rigid body 10 rotating around a titled Earth-fixed axis 70 passing through point A, in the context of which the heading of axis 20 of rigid body 10 may be estimated in one embodiment of the first, second or third form of the invention. Axis 70 may be only temporarily Earth-fixed, such as for example in the case of a rotating-platform excavator moving the platform and the arm only. Rigid body 10 is shown at two points in time, using dotted lines when at a first point in time (exemplary first point of the motion) and using solid lines when at a second point in time (exemplary second point of the motion). FIG. 12b schematically illustrates a top view of the motion. Rigid body 10 is equipped with an NSS receiver antenna 30, and the phase center thereof is located at point B. Point B is located away from axis 70 and from point A, which is on axis 70. That is, axis 70 passes through point A. Point A is either a point of rigid body 10 (as illustrated in FIG. 12*a*) or a point being at a fixed position with respect to rigid body 10.

In that respect, a configuration in which point A is located outside rigid body 10, at a fixed position with respect thereto, may for example be a configuration (not illustrated in the drawings) in which rigid body 10 has a torus-like shape rotating on a circular rail, and point A is on the torus rotation axis 70.

Further, rigid body 10 is equipped with sensor equipment 40, as will be explained below.

In this embodiment, the motion constraint is as follows: Rigid body 10 rotates about Earth-fixed rotation axis 70 (axis 70 having therefore constant Earth-frame coordinates), and the distance between point B and axis 70 is larger than zero and constant. The distance is known or obtained. The tilt of axis 70 with respect to the vertical may be non-zero and known or obtained. This motion constraint is here referred to as "motion constraint (MC-B)". Motion constraint (MC-B) is a specific, and more constrained, form of motion constraint (MC-A). The distance between point B and axis 70 may for example be about 2 meters for a Caterpillar 311B hydraulic excavator, or about 0.5 meter for a small GNSS total station.

In one embodiment (here referred to as "embodiment CL12"), a method is provided with motion constraint (MC-B), and with rigid body 10 being equipped with sensor equipment 40 comprising (a) two accelerometers arranged for measuring the specific force in direction of two linearly independent axes (for example perpendicular to axis 70); and (b) at least one of: a gyroscope arranged for measuring the angular rate about axis 70, and an angle sensor arranged for measuring orientation about axis 70. The angle sensor is fixed to the Earth or an Earth-fixed structure and measures the rotation of rigid body 10 about the rotation axis 70. The motion causing point B's horizontal position to change while keeping point A's position fixed relative to the Earth comprises a rotation about axis 70, with, according to motion constraint (MC-B), the distance between point B and axis 70 being larger than zero and constant. The method outputs information usable to estimate the heading of axis 20 and/or an estimate of the heading of axis 20.

In embodiment CL12, the body frame can be defined with the first base vector aligned with the input axis of the first accelerometer. The third base vector can be defined perpendicular to the plane defined by the input axes of the two accelerometers. The third base vector is chosen such that the inner product with the vertical base vector of the wander frame is positive. That is, it points up if the wander frame is defined with a vertical base vector pointing up, or it points down if the wander frame is defined with a vertical base vector pointing down. The second base vector of the body frame completes the right-handed Cartesian frame, i.e. it is the vector cross product of the third and the first base vectors.

The initial orientation of the body frame with respect to the wander frame can be computed from initial values of roll, pitch and heading angles of the body frame. The initial roll and pitch angles of the body frame can be computed from accelerometer measurements with equations (48) and (49) as described later with reference to step s69*c*. The initial heading angle of the body frame can be set to a predefined value, for example zero. The initial body-frame-to-wander-frame DCM can be computed from roll, pitch and heading angles with equation (53) as described later with reference to step s69*c*.

In this embodiment, according to the first form of the invention, the orientation of the body frame with respect to the wander frame during the motion can be computed as described above with reference to step s30*a*. In embodiments with an angle sensor, equation (5) is used to compute the change of the body frame orientation in equation (10) as described above with reference to step s30*a*. In embodiments with a gyroscope, equation (6) is used instead, as described above with reference to step s30*a*. The sensor-based velocity vector of point B in the wander frame is computed in embodiments with an angle sensor or a gyroscope as described above with reference to step s40*a*. Information usable to estimate the heading of the at least one axis of interest can then be generated as described above with reference to step s50*a*. The heading of the at least one axis of interest can be estimated as described above with reference to step s60*a*.

In this embodiment, according to the second form of the invention, the orientation, at times t1 and t2, of a body frame of rigid body 10 with respect to a reference frame can be estimated as described above with reference to step s30*b*. The sensor-based delta-position vector of point B in the wander frame can be computed as described above with reference to step s40*b*. Information usable to estimate the heading of the at least one axis of interest can then be generated as described above with reference to step s50*b*. The heading of the at least one axis of interest can be estimated as described above with reference to step s60*b*.

In this embodiment, according to the third form of the invention, the initial position estimate can for example be computed from equation (28), as described above with reference to step s30*c*, where point C could for example be a point on the rotation axis 70. The sensor-based estimated position of point B at time t2 can be computed from equation (31) as described above with reference to step s40*c*. The orientation, at times t1 and t2, of a body frame of rigid body 10 with respect to a reference frame in equations (28) and (31) can be estimated as described above with reference to step s30*b*. Information usable to estimate the heading of the at least one axis of interest can then be generated as described above with reference to step s50*b*. The heading of the at least one axis of interest can be estimated as described above with reference to step s60*b*.

The more specific and constrained motion constraint MC-B is advantageous, because the above-described method for estimating the heading of an axis of rigid body 10 can be implemented with sensor equipment 40 comprising a smaller number of sensors.

In one embodiment (here referred to as "embodiment CL13"), a method involves motion constraint (MC-B), and a rigid body 10 being equipped with sensor equipment 40 comprising an angle sensor arranged for measuring orientation about axis 70 without any accelerometer. The motion causing point B's horizontal position to change while keeping point A's position fixed relative to the Earth also comprises a rotation about axis 70, with, according to motion constraint (MC-B), the distance between point B and axis 70 being larger than zero and constant. The method also outputs information usable to estimate the heading of axis 20 and/or an estimate of the heading of axis 20.

In embodiment CL13, the body frame can be defined with the third base vector aligned with the rotation axis 70. The third base vector is chosen such that the inner product with the vertical base vector of the wander frame is positive. That is, it points up if the wander frame is defined with a vertical base vector pointing up, or it points down if the wander frame is defined with a vertical base vector pointing down. The first base vector of the body frame is defined perpendicular to the third base vector, pointing from a point on axis 70 to point B. The second base vector of the body frame completes the right-handed Cartesian frame, i.e. it is the vector cross product of the third and the first base vectors.

When rigid body 10 is rotated about axis 70 to come to an orientation such that the second base vector lies in the horizontal and the inner product of the first base vector of the body frame with the vertical base vector of the wander frame is negative (i.e. it points up if the wander frame is defined with a vertical base vector pointing down, or it points down if the wander frame is defined with a vertical base vector pointing up), said orientation hereinafter referred to as "reference angular position", the roll and pitch angles of the body frame are:

$$\theta = \gamma \quad (43)$$

$$\phi = 0 \quad (44)$$

where
$\theta$ is the pitch angle of the body frame in the "reference angular position",
$\gamma$ is the tilt angle of the rotation axis 70 (i.e. the deflection of axis 70 from the vertical),
$\phi$ is the roll angle of the body frame in the "reference angular position".

The angle measured by the angle sensor when rigid body 10 is at the reference angular position is hereinafter referred to as "reference angle".

The initial body-frame-to-wander-frame DCM can be computed from the known or obtained tilt angle of the rotation axis 70 (i.e. the deflection of axis 70 from the vertical), the angle sensor measurement and the known or obtained reference angle as follows:

$$C_b^w|_0 = \begin{bmatrix} \cos(\gamma) & 0 & \sin(\gamma) \\ 0 & 1 & 0 \\ -\sin(\gamma) & 0 & \cos(\gamma) \end{bmatrix} \quad (45)$$

$$\left(I + \sin(\alpha_0 - \alpha_{ref})[u^b \times] + (1 - \cos(\alpha_0 - \alpha_{ref}))[u^b \times]^2\right)$$

where $C_b^w|_0$ is the initial body-frame-to-wander-frame $DCM$, $\gamma$ is the tilt angle of the rotation axis 70, $I$ is the $3 \times 3$ identity matrix, $\alpha_0$ is the measured initial angular position, $\alpha_{ref}$ is the reference angle, and $[u^b \times]$ is the skew-symmetric matrix equivalent of the cross product of the unit vector in direction of the Earth-fixed rotation axis in coordinates of the body frame.

Information usable to estimate the heading of the at least one axis of interest can be generated as described above with reference to embodiment CL12. The heading of the at least one axis of interest can be estimated as described above with reference to embodiment CL12.

This way of computing the initial roll and pitch angles of the body frame is advantageous, because the above-described method for estimating the heading of an axis of rigid body 10 can be implemented with sensor equipment 40 comprising a smaller number of sensors.

Figure 13A:
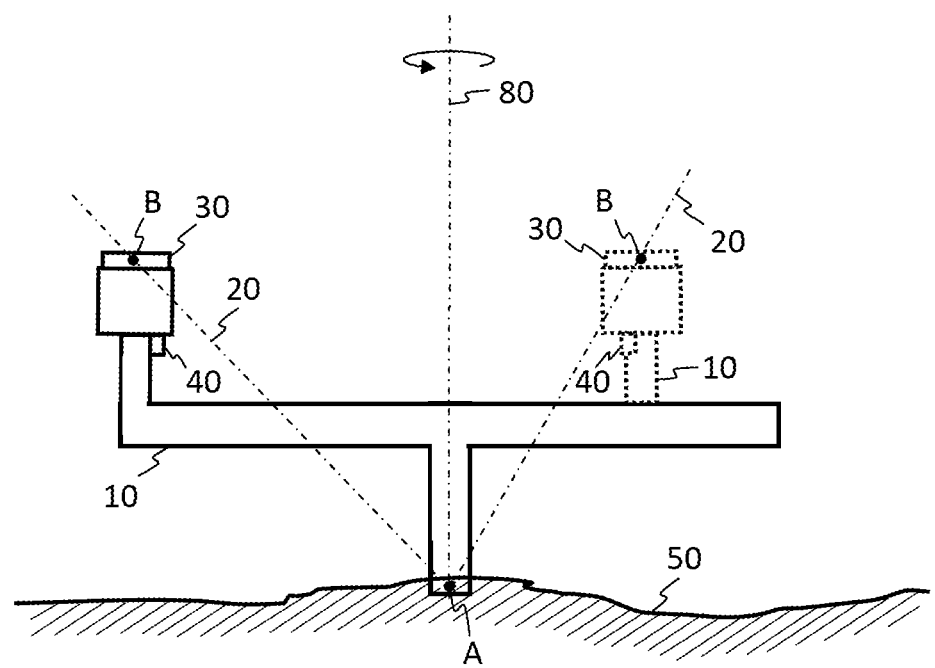
FIG. 13a schematically illustrates a side view of a rigid body rotating around a vertical or substantially vertical Earth-fixed axis, wherein the rigid body is subjected to a motion in accordance with one embodiment of the invention.
Figure 13B:
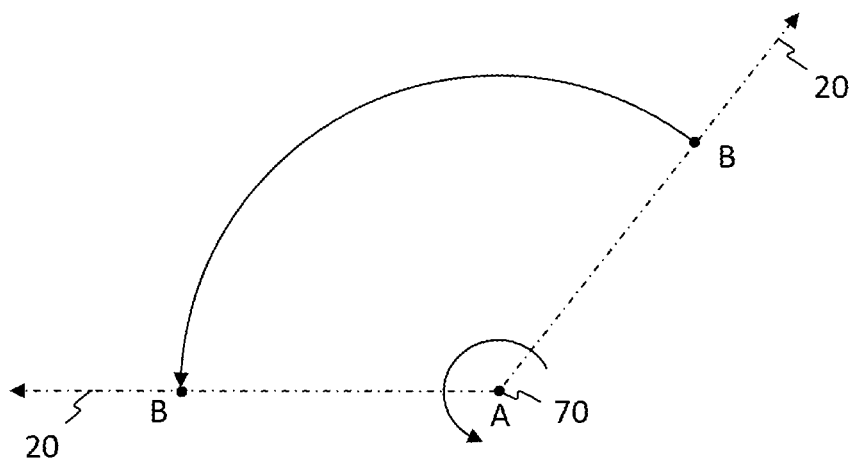

FIG. 13a schematically illustrates a side view of a rigid body 10 which differs from that of FIG. 12a in that, in FIG. 13a, rigid body 10 rotates around a vertical or substantially vertical Earth-fixed axis 80 passing through point A. FIG. 13b schematically illustrates a top view of the motion.

In this embodiment (here referred to as "embodiment CL14"), the motion constraint is as follows: Rigid body 10 rotates about a vertical or substantially vertical Earth-fixed rotation axis 80, and the distance between point B and axis 80 is larger than zero and constant. The distance is known or obtained. This motion constraint is here referred to as "motion constraint (MC-B2)". Motion constraint (MC-B2) is a specific, and more constrained, form of motion constraint (MC-B). The distance between point B and axis 70 may for example be about 2 meters for a Caterpillar 311B hydraulic excavator, or about 0.5 meter for a small GNSS total station.

In one embodiment, a method involves motion constraint (MC-B2), and a rigid body 10 being equipped with sensor equipment 40 comprising at least one of: (a) a gyroscope arranged for measuring the angular rate about axis 80; and (b) an angle sensor arranged for measuring orientation about axis 80.

The motion causing point B's horizontal position to change while keeping point A's position fixed relative to the Earth comprises a rotation about axis 80, with, according to motion constraint (MC-B2), the distance between point B and axis 80 being larger than zero and constant. The method outputs information usable to estimate the heading of axis 20 and/or an estimate the heading of axis 20. The distance between point B and axis 70 may for example be about 2 meters for a Caterpillar 311B hydraulic excavator, or about 0.5 meter fora GNSS total station.

In embodiment CL14, the body frame can be defined with the third base vector aligned with the rotation axis 80. The third base vector is chosen such that the inner product with the vertical base vector of the wander frame is positive. That is, it points up if the wander frame is defined with a vertical base vector pointing up, or it points down if the wander frame is defined with a vertical base vector pointing down. The first base vector of the body frame is defined perpendicular to the third base vector, pointing from a point on axis 80 to point B. The second base vector of the body frame completes the right-handed Cartesian frame, i.e. it is the vector cross product of the third and the first base vectors.

The initial body-frame-to-wander-frame DCM can be set to $$C_b^w|_0 = I \quad (46)$$

where
$C_b^w|_0$ is the initial body-frame-to-wander-frame DCM,
I is the 3×3 identity matrix.

Information usable to estimate the heading of the at least one axis of interest can be generated as described above with reference to embodiment CL12. The heading of the at least one axis of interest can be estimated as described above with reference to embodiment CL12.

This way of determining the initial orientation of the body frame described above is advantageous, because the above-described method for estimating the heading of an axis of rigid body 10 can be implemented with sensor equipment 40 comprising a smaller number of sensors.

In one embodiment (here referred to as "embodiment CL15", and not specifically illustrated in the drawings), which is applicable to the second and third forms of the invention as described above, the motion constraint is as follows: The motion causing point B's horizontal position to change while keeping point A's position fixed relative to the Earth begins from a state in which an axis 20 passing through point A and point B is vertical or substantially vertical. In other words, the motion begins from a state in which point B starts from the same horizontal position as that of point A. This motion constraint is here referred to as "motion constraint (MC-A2)". Motion constraint (MC-A2) is a specific, and more constrained, form of motion constraint (MC-A).

In embodiment CL15, the method involves a rigid body 10 equipped with sensor equipment 40 comprising two accelerometers arranged for measuring the specific force in direction of two linearly independent axes (for example perpendicular to axis 20 of FIG. 1a) of rigid body 10.

In embodiment CL15 applied to the second form of the invention (here referred to as "embodiment CL15-2"), axis 20 passing through point A and point B is still vertical or substantially vertical at time t1, and the orientation, at times t1 and t2, of a body frame of rigid body 10 with respect to a reference frame in step s30b can be estimated as follows:

The roll and pitch angles of the body frame at times t1 and t2 can be computed from accelerometer measurements with equations (48) and (49) as described later with reference to step s69c. The heading angle of the body frame can be set to a predefined value, for example zero, for both points in time. The body-frame-to-wander-frame DCM at times t1 and t2 $C_b^w|_1$, $C_b^w|_2$ can be computed from roll, pitch and heading angles with equation (53) as described later with reference to step s69c.

The body-frame-to-wander-frame DCM at times t1 and t2 represent the orientation of the body frame with respect to the wander frame at the two points in time. They can be used in step s40d to compute sensor-based delta-position vector of point B in the wander frame from equation (22). Because the motion begins, at time 1 or after time t1, from a state in which an axis passing through point A and point B is vertical or substantially vertical in embodiment CL15-2, the error in the heading at time t1 is negligible in equation (22).

Alternatively, the orientation of the body frame at time t1 can be neglected in embodiment CL15-2, because the lever arm vector from point A to point B in the wander frame is known at time t1 (since the motion begins at or after time t1). This lever arm vector can be used to substitute the product of the body-frame-to-wander-frame DCM at time t1 and the lever arm vector in the body frame in equation (22) as follows:

$$C_b^w|_1 \, l_{A \to B}^b = l_{A \to B}^w|_1 \qquad (47)$$

where $l_{A \to B}^b$ is the lever arm vector from the Earth-fixed point A to point B in the body frame, $C_b^w|_1$, is the body-frame-to-wander-frame DCM at time t1, and $l_{A \to B}^w|_1$ is the lever arm vector from the Earth-fixed point A to point B in the wander frame at time t1.

Information usable to estimate the heading of the at least one axis of interest can then be generated as described above with reference to step s50b. The heading of the at least one axis of interest can be estimated as described above with reference to step s60b.

In embodiment CL15 applied to the third form of the invention (here referred to as "embodiment CL15-3"), the orientation of the body frame with respect to the wander frame at time t2 can be estimated as described above. This orientation can be used in step s40c to compute the sensor-based estimated position of point B at time t2 from equation (29).

Information usable to estimate the heading of the at least one axis of interest can then be generated as described above with reference to step s50b. The heading of the at least one axis of interest can be estimated as described above with reference to step s60b.

FIG. 14 is a flowchart of a method in one embodiment of the third form of the invention. In this embodiment (here referred to as "embodiment CL16"), sensor equipment 40 comprises two accelerometers arranged for measuring the specific force in direction of two linearly independent axes of rigid body 10. Furthermore, the motion causing point B's horizontal position to change while keeping point A's position fixed relative to the Earth begins, at time 1 or after time t1, from a state in which an axis 20 passing through point A and point B is vertical or substantially vertical. In other words, axis 20 passing through point A and point B is still vertical or substantially vertical at time t1. That is, the motion constraint in this embodiment, i.e. embodiment CL16, is motion constraint (MC-A2).

In that method, steps s10c, s20c, and s30c, are as discussed above with reference to FIGS. 9a, 9b, and 9c. The method further comprises computing s40d a further estimate (here referred to as "NSS-based estimated position") of the horizontal position, or of a position usable to derive the horizontal position, of point B at time t2, based on the observed NSS signals. Furthermore, estimating s60c the heading of axis 20 comprises the following step: generating s69c an estimate of the heading of axis 20 based on the initial position estimate, the NSS-based estimated position, and data from sensor equipment 40.

In step s40d, the NSS-based estimated position of point B, at time t2, is computed from NSS signals using prior art techniques, as for example described in ref. [4], chapter 9.

In step s69c, the horizontal components of the delta-position vector of point B in the wander frame $X_{NSS}$ and $Y_{NSS}$ are computed from the NSS-based estimated position of point B at time t2 and the initial position estimate computed in step s30c.

In the following, the body frame is defined with the first base vector aligned with the input axis of the first accelerometer. The third base vector is defined perpendicular to the plane defined by the input axes of the two accelerometers. The third base vector is chosen to point in the direction of the vertical base vector of the wander frame when rigid body 10 is oriented such that the plane defined by the input axes of the two accelerometers is level and point B is above point A. The second base vector of the body frame completes the right-handed Cartesian frame, i.e. it is the vector cross product of the third and the first base vectors.

The roll and pitch of the body frame at time t2 can be computed from measured gravity in direction of the first and second base vectors as follows:

$$\theta = \operatorname{asin}\left(\frac{\tilde{a}_x}{\gamma_0}\right) \qquad (48)$$

-continued $$\phi = \operatorname{asin}\left(-\frac{\tilde{a}_x}{\gamma_0 \cos(\theta)}\right) \quad (49)$$

where $\theta$ is the pitch angle of the body frame, $\phi$ is the roll angle of the body frame, $\tilde{a}_x, \tilde{a}_y$ are the gravity measurements in direction of the first and second base vectors of the body frame respectively, and $\gamma_0$ is the vertical component of gravity in the wander frame.

Arranging the accelerometers such that their input axes are perpendicular to the axis from point A to point B is advantageous, because equations (48) and (49) are then valid to compute roll and pitch for any orientation of the body where point B is higher than point A, i.e. because the roll and pitch can be computed for tilt angles of axis AB (the axis from point A to point B) up to 90 degrees.

The vertical component of gravity in the wander frame can be computed with the normal gravity model, as for example described in Chapter 4 in NIMA Technical Report TR8350.2, "Department of Defense World Geodetic System 1984, Its Definition and Relationships With Local Geodetic Systems", third edition, amendment 1, 3 Jan. 2000 (hereinafter referred to as reference [9]).

The gravity measurements in direction of the first and second base vectors of the body frame can be computed from the accelerometer measurements of gravity as follows:

$$\tilde{a}_x = \tilde{a}_1 \quad (50)$$

$$\tilde{a}_y = \frac{\tilde{a}_2}{\sin(\alpha)} - \frac{\cos(\alpha)\tilde{a}_1}{\sin(\alpha)} \quad (51)$$

where $\tilde{a}_x, \tilde{a}_y$ are the gravity measurements in direction of the first and second base vectors of the body frame respectively, $\tilde{a}_1, \tilde{a}_2$ are the gravity measurements of the first and second accelerometers respectively, and $\alpha$ is the angle between in input axis of the first and the second accelerometer, counted positive in right-hand direction of rotation about the third base vector of the body frame.

The accelerometers measure gravity when rigid body 10 is substantially standing still. Alternatively, the accelerometers may be installed close to the Earth-fixed point A, so that they can be used to measure gravity during the motion.

The heading of the body frame can be computed by solving the following equation:

$$\begin{bmatrix} 1 & 0 & 0 \\ 0 & 1 & 0 \end{bmatrix} C_b^w l_{A \to B}^b = \begin{bmatrix} X_{NSS} \\ Y_{NSS} \end{bmatrix} \quad (52)$$

where $C_b^w$ is the body-frame-to-wander-frame $DCM$, $l_{A \to B}^b$ is the lever arm vector from the Earth-fixed point A to point B in the body frame, and $X_{NSS}, Y_{NSS}$ are the horizontal components of the delta-postion vector of point B in the wander frame.

The body-frame-to-wander-frame DCM $C_b^w$ is related to the measured roll and pitch angles and the heading angle as follows:

$$C_b^w = \begin{bmatrix} \cos(\psi) & -\sin(\psi) & 0 \\ \sin(\psi) & \cos(\psi) & 0 \\ 0 & 0 & 1 \end{bmatrix} \begin{bmatrix} \cos(\theta) & \sin(\phi)\sin(\theta) & \cos(\phi)\sin(\theta) \\ 0 & \cos(\phi) & -\sin(\phi) \\ -\sin(\theta) & \sin(\phi)\cos(\theta) & \cos(\phi)\cos(\theta) \end{bmatrix} \quad (53)$$

where $C_b^w$ is the body-frame-to-wander-frame $DCM$, $\phi, \theta$ are the roll and pitch angles of the body frame respectively, and $\psi$ is the heading angle of the body frame.

With known lever arm vector $l_{A \to B}^b$, estimated horizontal components of the delta-position vector of point B $X_{NSS}$, $Y_{NSS}$ and measured roll and pitch angles of the body frame $\theta, \phi$, inserting equation (53) into equation (52) gives a system of two trigonometric equations of the heading angle of the body frame $\psi$:

$$\begin{bmatrix} \cos(\psi) & -\sin(\psi) \\ \sin(\psi) & \cos(\psi) \end{bmatrix} \begin{bmatrix} A \\ B \end{bmatrix} = \begin{bmatrix} X_{NSS} \\ Y_{NSS} \end{bmatrix} \quad (54)$$

where $A, B$ are the coefficients of the system of equations computed from known quantities as described below, $\psi$ is the heading angle of the body frame, and $X_{NSS}, Y_{NSS}$ are the horizontal components of the delta-position vector of point B in the wander frame.

The coefficients of the system of equations are computed from the known lever arm vector $l_{A \to B}^b$ and the measured roll and pitch angles of the body frame $\theta, \phi$ as follows:

$$\begin{bmatrix} A \\ B \end{bmatrix} = \begin{bmatrix} 1 & 0 & 0 \\ 0 & 1 & 0 \end{bmatrix} \begin{bmatrix} \cos(\theta) & \sin(\phi)\sin(\theta) & \cos(\phi)\sin(\theta) \\ 0 & \cos(\phi) & -\sin(\phi) \\ -\sin(\theta) & \sin(\phi)\cos(\theta) & \cos(\phi)\cos(\theta) \end{bmatrix} l_{A \to B}^b \quad (55)$$

where $A, B$ are the coefficients of the system of equations (54), $\phi, \theta$ are the roll and pitch angles of the body frame respectively, and $l_{A \to B}^b$ is the lever arm vector from the Earth-fixed point A to point B in the body frame.

The heading angle of the body frame can be estimated by solving the system of trigonometric equations (54) with the coefficients computed from equation (55).

The heading of the axis of interest can then be estimated as described above with reference to step s60*a*, using the estimated roll, pitch and heading of the body frame to compute the corrected body-frame-to-wander-frame DCM $\hat{C}_b^w$ from equation (53).

The invention also relates, in some embodiments, to apparatuses provided for estimating, or at least for generating information usable to estimate, the heading of at least one axis 20 of interest of a rigid body 10. In particular, these apparatuses comprise hardware and/or software logic configured for performing at least one of the following sets of operations: (i) steps s30*a*, s40*a*, and s50*a* (as notably illustrated by FIGS. 3*a* and 3*c*); (ii) steps s30*a*, s40*a*, and s60*a* (as notably illustrated by FIGS. 3*b* and 3*c*); (iii) steps s30*b*, s40*b*, and s50*b* (as notably illustrated by FIGS. 6*a* and 6*c*); (iv) steps s30*b*, s40*b*, and s60*b* (as notably illustrated by FIGS. 6*b* and 6*c*); (v) steps s30*c* and s50*c* (as notably illustrated by FIGS. 9*a* and 9*c*); and (vi) steps s30*c* and s60*c* (as notably illustrated by FIGS. 9*b* and 9*c*).

Any of the above-described methods and their embodiments may be implemented, at least partially, by means of a computer program or a set of computer programs. The computer program(s) may be loaded on an apparatus with an embedded or remotely attached control unit, wherein the apparatus may for example be a NSS receiver (running on a rover station), with or without a hand-held controller. Therefore, the invention also relates to computer programs, which, when carried out on an apparatus, such as for example a NSS receiver (running on a rover station), with or without a hand-held controller, carries out any one of the above-described methods and their embodiments.

The above-described methods may for example be implemented, in some embodiments, by means of a computer program or a set of computer programs written in a procedural programming language (such as for example the C programming language) or in an object-oriented programming language (such as for example the C++ programming language), and then compiled or interpreted on any form of computer architecture, such as for example a desktop computer or an embedded platform. The methods may for example be executed in real-time (i.e., producing estimates with low delay after sensor equipment and NSS measurements are available as incoming data) on small circuit boards such as for example a BeagleBoard board (available from Texas Instruments, based in Dallas, Tex., U.S.) or a RaspberryPi board (available from Raspberry Pi Foundation, based in Cambridge, U.K.), with a real-time capable operating system such as for example MicroC/OS, also known as pC/OS (developed by Micrium, Inc./Silicon Labs, Weston, Fla., U.S.), or the Angstrom Linux distribution, and arranged to receive data from sensor equipment 40 and the NSS receiver, for example via USB, Bluetooth, or serial communication (e.g. RS-232, RS-422, or Serial Peripheral Interface (SPI) bus).

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD-ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a software or firmware update adapted to be installed on receivers already in the field, i.e. a computer program which is delivered to the field as a computer program product. This applies to each of the above-described methods, systems and apparatuses.

Where the term "logic" or the like is used herein as part of an apparatus (such as a NSS receiver, or hand-held controller), no restriction is made regarding how distributed the constituent parts of the hardware and/or software units for implementing the logic may be. That is, the constituent parts of units may be distributed in different software or hardware components or devices for bringing about the intended function. Furthermore, the units may be gathered together for performing their functions by means of a combined, single unit.

The above-mentioned units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Furthermore, it should be noted that the order of the steps illustrated in the flowcharts of FIGS. 3*a*, 3*b*, 3*c*, etc. does not mean that the illustrated steps necessarily have to be performed in the order shown. Some steps may be performed in parallel, such as purely as example steps s10*a* and s20*a* of FIGS. 3*a*, 3*b*, and 3*c*; steps s10*b* and s20*b* of FIGS. 6*a*, 6*b*, and 6*c*; and steps s10*c* and s20*c* of FIGS. 9*a*, 9*b*, 9*c*, 10, 11, and 14.

Exemplary inertial sensors (i.e., accelerometers and gyroscopes) that may be used in some embodiments include an ADIS16405 sensor (available from Analog Devices, Inc., Norwood, Mass., U.S.) with three MEMS gyroscopes and three MEMS accelerometers within one unit, and single-axis MEMS gyroscopes such as for example a CRM100 sensor (available from Silicon Sensing Systems Limited, Plymouth, U.K.). Other inertial sensors with MEMS inertial sensors are described for example in ref. [2], chapter 7. Exemplary angle sensors that may be used in some embodiments include a "SMART Position Sensor, Rotary Configuration" (available from Honeywell, Morris Plains, N.J., U.S.), and a magnetic off-axis absolute position encoder iC-MU (available from iC-Haus, Bodenheim, Germany).

The invention also relates to the following embodiments numbered (E1) to (E20):

Embodiment (E1): Method for estimating, or at least for generating information usable to estimate, the heading of at least one axis (20) of interest of a rigid body (10), wherein the rigid body is equipped with an antenna (30) of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment (40) comprising at least one of a gyroscope and an angle sensor, the method comprising:

subjecting (s10*a*) the rigid body to a motion causing point B's horizontal position to change while keeping point A's position fixed relative to the Earth (50); and observing (s20*a*), by the NSS receiver, a NSS signal from each of a plurality of NSS satellites (60) during said motion;

wherein the method further comprises the following operations, carried out by at least one of the NSS receiver, the sensor equipment, and a processing entity capable of receiving data from the NSS receiver and sensor equipment:
estimating (s30a) the orientation, during said motion, of a body frame of the rigid body with respect to a reference frame based on data from the sensor equipment;
computing (s40a) at least two coordinates of a velocity vector, in the reference frame, of point B, based on the estimated orientation and on data from the sensor equipment, said velocity vector being hereinafter referred to as "sensor-based velocity vector"; and
based on the at least two coordinates of the sensor-based velocity vector and the NSS signals observed during said motion, at least one of:
generating (s50a) information usable to estimate the heading of the at least one axis of interest; and
estimating (s60a) the heading of the at least one axis of interest.

Embodiment (E2): Method of embodiment (E1), wherein estimating (s60a) the heading of the at least one axis of interest comprises:
computing (s62a) at least two coordinates of a second velocity vector, in the reference frame or in a further reference frame, of point B, with non-zero horizontal projection of said second velocity vector, based on the NSS signals observed during said motion, said second velocity vector being hereinafter referred to as "NSS-based velocity vector"; and
generating (s64a) an estimate of the heading of the at least one axis of interest based on the at least two coordinates of the sensor-based velocity vector and the at least two coordinates of the NSS-based velocity vector.

Embodiment (E3): Method of embodiment (E1), wherein estimating (s60a) the heading of the at least one axis of interest comprises:
computing (s66a), for each of at least one of the NSS satellites, a projection of the sensor-based velocity vector in direction of line of sight to the NSS satellite; and
generating (s68a) an estimate of the heading of the at least one axis of interest based on the at least one computed projection, and the NSS signals observed during said motion.

Embodiment (E4): Method for estimating, or at least for generating information usable to estimate, the heading of at least one axis (20) of interest of a rigid body (10), wherein the rigid body is equipped with an antenna (30) of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment (40) comprising at least one of:
a gyroscope,
an angle sensor, and
two accelerometers,
the method comprising:
subjecting (s10b) the rigid body to a motion causing point B's horizontal position to change while keeping point A's position fixed relative to the Earth (50); and
observing (s20b), by the NSS receiver, a NSS signal from each of a plurality of NSS satellites (60) during said motion;
wherein the method further comprises the following operations, carried out by at least one of the NSS receiver, the sensor equipment, and a processing entity capable of receiving data from the NSS receiver and sensor equipment:
estimating (s30b) the orientation, at two different points in time, of a body frame of the rigid body with respect to a reference frame based on data from the sensor equipment, wherein the rigid body is subject to the motion at least during a period of time between the two points in time;
computing (s40b) at least two coordinates of a delta-position vector, in the reference frame, of point B, based on the estimated orientation and on data from the sensor equipment, said delta-position vector being hereinafter referred to as "sensor-based delta-position vector"; and
based on the at least two coordinates of the sensor-based delta-position vector and the NSS signals observed during said motion, at least one of:
generating (s50b) information usable to estimate the heading of the at least one axis of interest; and
estimating (s60b) the heading of the at least one axis of interest.

Embodiment (E5): Method of embodiment (E4), wherein estimating (s60b) the heading of the at least one axis of interest comprises:
computing (s62b) at least two coordinates of a second delta-position vector, in the reference frame or in a further reference frame, of point B, with non-zero horizontal projection of said second delta-position vector, based on the NSS signals observed during said motion, said second delta-position vector being hereinafter referred to as "NSS-based delta-position vector"; and
generating (s64b) an estimate of the heading of the at least one axis of interest based on the at least two coordinates of the sensor-based delta-position vector and the at least two coordinates of the NSS-based delta-position vector.

Embodiment (E6): Method of embodiment (E4), wherein estimating (s60b) the heading of the at least one axis of interest comprises:
computing (s66b), for each of at least one of the NSS satellites, a projection of the sensor-based delta-position vector in direction of line of sight to the NSS satellite; and
generating (s68b) an estimate of the heading of the at least one axis of interest based on the at least one computed projection, and the NSS signals observed during said motion.

Embodiment (E7): Method for estimating, or at least for generating information usable to estimate, the heading of at least one axis (20) of interest of a rigid body (10), wherein the rigid body is equipped with an antenna (30) of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment (40) comprising at least one of:
a gyroscope,
an angle sensor, and
two accelerometers, the method comprising:
subjecting (s10c) the rigid body to a motion causing point B's horizontal position to change while keeping point A's position fixed relative to the Earth (50); and
observing (s20c), by the NSS receiver, a NSS signal from each of a plurality of NSS satellites (60) at least at a first point in time and at a second point in time, wherein the rigid body is subject to the motion at least during part of the period of time between the first and second points in time;
wherein the method further comprises the following operations, carried out by at least one of the NSS receiver, the sensor equipment, and a processing entity capable of receiving data from the NSS receiver and sensor equipment:
computing (s30c) an estimate of the horizontal position, or of a position usable to derive the horizontal position, of a point, hereinafter referred to as "point C", at the first point in time, said estimate being hereinafter referred to as "initial position estimate", based on the NSS signals observed at least at the first point in time, wherein point C is any one of:
point A;
point B; and
another point being either a point of the rigid body or a point being at a fixed position with respect to the rigid body; and
based on the initial position estimate, data from the sensor equipment, and the observed NSS signals, at least one of:
generating (s50c) information usable to estimate the heading of the at least one axis of interest; and
estimating (s60c) the heading of the at least one axis of interest.

Embodiment (E8): Method of embodiment (E7), further comprising:
computing (s40c) an estimate of the horizontal position, or of a position usable to derive the horizontal position, of point B at the second point in time, said estimate being hereinafter referred to as "sensor-based estimated position", based on data from the sensor equipment and the initial position estimate; and
wherein estimating (s60c) the heading of the at least one axis of interest comprises:
computing (s62c) a further estimate of the horizontal position, or of a position usable to derive the horizontal position, of point B at the second point in time, said further estimate being hereinafter referred to as "NSS-based estimated position", based on the observed NSS signals; and
generating (s64c) an estimate of the heading of the at least one axis of interest based on the sensor-based estimated position estimate and the NSS-based estimated position.

Embodiment (E9): Method of embodiment (E7), further comprising:
computing (s40c) an estimate of the horizontal position, or of a position usable to derive the horizontal position, of point B at the second point in time, said estimate being hereinafter referred to as "sensor-based estimated position", based on data from the sensor equipment and the initial position estimate; and
wherein estimating (s60c) the heading of the at least one axis of interest comprises:
computing (s66c), for each of at least one of the NSS satellites, a distance between the sensor-based estimated position and the antenna position of the NSS satellite; and
generating (s68c) an estimate of the heading of the at least one axis of interest based on the at least one computed distance, and the observed NSS signals.

Embodiment (E10): Method according to any one of embodiments (E1) to (E9), wherein the sensor equipment comprises:
three gyroscopes arranged for measuring the angular rate about three linearly independent axes of the rigid body; and
two accelerometers arranged for measuring the specific force in direction of two linearly independent axes of the rigid body.

Embodiment (E11): Method of embodiment (E10), wherein the sensor equipment comprises:
three gyroscopes arranged for measuring the angular rate about three linearly independent axes of the rigid body; and
three accelerometers arranged for measuring the specific force in direction of three linearly independent axes of the rigid body.

Embodiment (E12): Method according to any one of embodiments (E1) to (E11), wherein
the motion causing point B's horizontal position to change while keeping point A's position fixed relative to the Earth comprises a rotation about an Earth-fixed axis (70) passing through point A;
the distance between point B and said Earth-fixed axis (70) is larger than zero and constant; and
the sensor equipment comprises
two accelerometers arranged for measuring the specific force in direction of two linearly independent axes; and
at least one of:
a gyroscope arranged for measuring the angular rate about said Earth-fixed axis (70); and
an angle sensor arranged for measuring orientation about said Earth-fixed axis (70).

Embodiment (E13): Method according to any one of embodiments (E1) to (E12), wherein
the motion causing point B's horizontal position to change while keeping point A's position fixed relative to the Earth comprises a rotation about an Earth-fixed axis (70) passing through point A;
the distance between point B and said Earth-fixed axis (70) is larger than zero and constant; and
the sensor equipment comprises an angle sensor arranged for measuring orientation about said Earth-fixed axis (70).

Embodiment (E14): Method according to any one of embodiments (E1) to (E13), wherein
the motion causing point B's horizontal position to change while keeping point A's position fixed relative to the Earth comprises a rotation about a vertical or substantially vertical Earth-fixed axis (80) passing through point A;
the distance between point B and said vertical or substantially vertical Earth-fixed axis is larger than zero and constant; and
the sensor equipment comprises at least one of:
a gyroscope arranged for measuring the angular rate about said vertical or substantially vertical Earth-fixed axis; and an angle sensor arranged for measuring orientation about said vertical or substantially vertical Earth-fixed axis.

Embodiment (E15): Method of according to any one of embodiments (E4) to (E9), wherein
the motion causing point B's horizontal position to change while keeping point A's position fixed relative to the Earth begins from a state in which an axis passing through point A and point B is vertical or substantially vertical; and
the sensor equipment comprises two accelerometers arranged for measuring the specific force in direction of two linearly independent axes of the rigid body.

Embodiment (E16): Method of embodiment (E7), wherein
the sensor equipment comprises two accelerometers arranged for measuring the specific force in direction of two linearly independent axes of the rigid body; and
the motion causing point B's horizontal position to change while keeping point A's position fixed relative to the Earth begins from a state in which an axis passing through point A and point B is vertical or substantially vertical;
wherein the method further comprises the following operations, carried out by at least one of the NSS receiver, the sensor equipment, and a processing entity capable of receiving data from the NSS receiver and sensor equipment:
computing (s40d) a further estimate of the horizontal position, or of a position usable to derive the horizontal position, of point B at the second point in time, said further estimate being hereinafter referred to as "NSS-based estimated position", based on the observed NSS signals; and
wherein estimating (s60c) the heading of the at least one axis of interest comprises:
generating (s69c) an estimate of the heading of the at least one axis of interest based on the initial position estimate, the NSS-based estimated position, and data from the sensor equipment.

Embodiment (E17): Apparatus for estimating, or at least for generating information usable to estimate, the heading of at least one axis (20) of interest of a rigid body (10), wherein the rigid body is equipped with an antenna (30) of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment (40) comprising at least one of a gyroscope and an angle sensor;
wherein the rigid body is arranged to be subject to a motion causing point B's horizontal position to change while keeping point A's position fixed relative to the Earth (50); and
wherein the NSS receiver is arranged to observe a NSS signal from each of a plurality of NSS satellites (60) during said motion;
wherein the apparatus comprises hardware and/or software logic configured for:
estimating (s30a) the orientation, during said motion, of a body frame of the rigid body with respect to a reference frame based on data from the sensor equipment;
computing (s40a) at least two coordinates of a velocity vector, in the reference frame, of point B, based on the estimated orientation and on data from the sensor equipment, said velocity vector being hereinafter referred to as "sensor-based velocity vector"; and
based on the at least two coordinates of the sensor-based velocity vector and the NSS signals observed during said motion, at least one of:
generating (s50a) information usable to estimate the heading of the at least one axis of interest; and
estimating (s60a) the heading of the at least one axis of interest.

Embodiment (E18): Apparatus for estimating, or at least for generating information usable to estimate, the heading of at least one axis (20) of interest of a rigid body (10), wherein the rigid body is equipped with an antenna (30) of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment (40) comprising at least one of:
a gyroscope,
an angle sensor, and
two accelerometers;
wherein the rigid body is arranged to be subject to a motion causing point B's horizontal position to change while keeping point A's position fixed relative to the Earth (50); and
wherein the NSS receiver is arranged to observe a NSS signal from each of a plurality of NSS satellites (60) during said motion;
wherein the apparatus comprises hardware and/or software logic configured for:
estimating (s30b) the orientation, at two different points in time, of a body frame of the rigid body with respect to a reference frame based on data from the sensor equipment, wherein the rigid body is subject to the motion at least during a period of time between the two points in time;
computing (s40b) at least two coordinates of a delta-position vector, in the reference frame, of point B, based on the estimated orientation and on data from the sensor equipment, said delta-position vector being hereinafter referred to as "sensor-based delta-position vector"; and
based on the at least two coordinates of the sensor-based delta-position vector and the NSS signals observed during said motion, at least one of:
generating (s50b) information usable to estimate the heading of the at least one axis of interest; and
estimating (s60b) the heading of the at least one axis of interest.

Embodiment (E19): Apparatus for estimating, or at least for generating information usable to estimate, the heading of at least one axis (20) of interest of a rigid body (10), wherein the rigid body is equipped with an antenna (30) of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment (40) comprising at least one of:

a gyroscope,
an angle sensor, and
two accelerometers;
wherein the rigid body is arranged to be subject to a motion causing point B's horizontal position to change while keeping point A's position fixed relative to the Earth (50); and
wherein the NSS receiver is arranged to observe a NSS signal from each of a plurality of NSS satellites (60) at least at a first point in time and at a second point in time, wherein the rigid body is subject to the motion at least during part of the period of time between the first and second points in time; wherein the apparatus comprises hardware and/or software logic configured for:
computing (s30c) an estimate of the horizontal position, or of a position usable to derive the horizontal position, of a point, hereinafter referred to as "point C", at the first point in time, said estimate being hereinafter referred to as "initial position estimate", based on the NSS signals observed at least at the first point in time, wherein point C is any one of:
point A;
point B; and
another point being either a point of the rigid body or a point being at a fixed position with respect to the rigid body; and
based on the initial position estimate, data from the sensor equipment, and the observed NSS signals, at least one of:
generating (s50c) information usable to estimate the heading of the at least one axis of interest; and
estimating (s60c) the heading of the at least one axis of interest.
Embodiment (E20): Computer program, computer program product, or computer-readable medium comprising computer-readable instructions configured, when executed on a computer, to cause the computer to carry out at least one of the following sets of operations:
estimating (s30a) the orientation of the body frame, computing (s40a) at least two coordinates of the sensor-based velocity vector, and generating (s50a) information usable to estimate the heading, as defined in embodiment (E1);
estimating (s30a) the orientation of the body frame, computing (s40a) at least two coordinates of the sensor-based velocity vector, and estimating (s60a) the heading, as defined in embodiment (E1);
estimating (s30b) the orientation of the body frame, computing (s40b) at least two coordinates of the sensor-based delta-position vector, and generating (s50b) information usable to estimate the heading, as defined in embodiment (E4);
estimating (s30b) the orientation of the body frame, computing (s40b) at least two coordinates of the sensor-based delta-position vector, and estimating (s60b) the heading, as defined in embodiment (E4);
computing (s30c) an initial position estimate, and generating (s50c) information usable to estimate the heading, as defined in embodiment (E7); and
computing (s30c) an initial position estimate, and estimating (s60c) the heading, as defined in embodiment (E7).

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method for estimating, or at least for generating information usable to estimate, a heading of at least one axis of interest of a rigid body, wherein the rigid body is equipped with an antenna of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment comprising at least one of:
a gyroscope, and
an angle sensor measuring a rotation of the rigid body about an Earth-fixed axis,
the method comprising:
subjecting the rigid body to a motion causing point B's horizontal position to change while keeping point A's position fixed relative to the Earth; and
observing, by the NSS receiver, a NSS signal from each of a plurality of NSS satellites during said motion;
wherein the method further comprises the following operations, carried out by at least one of: the NSS receiver, the sensor equipment, and a processing entity capable of receiving data from the NSS receiver and sensor equipment:
estimating an orientation, during said motion, of a body frame of the rigid body with respect to a reference frame based on data from the sensor equipment;
computing at least two coordinates of a velocity vector, in the reference frame, of point B, based on the estimated orientation and on data from the sensor equipment, said velocity vector being hereinafter referred to as "sensor-based velocity vector", and the at least two coordinates being two coordinates containing information about the motion of point B in two independent directions in a local horizontal plane; and
based on the at least two coordinates of the sensor-based velocity vector and on the NSS signals observed during said motion, at least one of:
generating information usable to estimate the heading of the at least one axis of interest; and
estimating the heading of the at least one axis of interest.

2. Method of claim 1, wherein estimating the heading of the at least one axis of interest comprises:
computing at least two coordinates of a second velocity vector, in the reference frame or in a further reference frame, of point B, with non-zero horizontal projection of said second velocity vector, based on the NSS signals observed during said motion, said second velocity vector being hereinafter referred to as "NSS-based velocity vector"; and
generating an estimate of the heading of the at least one axis of interest based on the at least two coordinates of the sensor-based velocity vector and the at least two coordinates of the NSS-based velocity vector, wherein generating comprises:
estimating an error of the estimated orientation based on the at least two coordinates of the sensor-based velocity vector and the at least two coordinates of the NSS-based velocity vector; and estimating the heading of the at least one axis of interest based on the estimated error in combination with the estimated orientation;

or comprises:
computing a corrected orientation of the body frame based on the at least two coordinates of the sensor-based velocity vector and the at least two coordinates of the NSS-based velocity vector; and
estimating the heading of the at least one axis of interest based on the corrected orientation.

3. Method of claim 1, wherein estimating the heading of the at least one axis of interest comprises:
computing for each of at least one of the NSS satellites, a projection of the sensor-based velocity vector in direction of line of sight to the NSS satellite; and
generating an estimate of the heading of the axis of interest based on the at least one computed projection, and the NSS signals observed during said motion, wherein generating comprises:
estimating an error of the estimated orientation based on, for at least one of the NSS satellites, the projection of the sensor-based velocity vector in direction of line of sight to the NSS satellite and at least one NSS signal observed from the NSS satellite; and
estimating the heading of the at least one axis of interest based on the estimated error in combination with the estimated orientation;

or comprises:
computing a corrected orientation of the body frame based on, for at least one of the NSS satellites, the projection of the sensor-based velocity vector in direction of line of sight to the NSS satellite and at least one NSS signal observed from the NSS satellite; and
estimating the heading of the at least one axis of interest based on the corrected orientation.

4. Method according to claim 1, wherein the sensor equipment comprises:
three gyroscopes arranged for measuring an angular rate about three linearly independent axes of the rigid body; and
two accelerometers arranged for measuring a specific force in direction of two linearly independent axes of the rigid body.

5. Method for estimating, or at least for generating information usable to estimate, a heading of at least one axis of interest of a rigid body, wherein the rigid body is equipped with an antenna of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment comprising at least one of:
a gyroscope,
an angle sensor measuring a rotation of the rigid body about an Earth-fixed axis, and
two accelerometers,
the method comprising:
subjecting the rigid body to an uninterrupted motion causing point B's horizontal position to change while keeping point A's position fixed relative to the Earth; and
observing, by the NSS receiver, a NSS signal from each of a plurality of NSS satellites during said motion;

wherein the method further comprises the following operations, carried out by at least one of: the NSS receiver, the sensor equipment, and a processing entity capable of receiving data from the NSS receiver and sensor equipment:
estimating an orientation, at two different points in time, of a body frame of the rigid body with respect to a reference frame based on data from the sensor equipment, wherein the rigid body is subject to the motion at least during a period of time between the two points in time and the rigid body is subject to no other motion between the two points in time;
computing at least two coordinates of a delta-position vector, in the reference frame, of point B, based on the estimated orientation and on data from the sensor equipment, said delta-position vector being hereinafter referred to as "sensor-based delta-position vector", and the at least two coordinates being two coordinates containing information about the motion of point B in two independent directions in a local horizontal plane; and
based on the at least two coordinates of the sensor-based delta-position vector and on the NSS signals observed during said motion, and using a computation method which does not, as such, necessitate the use of NSS signals observed during any other motion, at least one of:
generating information usable to estimate the heading of the at least one axis of interest; and
estimating the heading of the at least one axis of interest.

6. Method according to claim 1, wherein
the motion causing point B's horizontal position to change while keeping point A's position fixed relative to the Earth comprises a rotation about an Earth-fixed axis passing through point A;
a distance between point B and said Earth-fixed axis is larger than zero and constant; and
the sensor equipment comprises
two accelerometers arranged for measuring a specific force in direction of two linearly independent axes; and
at least one of:
a gyroscope arranged for measuring an angular rate about said Earth-fixed axis; and
an angle sensor arranged for measuring orientation about said Earth-fixed axis.

7. Method according to claim 1, wherein
the motion causing point B's horizontal position to change while keeping point A's position fixed relative to the Earth comprises a rotation about an Earth-fixed axis passing through point A;
a distance between point B and said Earth-fixed axis is larger than zero and constant; and
the sensor equipment comprises an angle sensor arranged for measuring orientation about said Earth-fixed axis.

8. Method according to claim 1, wherein
the motion causing point B's horizontal position to change while keeping point A's position fixed relative to the Earth comprises a rotation about a vertical or substantially vertical Earth-fixed axis passing through point A;
a distance between point B and said vertical or substantially vertical Earth-fixed axis is larger than zero and constant; and the sensor equipment comprises at least one of:
  a gyroscope arranged for measuring an angular rate about said vertical or substantially vertical Earth-fixed axis; and
  an angle sensor arranged for measuring orientation about said vertical or substantially vertical Earth-fixed axis.

9. Method of claim 5, wherein the sensor equipment comprises:
  three gyroscopes arranged for measuring an angular rate about three linearly independent axes of the rigid body; and
  three accelerometers arranged for measuring a specific force in direction of three linearly independent axes of the rigid body.

10. Method of claim 5, wherein estimating the heading of the at least one axis of interest comprises:
  computing at least two coordinates of a second delta-position vector, in the reference frame or in a further reference frame, of point B, with non-zero horizontal projection of said second delta-position vector, based on the NSS signals observed during said motion, said second delta-position vector being hereinafter referred to as "NSS-based delta-position vector"; and
  generating an estimate of the heading of the at least one axis of interest based on the at least two coordinates of the sensor-based delta-position vector and the at least two coordinates of the NSS-based delta-position vector, wherein generating comprises:
    estimating an error of the estimated orientation based on the at least two coordinates of the sensor-based delta-position vector and the at least two coordinates of the NSS-based delta-position vector; and
    estimating the heading of the at least one axis of interest based on the estimated error in combination with the estimated orientation;
  or comprises:
    computing a corrected orientation of the body frame at the two points in time based on the at least two coordinates of the sensor-based delta-position vector and the at least two coordinates of the NSS-based delta-position vector; and
    estimating the heading of the at least one axis of interest based on the corrected orientation.

11. Method of claim 9, wherein estimating the heading of the at least one axis of interest comprises:
  computing, for each of at least one of the NSS satellites, a projection of the sensor-based delta-position vector in direction of line of sight to the NSS satellite; and
  generating an estimate of the heading of the at least one axis of interest based on the at least one computed projection, and the NSS signals observed during said motion, wherein generating comprises:
    estimating an error of the estimated orientation based on, for at least one NSS satellite, the projection of the sensor-based delta-position vector in direction of line of sight to the NSS satellite and at least one NSS signal observed from the NSS satellite; and
    estimating the heading of the at least one axis of interest based on the estimated error in combination with the estimated orientation;
  or comprises:
    computing a corrected orientation of the body frame at the two points in time based on, for at least one NSS satellite, the projection of the sensor-based delta-position vector in direction of line of sight to the NSS satellite and at least one NSS signal observed from the NSS satellite; and
    estimating the heading of the at least one axis of interest based on the corrected orientation.

12. Method of according to claim 5, wherein
  the motion causing point B's horizontal position to change while keeping point A's position fixed relative to the Earth begins from a state in which an axis passing through point A and point B is vertical or substantially vertical; and
  the sensor equipment comprises two accelerometers arranged for measuring a specific force in direction of two linearly independent axes of the rigid body.

13. Method for estimating, or at least for generating information usable to estimate, a heading of at least one axis of interest of a rigid body, wherein the rigid body is equipped with an antenna of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment comprising at least one of:
  a gyroscope,
  an angle sensor measuring a rotation of the rigid body about an Earth-fixed axis, and
  two accelerometers,
the method comprising:
  subjecting the rigid body to an uninterrupted motion causing point B's horizontal position to change while keeping point A's position fixed relative to the Earth; and
  observing, by the NSS receiver, a NSS signal from each of a plurality of NSS satellites at least at a first point in time and at a second point in time, wherein the rigid body is subject to the motion at least during part of a period of time between the first and second points in time and the rigid body is subject to no other motion between the first and second points in time;
wherein the method further comprises the following operations, carried out by at least one of: the NSS receiver, the sensor equipment, and a processing entity capable of receiving data from the NSS receiver and sensor equipment:
  computing an estimate of a horizontal position, or of a position usable to derive the horizontal position, of a point, hereinafter referred to as "point C", at the first point in time, said estimate being hereinafter referred to as "initial position estimate", based on the NSS signals observed at least at the first point in time, wherein point C is any one of:
  point A;
  point B; and
  another point being either a point of the rigid body or a point being at a fixed position with respect to the rigid body; and
  based on the initial position estimate, data from the sensor equipment, and the observed NSS signals, and using a computation method which does not, as such, necessitate the use of NSS signals observed before the first point in time, between the first and second points in time, or after the second point in time, at least one of:

generating information usable to estimate the heading of the at least one axis of interest; and estimating the heading of the at least one axis of interest.

14. Method of claim 13, further comprising:

computing an estimate of the horizontal position, or of a position usable to derive the horizontal position, of point B at the second point in time, said estimate being hereinafter referred to as "sensor-based estimated position", based on data from the sensor equipment and the initial position estimate, wherein computing comprises estimating an orientation, at the second point in time, of a body frame of the rigid body with respect to a reference frame based on data from the sensor equipment; and wherein estimating the heading of the at least one axis of interest comprises:

computing a further estimate of the horizontal position, or of a position usable to derive the horizontal position, of point B at the second point in time, said further estimate being hereinafter referred to as "NSS-based estimated position", based on the observed NSS signals; and generating an estimate of the heading of the at least one axis of interest based on the sensor-based estimated position and the NSS-based estimated position, wherein generating comprises:

estimating an error of the estimated orientation based on the sensor-based estimated position estimate and the NSS-based estimated position; and estimating the heading of the at least one axis of interest based on the estimated error in combination with the estimated orientation;

or comprises:

computing a corrected orientation of the body frame at the first or second point in time based on the sensor-based estimated position estimate and the NSS-based estimated position; and estimating the heading of the at least one axis of interest based on the corrected orientation.

15. Method of claim 13, further comprising:

computing an estimate of the horizontal position, or of a position usable to derive the horizontal position, of point B at the second point in time, said estimate being hereinafter referred to as "sensor-based estimated position", based on data from the sensor equipment and the initial position estimate; and wherein estimating the heading of the at least one axis of interest comprises:

computing for each of at least one of the NSS satellites, a distance between the sensor-based estimated position and an antenna position of the NSS satellite; and generating an estimate of the heading of the at least one axis of interest based on the at least one computed distance, and the observed NSS signals, wherein generating comprises:

estimating an error of the estimated orientation based on, for at least one of the NSS satellites, the distance between the sensor-based estimated position and the antenna position of the NSS satellite, and at least one NSS signal observed from the NSS satellite; and estimating the heading of the at least one axis of interest based on the estimated error in combination with the estimated orientation;

or comprises:

computing a corrected orientation of the body frame at the first or second point in time based on, for at least one of the NSS satellites, the distance between the sensor-based estimated position and the antenna position of the NSS satellite, and at least one NSS signal observed from the NSS satellite; and estimating the heading of the at least one axis of interest based on the corrected orientation.

16. Method of claim 13, wherein the sensor equipment comprises two accelerometers arranged for measuring a specific force in direction of two linearly independent axes of the rigid body; and the motion causing point B's horizontal position to change while keeping point A's position fixed relative to the Earth begins from a state in which an axis passing through point A and point B is vertical or substantially vertical;

wherein the method further comprises the following operations, carried out by at least one of: the NSS receiver, the sensor equipment, and a processing entity capable of receiving data from the NSS receiver and sensor equipment:

computing a further estimate of the horizontal position, or of a position usable to derive the horizontal position, of point B at the second point in time, said further estimate being hereinafter referred to as "NSS-based estimated position", based on the observed NSS signals; and wherein estimating the heading of the at least one axis of interest comprises: generating an estimate of the heading of the at least one axis of interest based on the initial position estimate, the NSS-based estimated position, and data from the sensor equipment, and generating comprises:

computing a roll and pitch of a body frame of the rigid body with respect to a local level reference frame at the second point in time, or information usable to derive said roll and pitch, based on data from the sensor equipment;

computing a heading of the body frame with respect to the local level reference frame at the second point in time, or information usable to derive said heading, based on:

the roll and pitch or information usable to derive said roll and pitch, the initial position estimate, and the NSS-based estimated position; and estimating the heading of the at least one axis of interest based on a corrected orientation, based on:

the roll and pitch and the computed heading of the body frame, or information usable to derive said roll, pitch and said computed heading.

17. Apparatus for estimating, or at least for generating information usable to estimate, a heading of at least one axis of interest of a rigid body, wherein the rigid body is equipped with an antenna of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment comprising at least one of:

a gyroscope, and
an angle sensor arranged for measuring a rotation of the rigid body about an Earth-fixed axis;
wherein the rigid body is arranged to be subject to a motion causing point B's horizontal position to change while keeping point A's position fixed relative to the Earth; and
wherein the NSS receiver is arranged to observe a NSS signal from each of a plurality of NSS satellites during said motion;
wherein the apparatus comprises hardware and/or software logic configured for:
estimating an orientation, during said motion, of a body frame of the rigid body with respect to a reference frame based on data from the sensor equipment;
computing at least two coordinates of a velocity vector, in the reference frame, of point B, based on the estimated orientation and on data from the sensor equipment, said velocity vector being hereinafter referred to as "sensor-based velocity vector", and the at least two coordinates being two coordinates containing information about the motion of point B in two independent directions in a local horizontal plane; and
based on the at least two coordinates of the sensor-based velocity vector and on the NSS signals observed during said motion, at least one of:
generating information usable to estimate the heading of the at least one axis of interest; and
estimating the heading of the at least one axis of interest.

18. Apparatus for estimating, or at least for generating information usable to estimate, a heading of at least one axis of interest of a rigid body, wherein the rigid body is equipped with an antenna of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment comprising at least one of:
a gyroscope,
an angle sensor arranged for measuring a rotation of the rigid body about an Earth-fixed axis, and
two accelerometers;
wherein the rigid body is arranged to be subject to an uninterrupted motion causing point B's horizontal position to change while keeping point A's position fixed relative to the Earth; and
wherein the NSS receiver is arranged to observe a NSS signal from each of a plurality of NSS satellites during said motion;
wherein the apparatus comprises hardware and/or software logic configured for:
estimating an orientation, at two different points in time, of a body frame of the rigid body with respect to a reference frame based on data from the sensor equipment, wherein the rigid body is subject to the motion at least during a period of time between the two points in time and the rigid body is subject to no other motion between the two points in time;
computing at least two coordinates of a delta-position vector, in the reference frame, of point B, based on the estimated orientation and on data from the sensor equipment, said delta-position vector being hereinafter referred to as "sensor-based delta-position vector", and the at least two coordinates being two coordinates containing information about the motion of point B in two independent directions in a local horizontal plane; and
based on the at least two coordinates of the sensor-based delta-position vector and on the NSS signals observed during said motion, and using a computation method which does not, as such, necessitate the use of NSS signals observed during any other motion, at least one of:
generating information usable to estimate the heading of the at least one axis of interest; and
estimating the heading of the at least one axis of interest.

19. Apparatus for estimating, or at least for generating information usable to estimate, a heading of at least one axis of interest of a rigid body, wherein the rigid body is equipped with an antenna of a navigation satellite system receiver, hereinafter abbreviated as "NSS receiver", wherein the antenna's phase center is located at a point, hereinafter referred to as "point B", which is away from another point, hereinafter referred to as "point A", wherein point A is either a point of the rigid body or a point being at a fixed position with respect to the rigid body, and wherein the rigid body is further equipped with sensor equipment comprising at least one of:
a gyroscope,
an angle sensor arranged for measuring a rotation of the rigid body about an Earth-fixed axis, and
two accelerometers;
wherein the rigid body is arranged to be subject to an uninterrupted motion causing point B's horizontal position to change while keeping point A's position fixed relative to the Earth; and
wherein the NSS receiver is arranged to observe a NSS signal from each of a plurality of NSS satellites at least at a first point in time and at a second point in time, wherein the rigid body is subject to the motion at least during part of a period of time between the first and second points in time and the rigid body is subject to no other motion between the first and second points in time;
wherein the apparatus comprises hardware and/or software logic configured for:
computing an estimate of a horizontal position, or of a position usable to derive the horizontal position, of a point, hereinafter referred to as "point C", at the first point in time, said estimate being hereinafter referred to as "initial position estimate", based on the NSS signals observed at least at the first point in time, wherein point C is any one of:
point A;
point B; and
another point being either a point of the rigid body or a point being at a fixed position with respect to the rigid body; and
based on the initial position estimate, data from the sensor equipment, and the observed NSS signals, and using a computation method which does not, as such, necessitate the use of NSS signals observed before the first point in time, between the first and second points in time, or after the second point in time, at least one of:
generating information usable to estimate the heading of the at least one axis of interest; and
estimating the heading of the at least one axis of interest.

20. Computer program comprising computer-readable instructions configured, when executed on a computer, to cause the computer to carry out at least one of the following sets of operations:
- estimating the orientation of the body frame, computing at least two coordinates of the sensor-based velocity vector, and generating information usable to estimate the heading, as defined in claim 1;
- estimating the orientation of the body frame, computing at least two coordinates of the sensor-based velocity vector, and estimating the heading, as defined in claim 1;
- estimating the orientation of the body frame, computing at least two coordinates of the sensor-based delta-position vector, and generating information usable to estimate the heading;
- estimating the orientation of the body frame, computing at least two coordinates of the sensor-based delta-position vector, and estimating the heading;
- computing an initial position estimate, and generating information usable to estimate the heading; and
- computing an initial position estimate, and estimating the heading.

21. Computer program product or computer-readable medium storing a computer program according to claim 20.

* * * * *